April 29, 1958 H. J. CHALL 2,832,530
VALUE SELECTING AND TRANSMITTING MECHANISM
FOR LISTING ADDING MACHINE
Filed Jan. 29, 1954 29 Sheets-Sheet 26
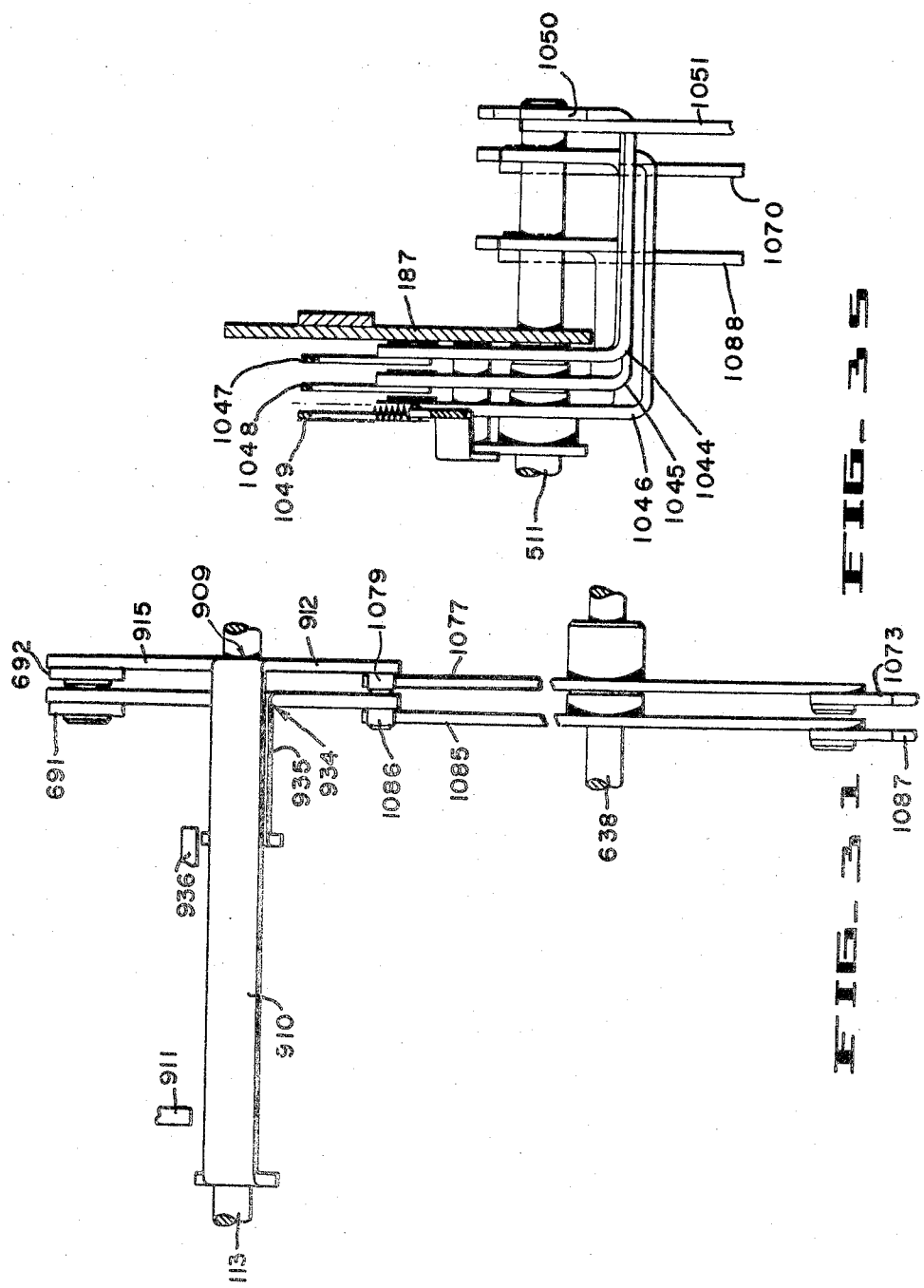

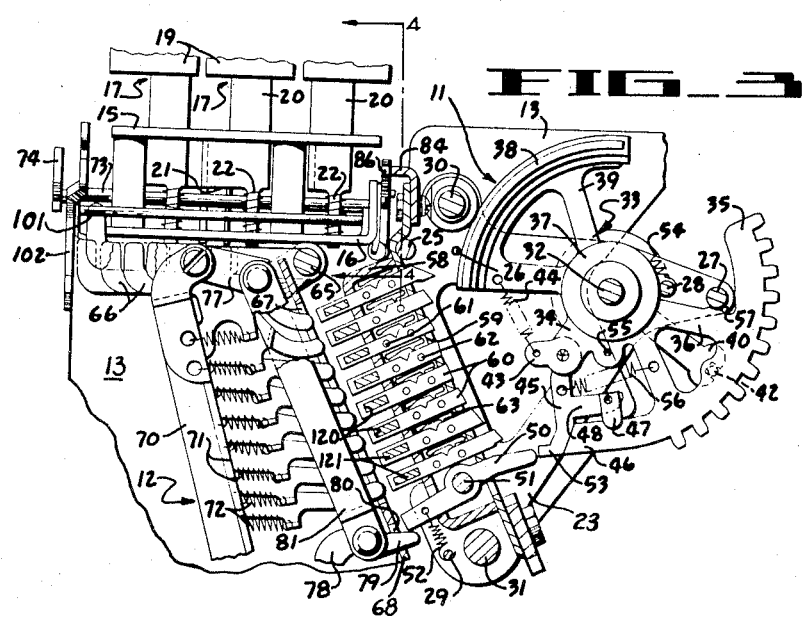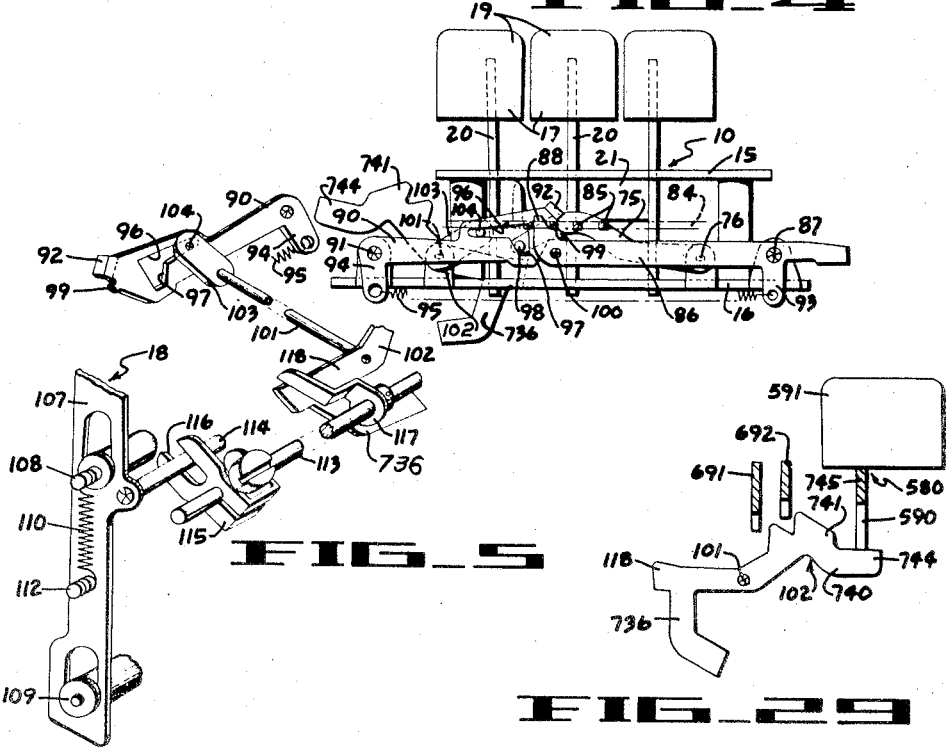

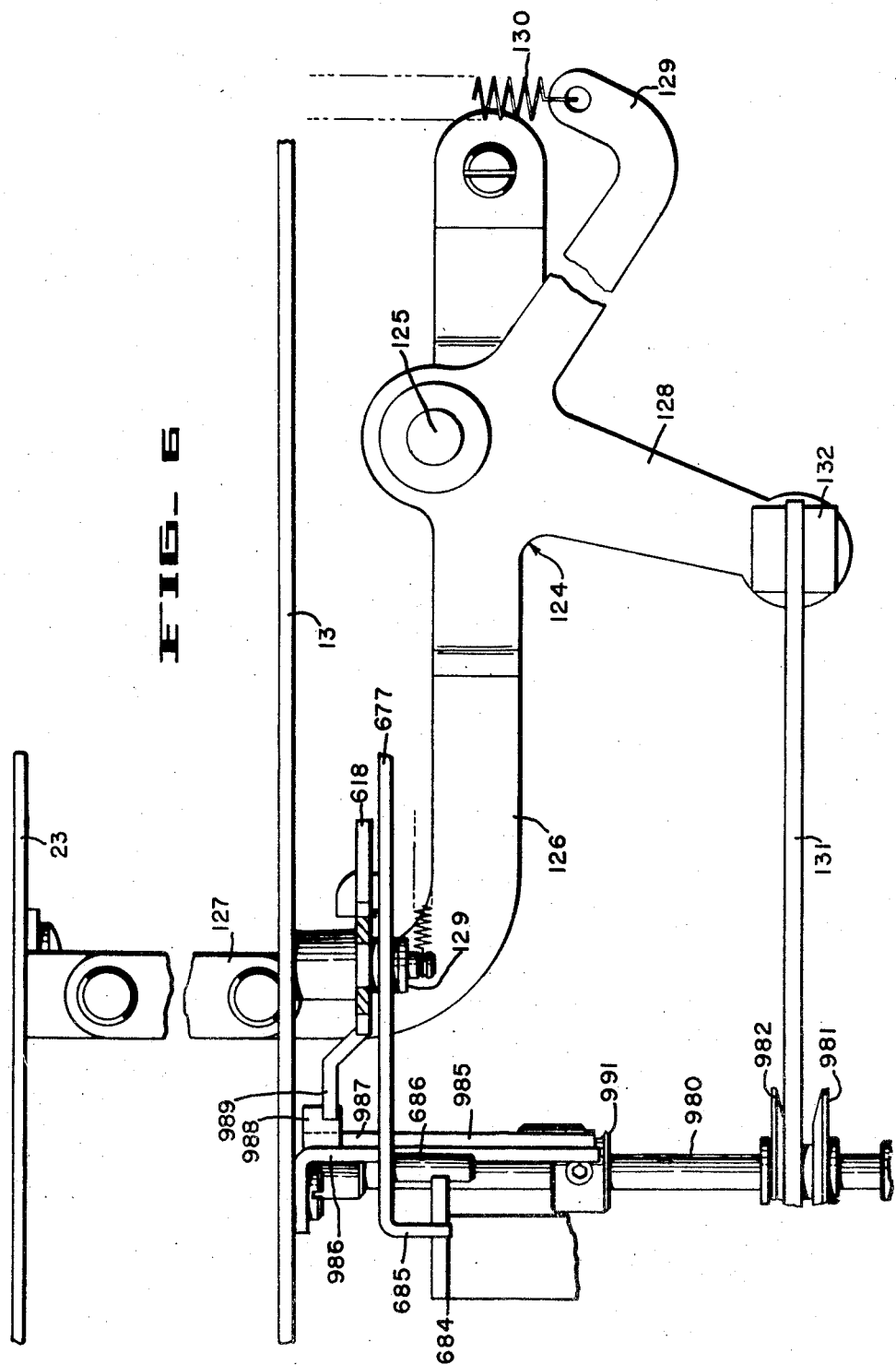

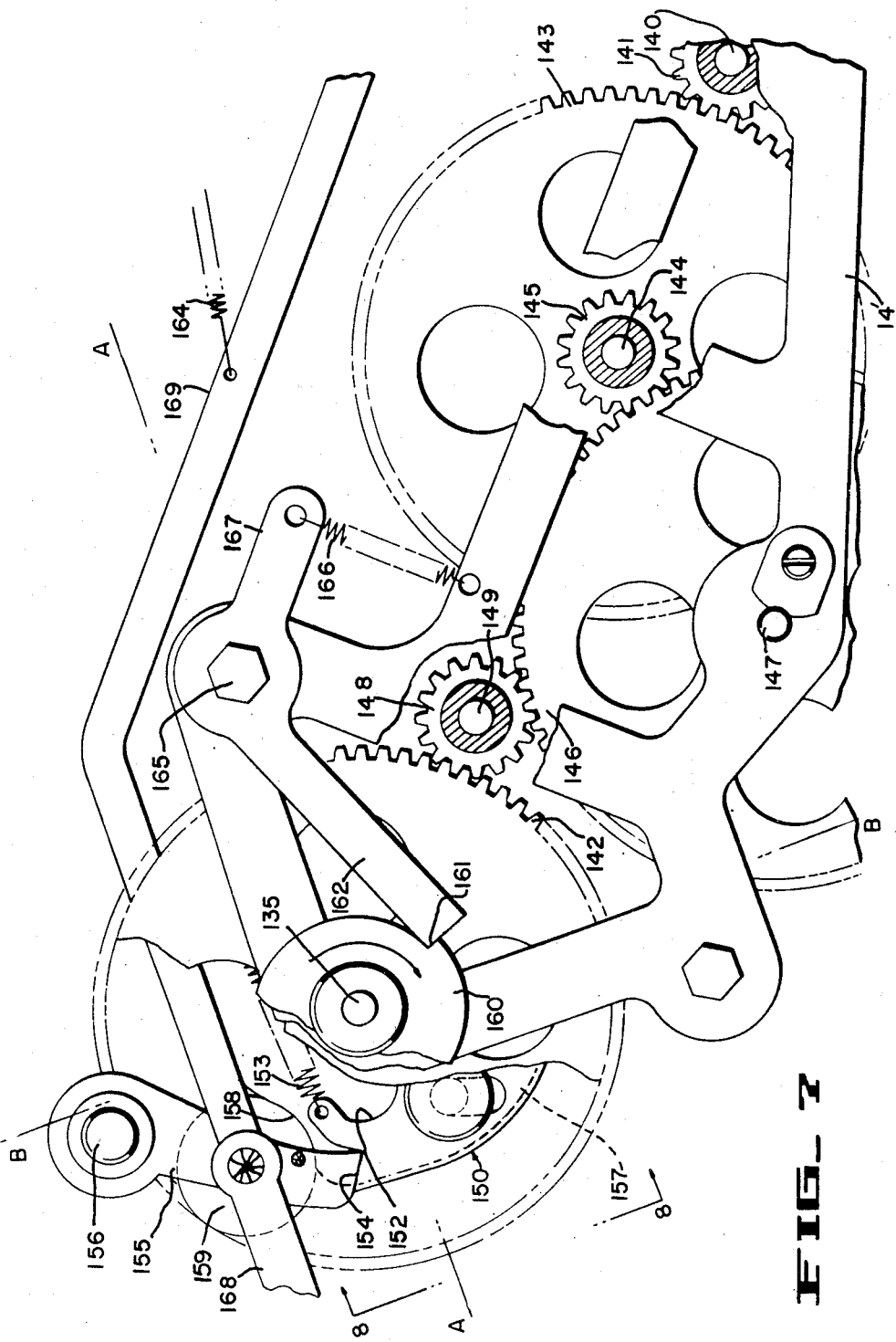

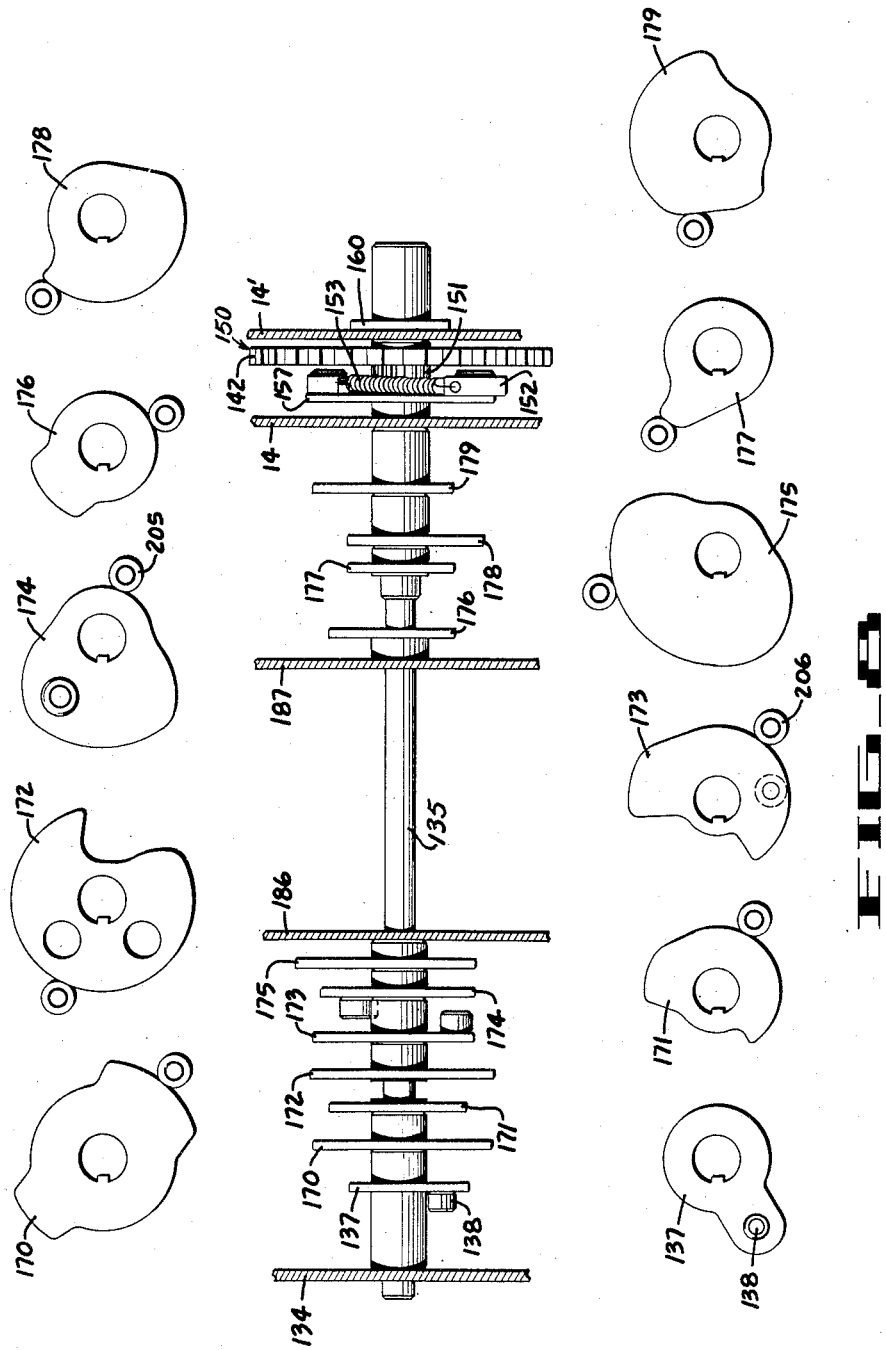

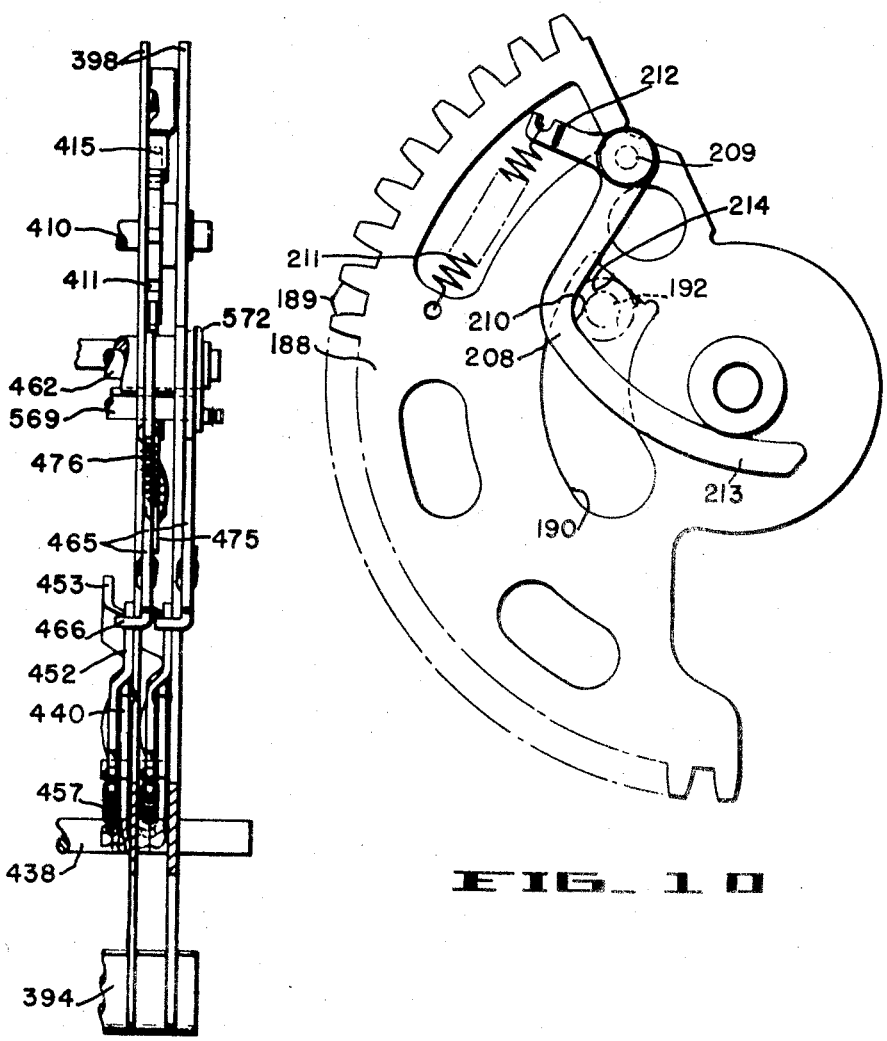

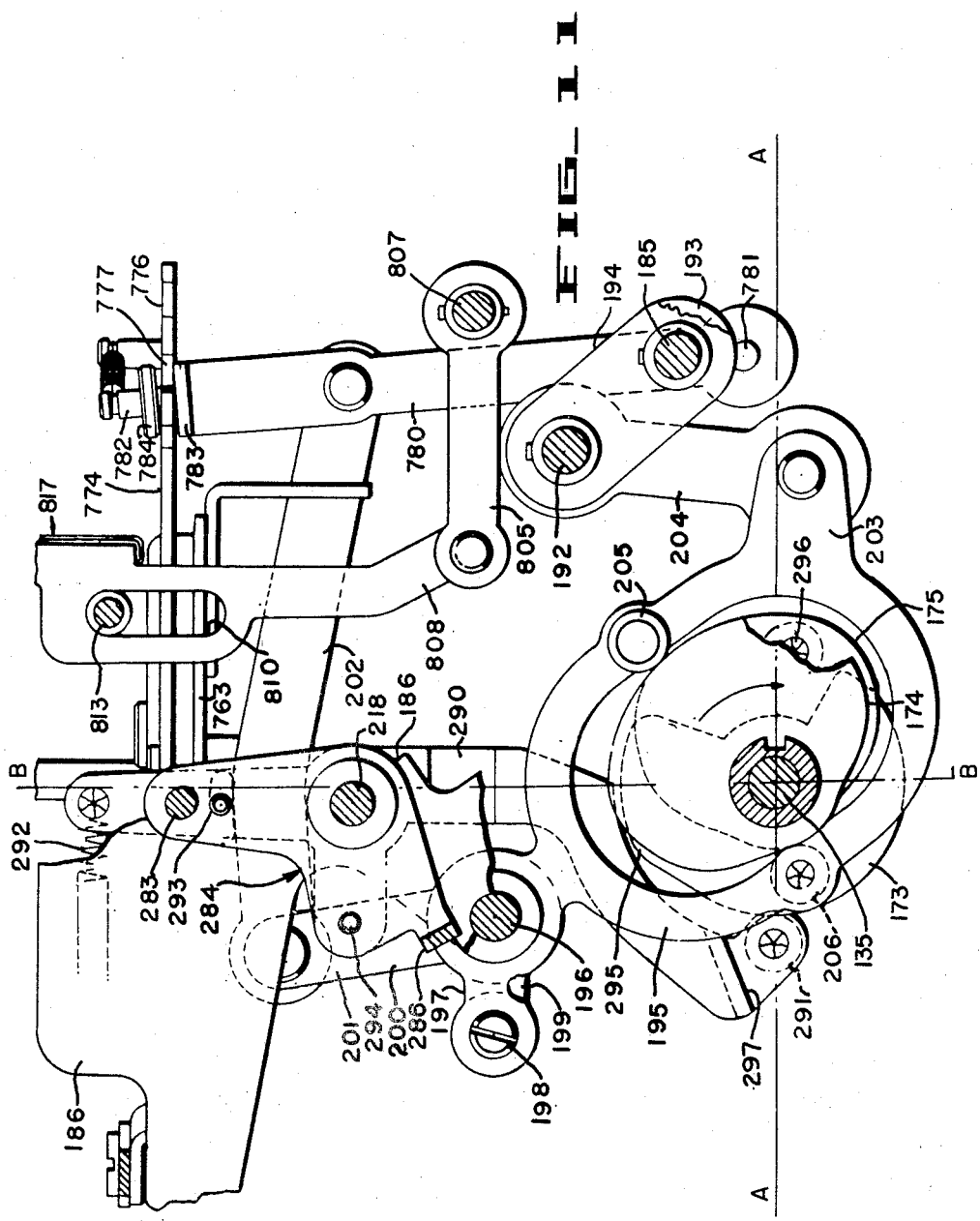

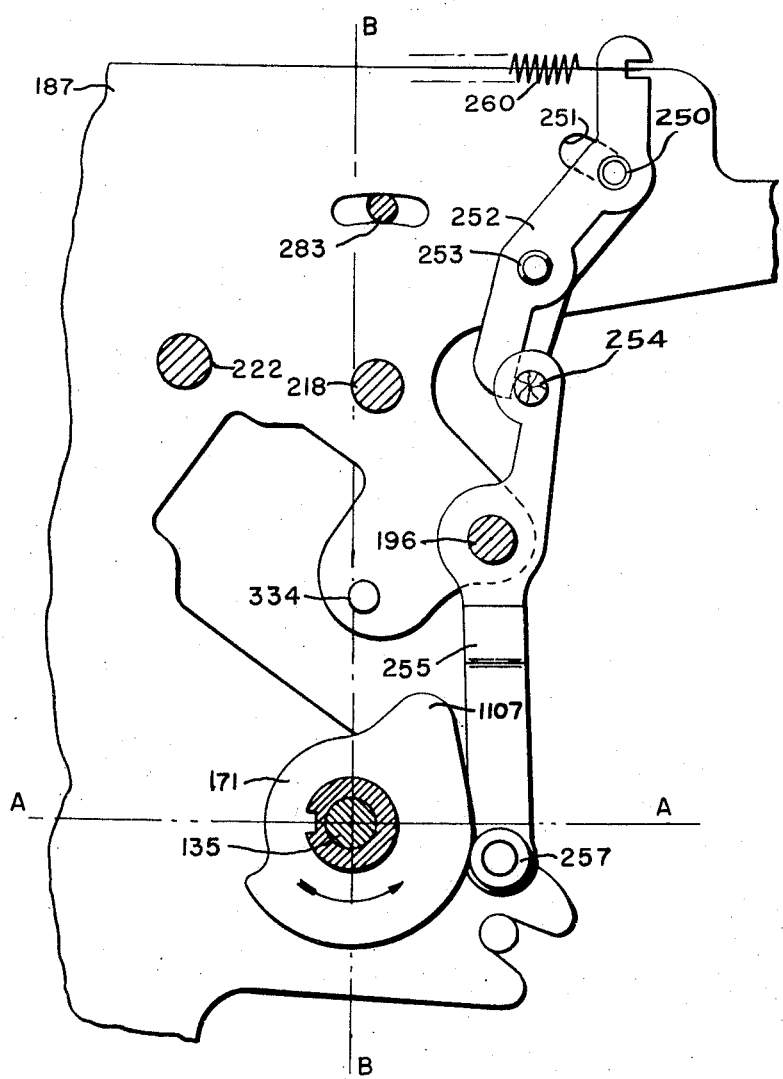

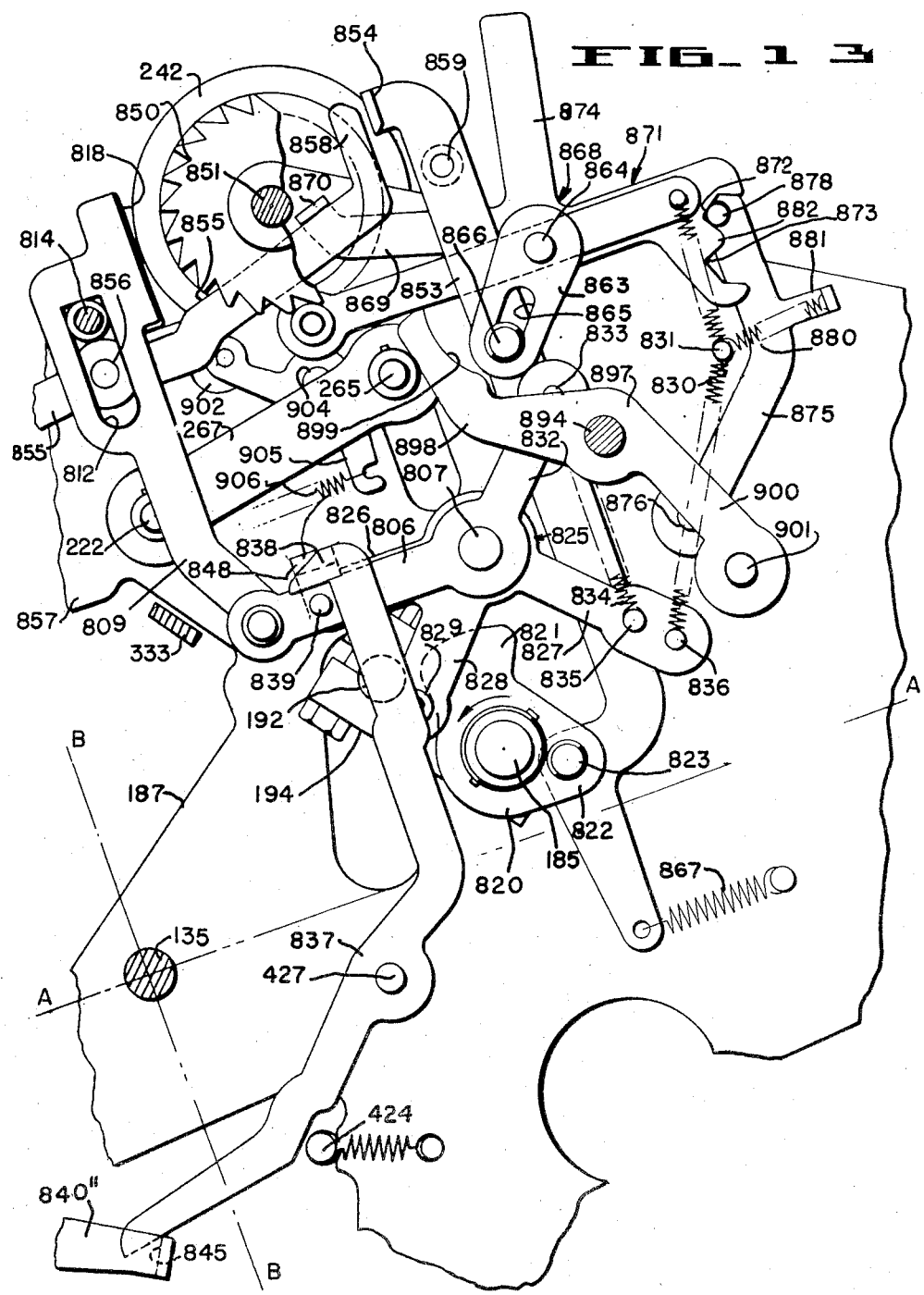

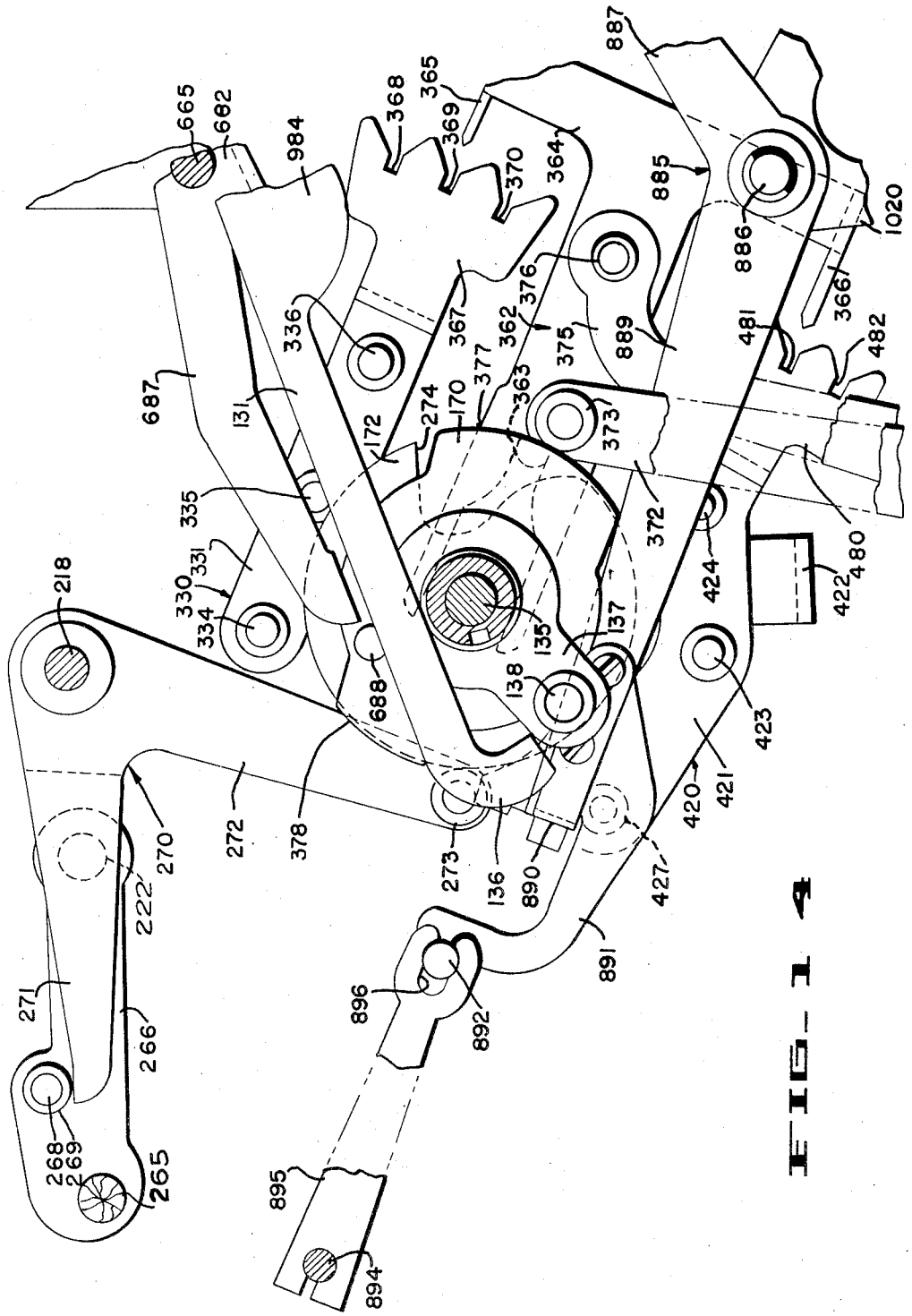

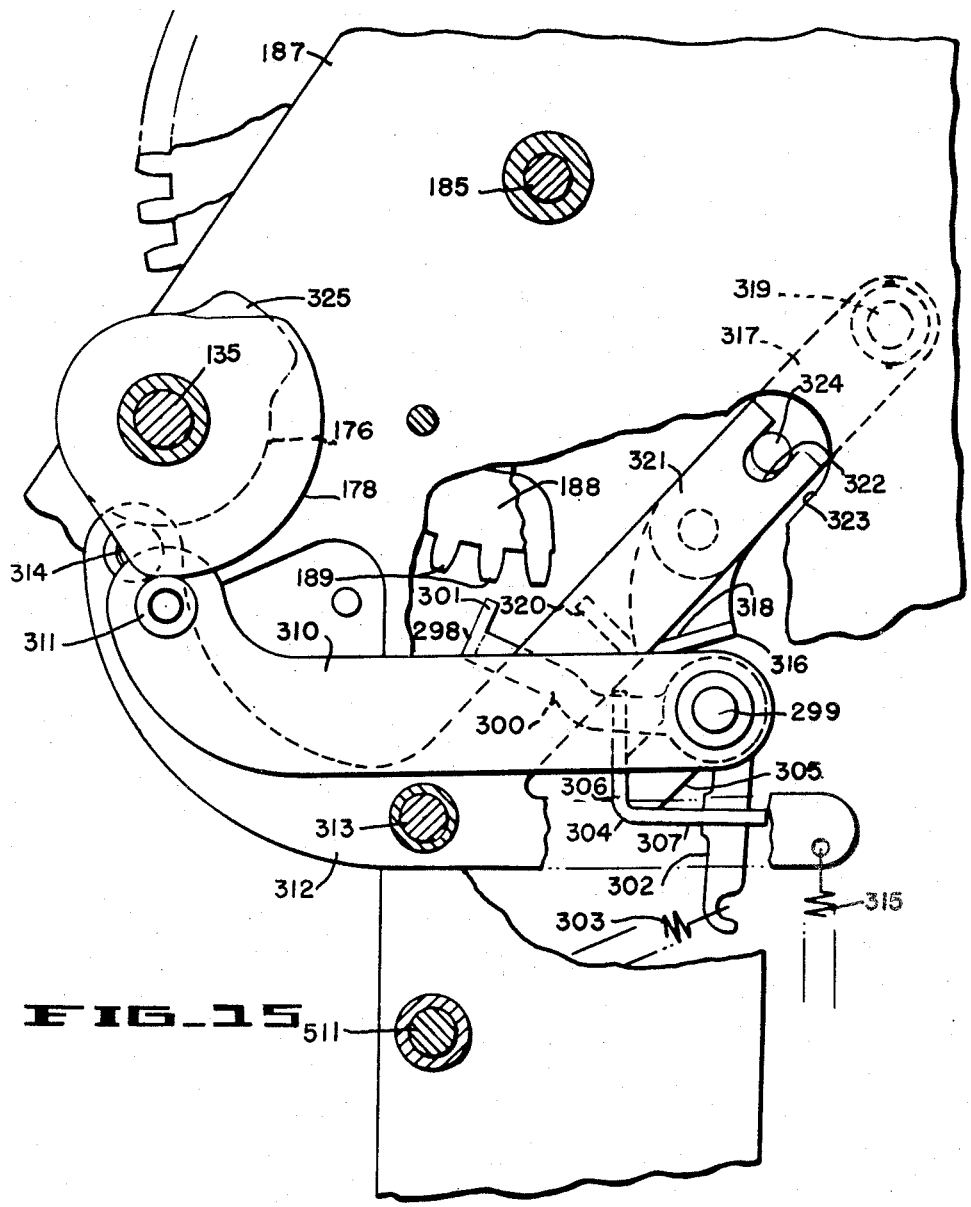

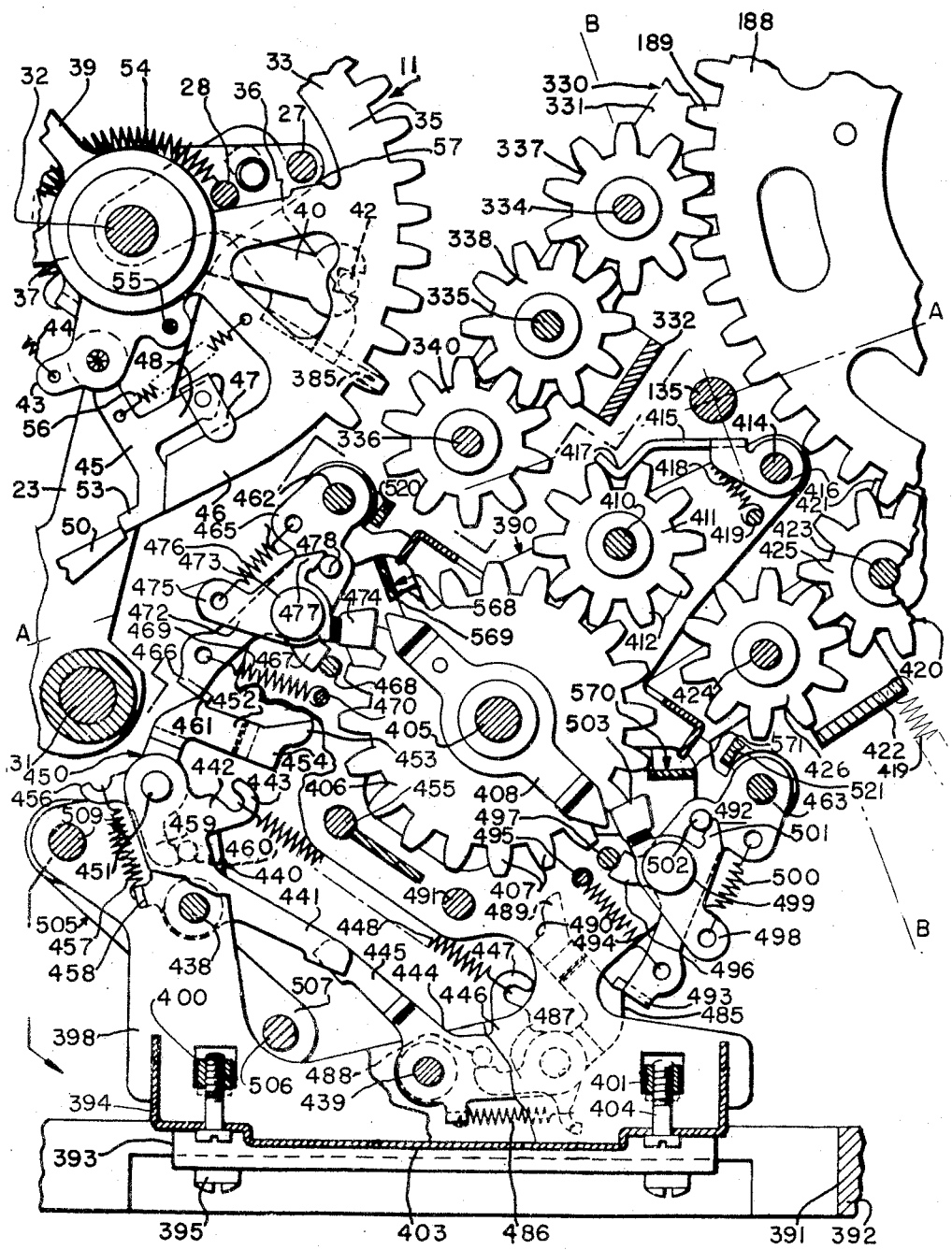
FIG_16

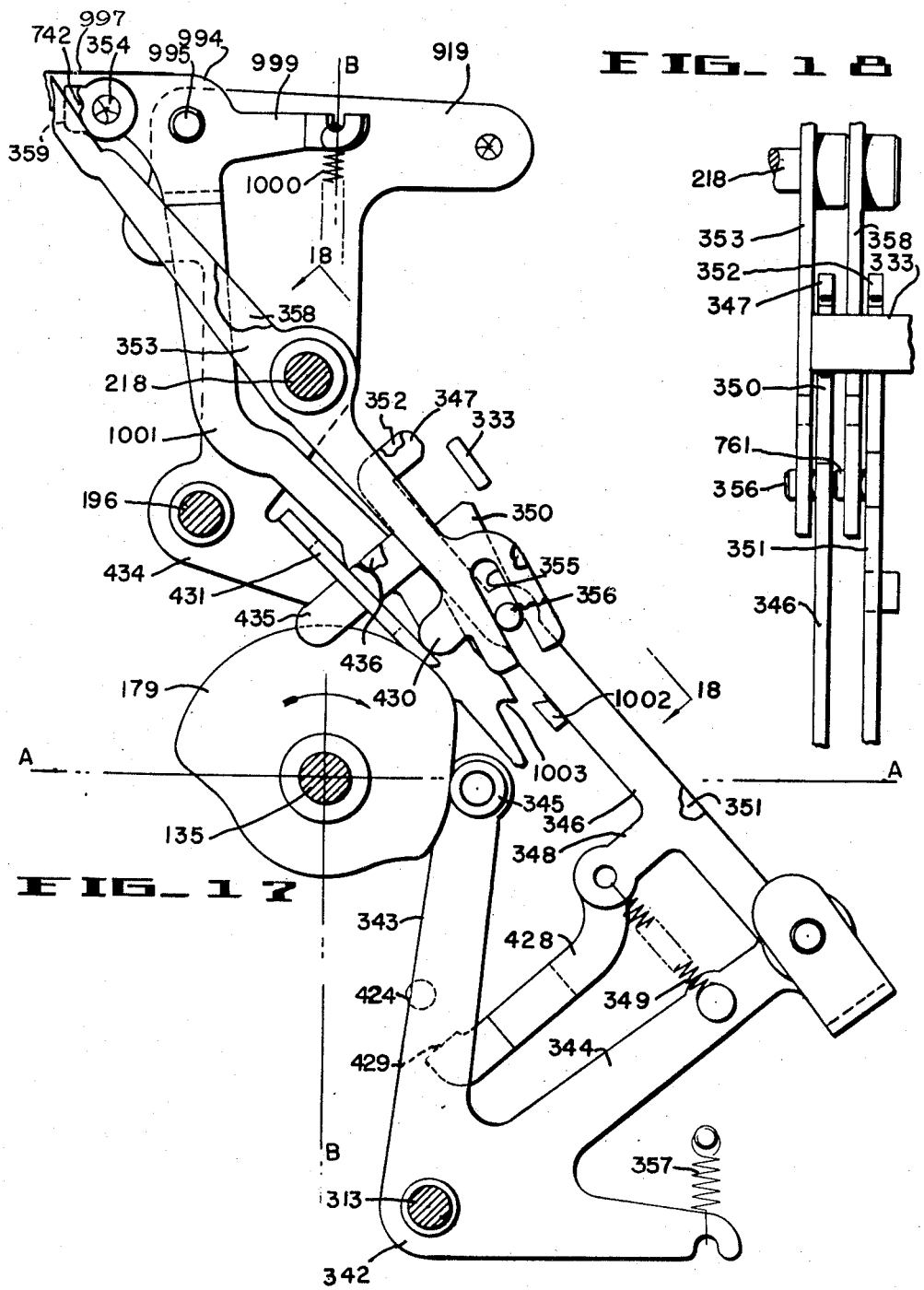

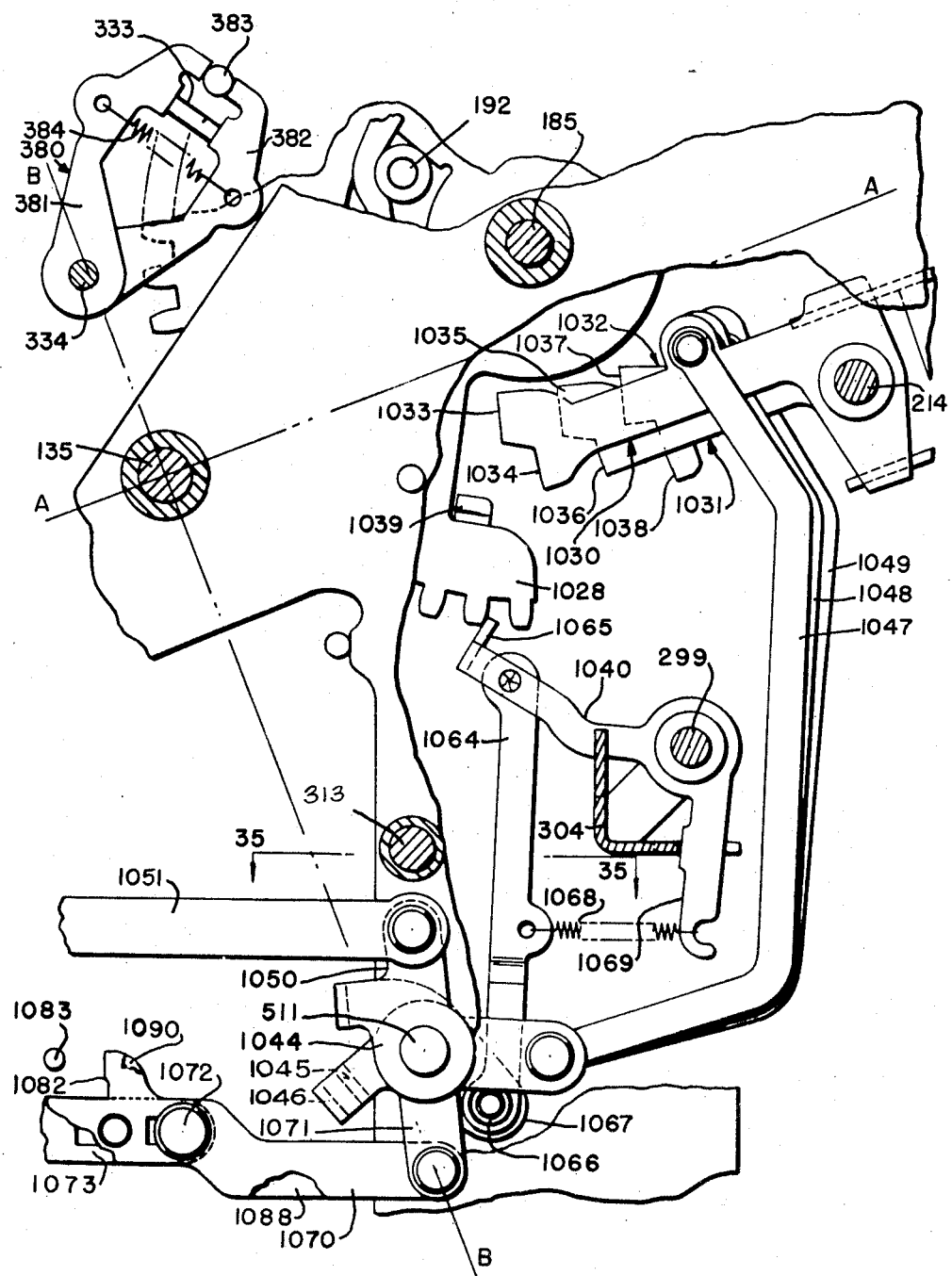
FIG_19

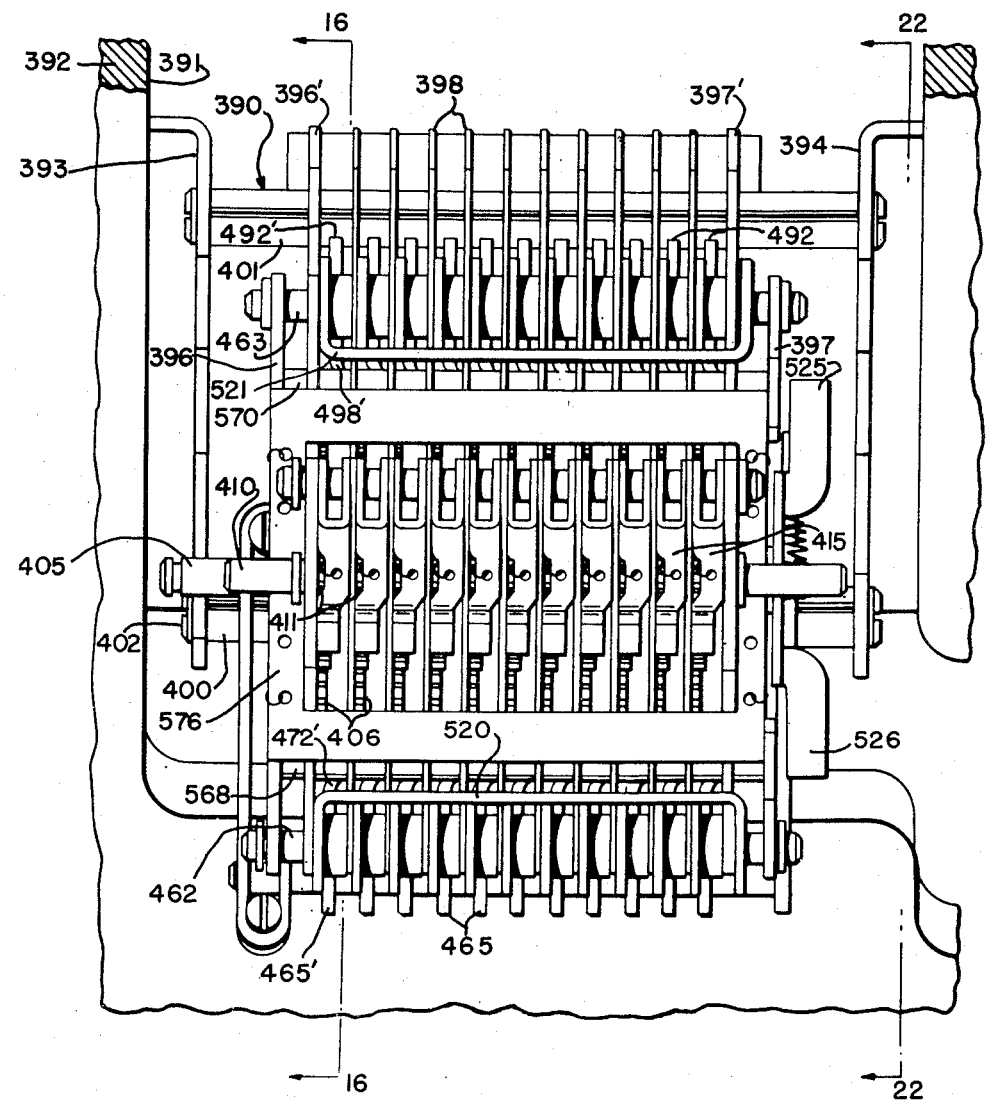
FIG_20

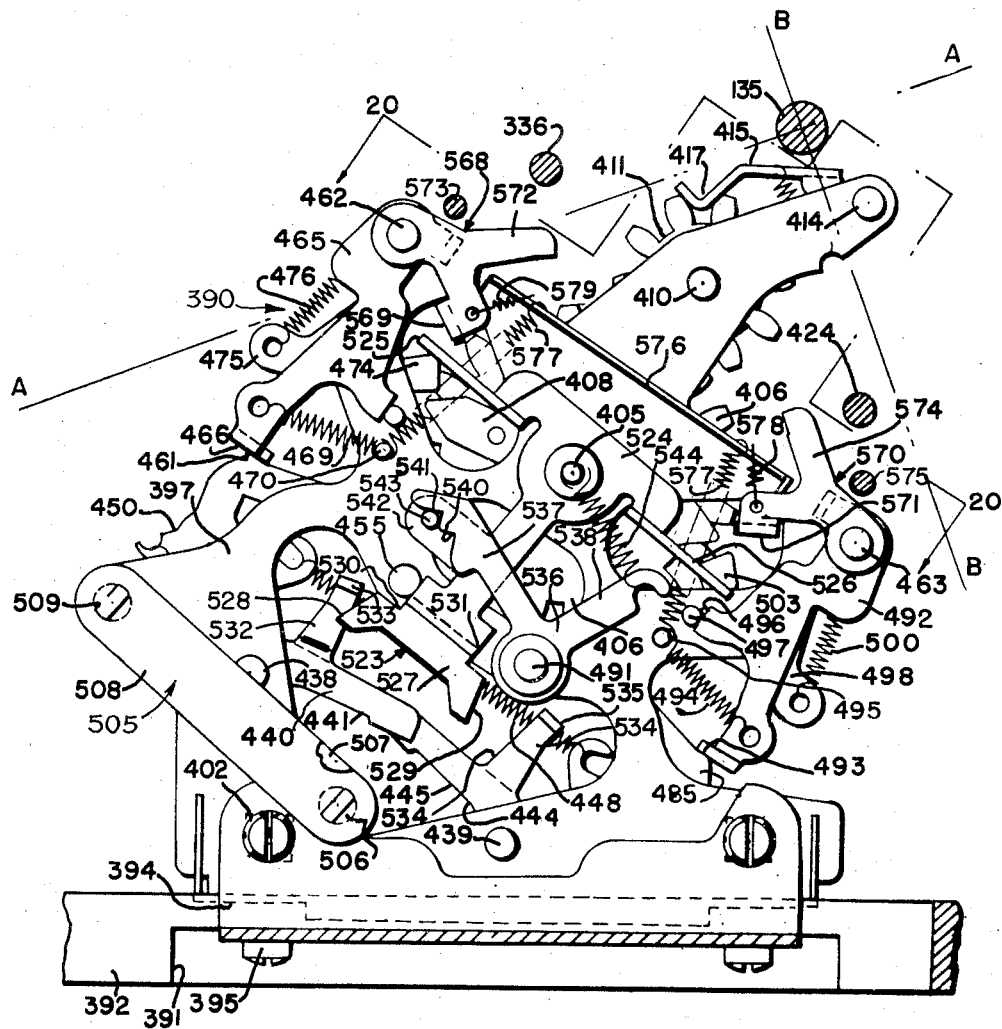
FIG_22

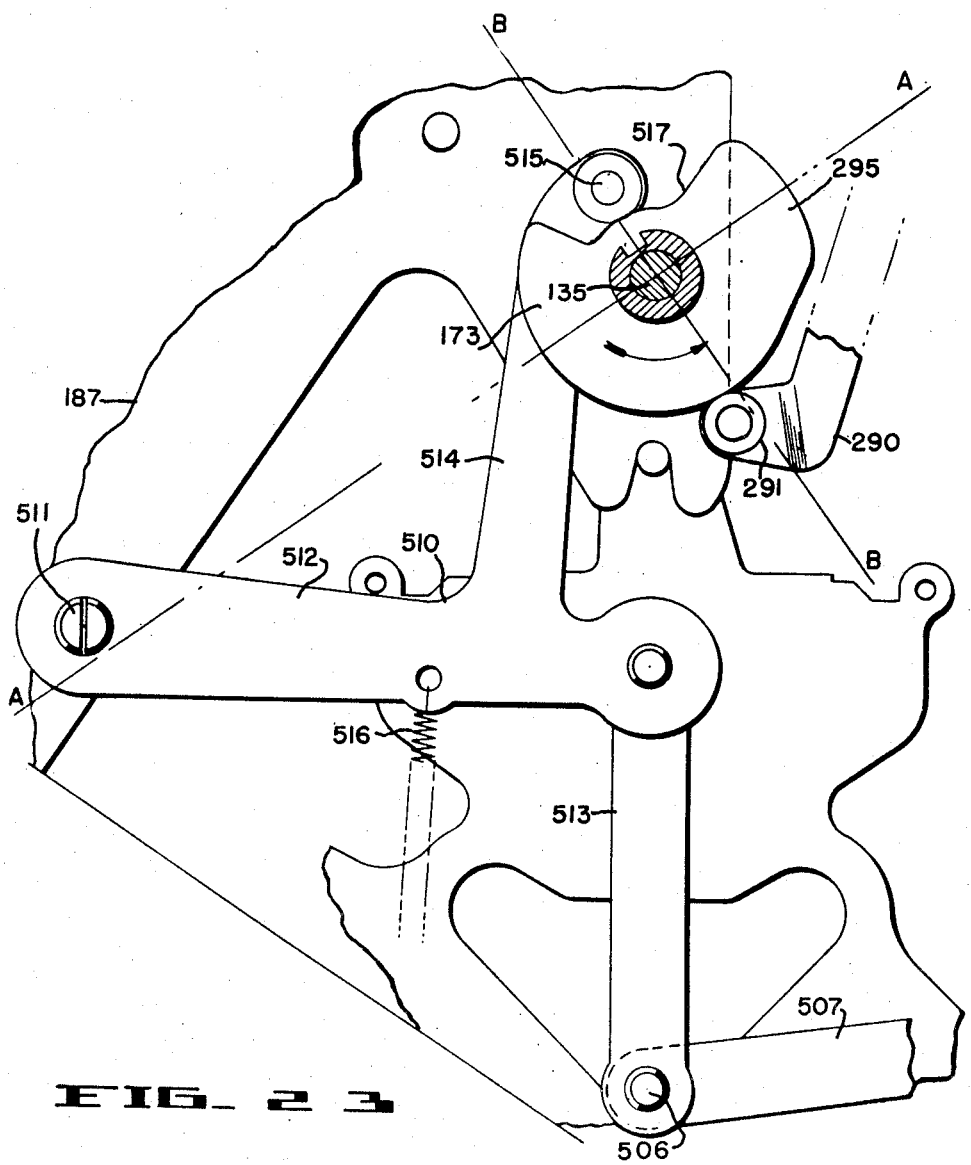

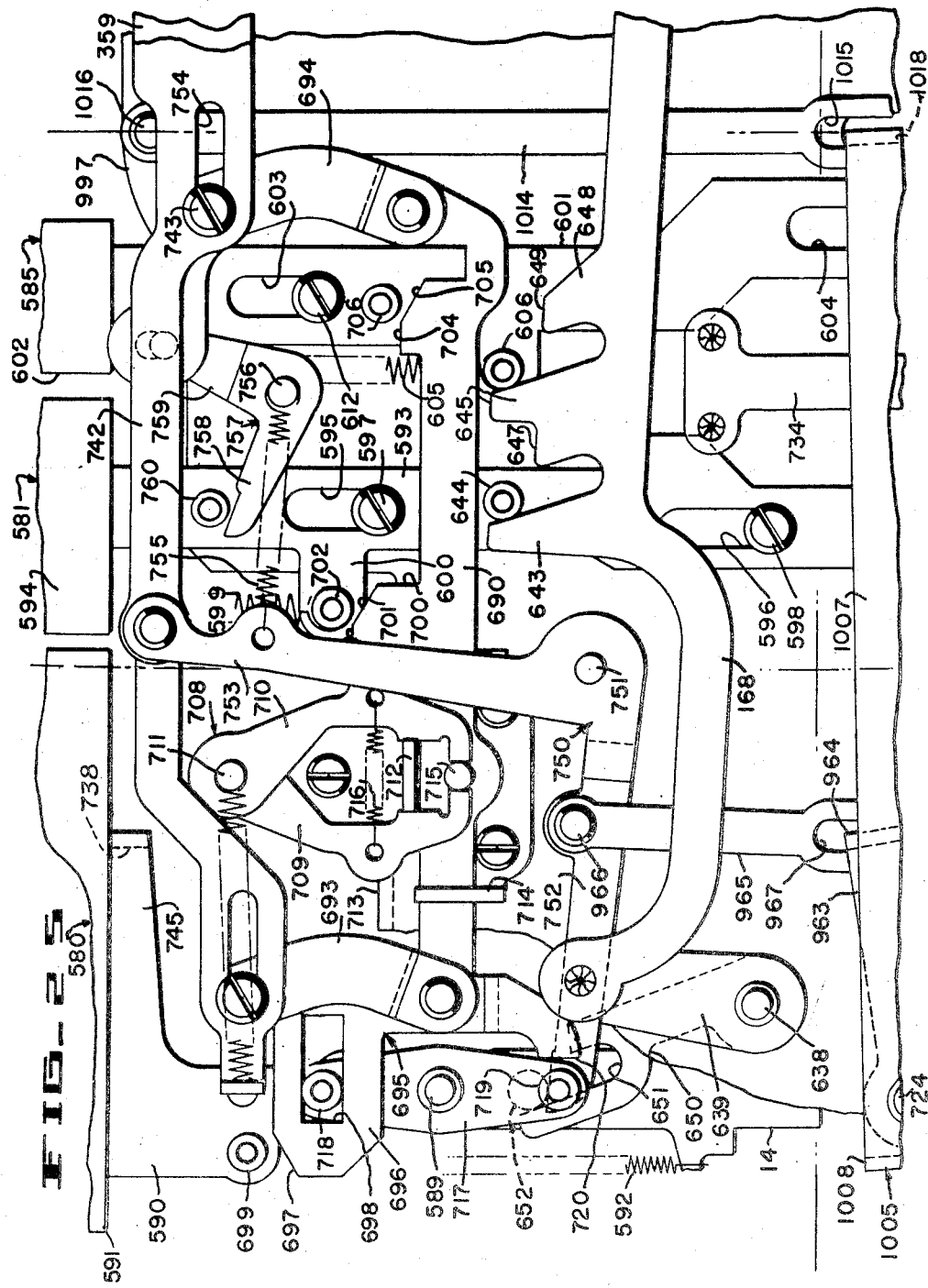

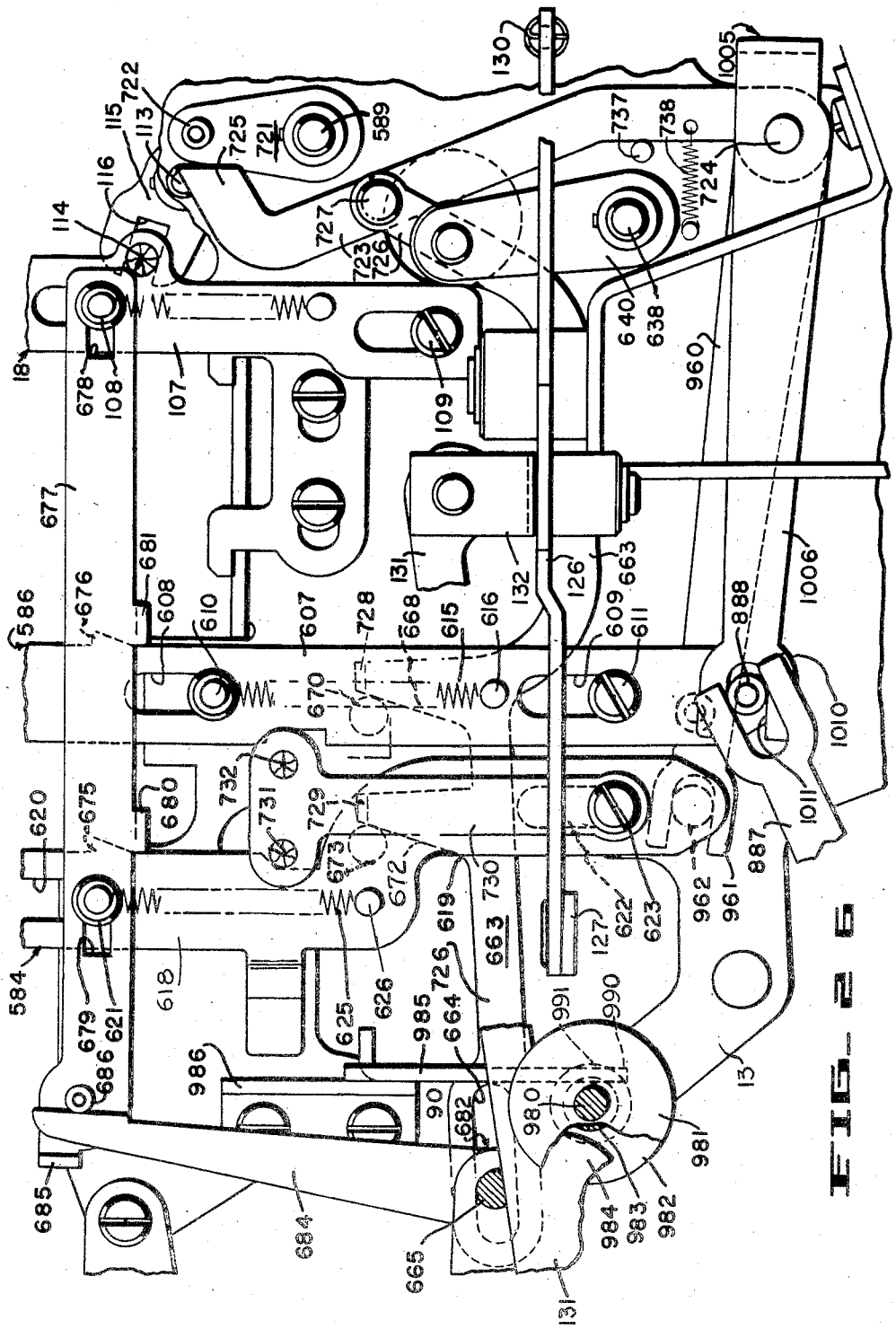

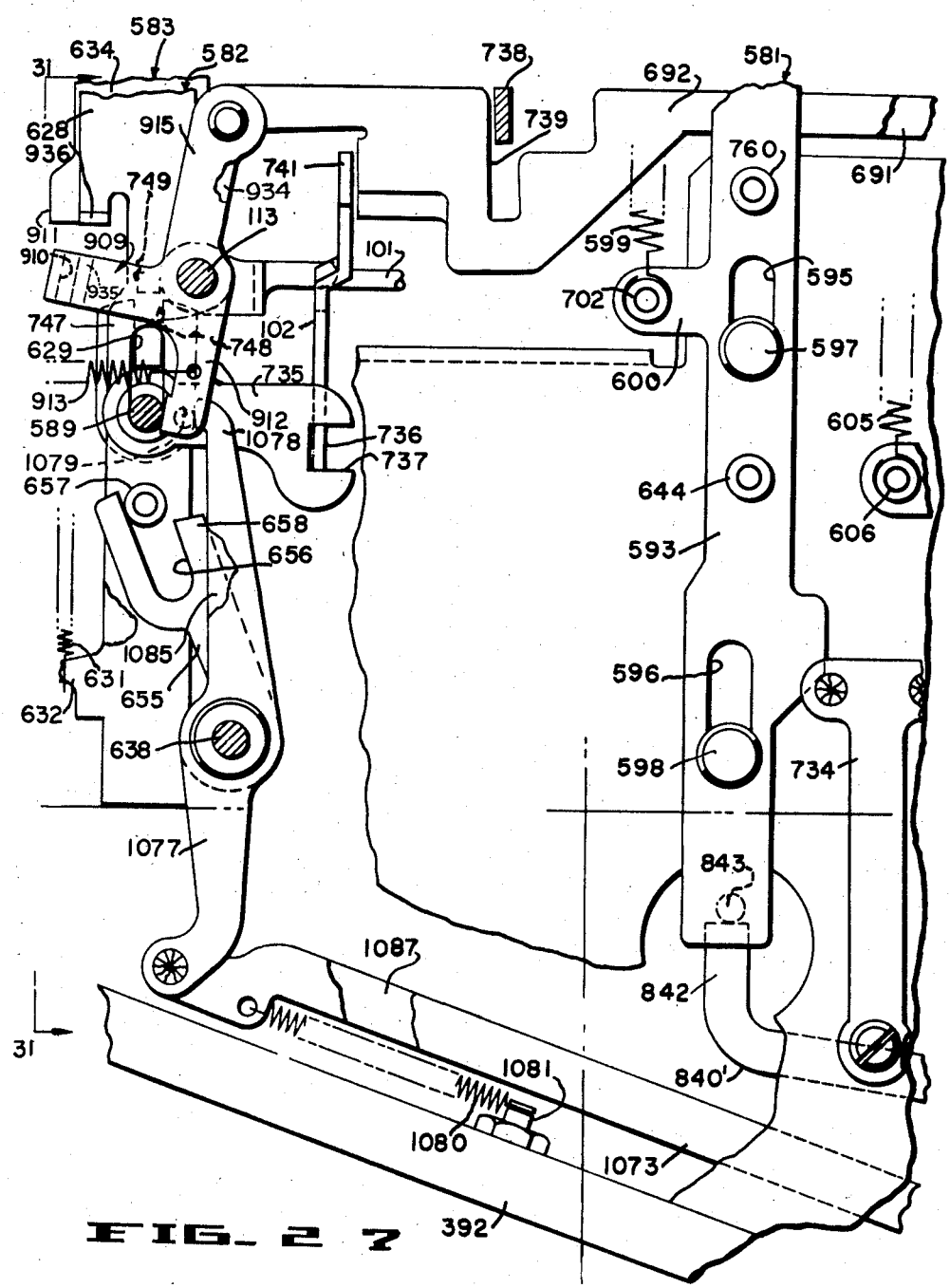
FIG_27

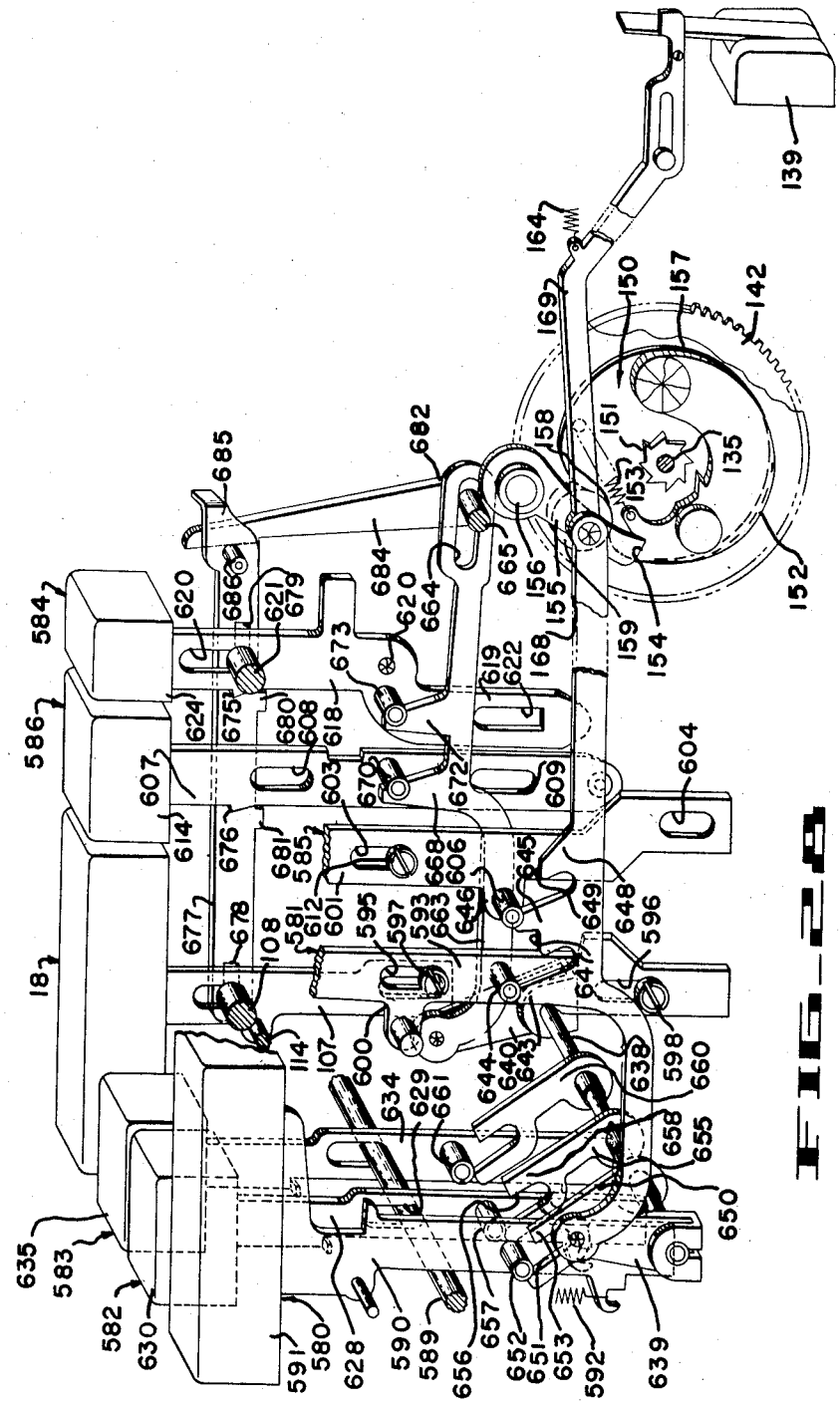

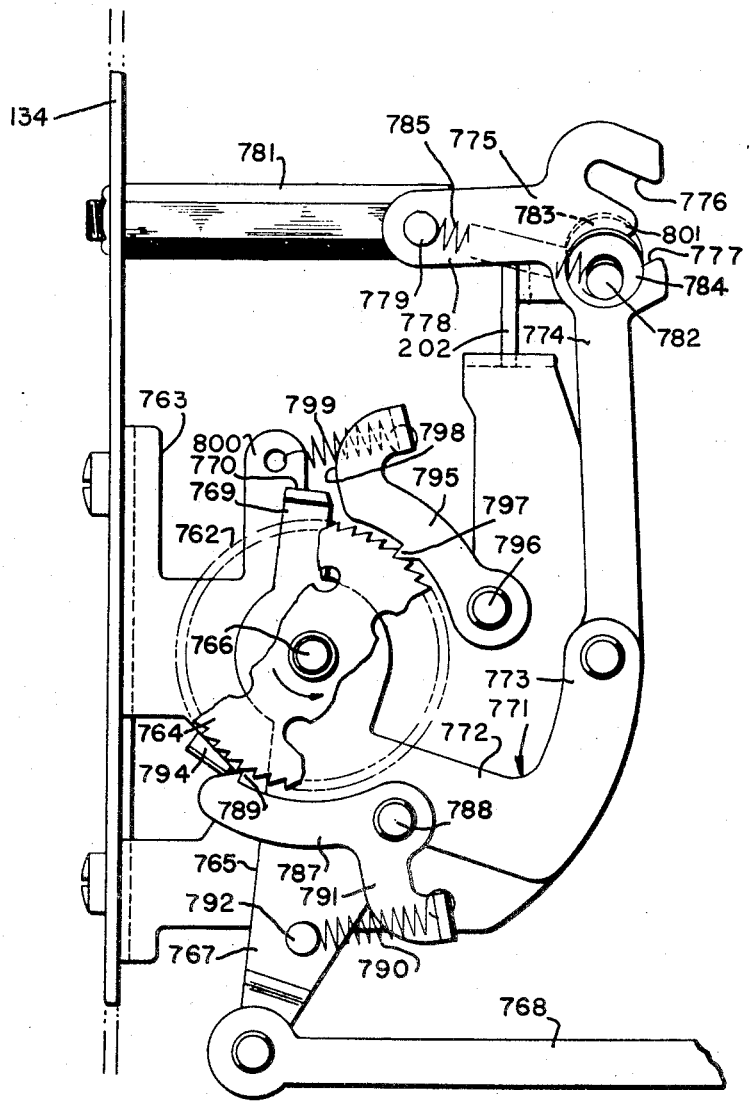
FIG_30

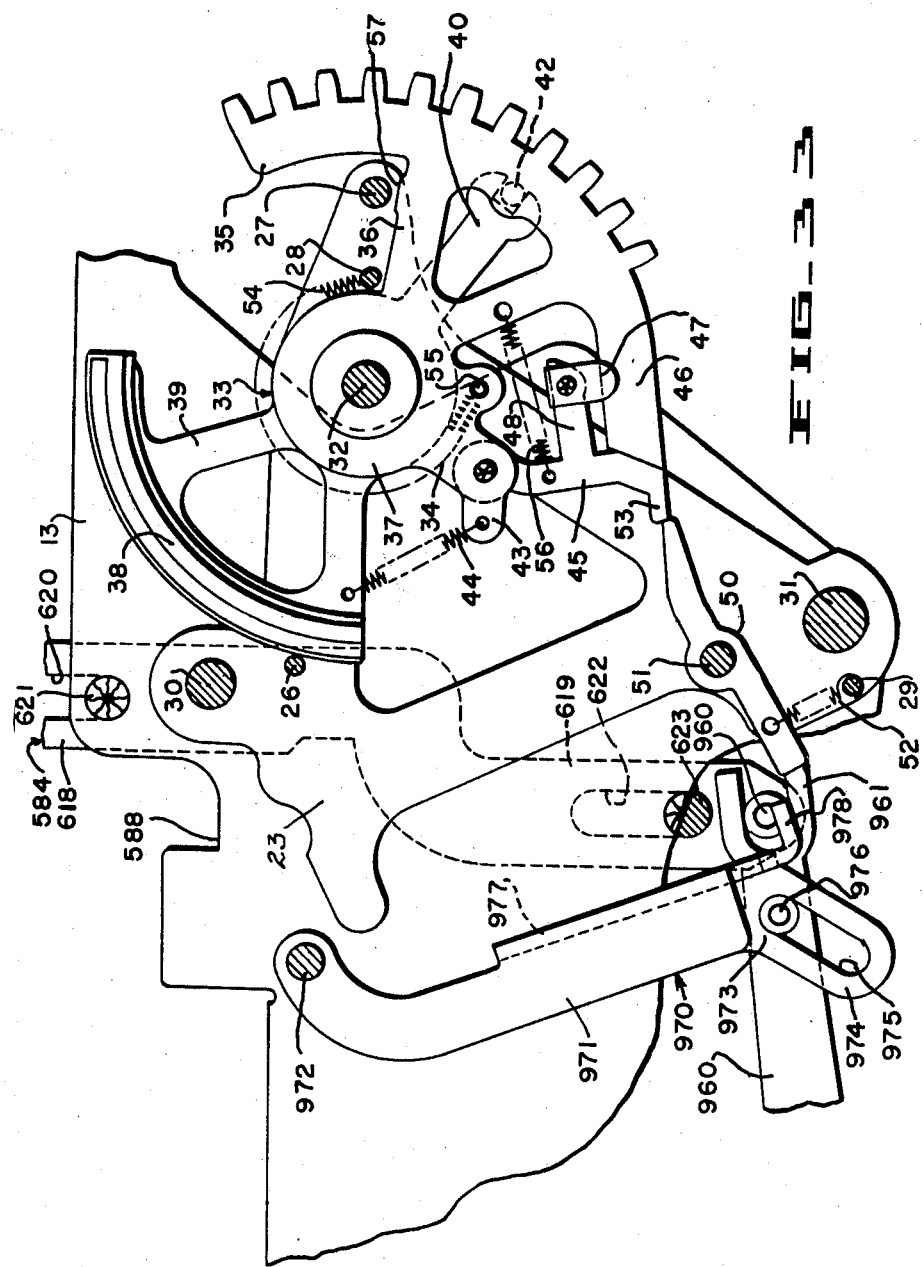

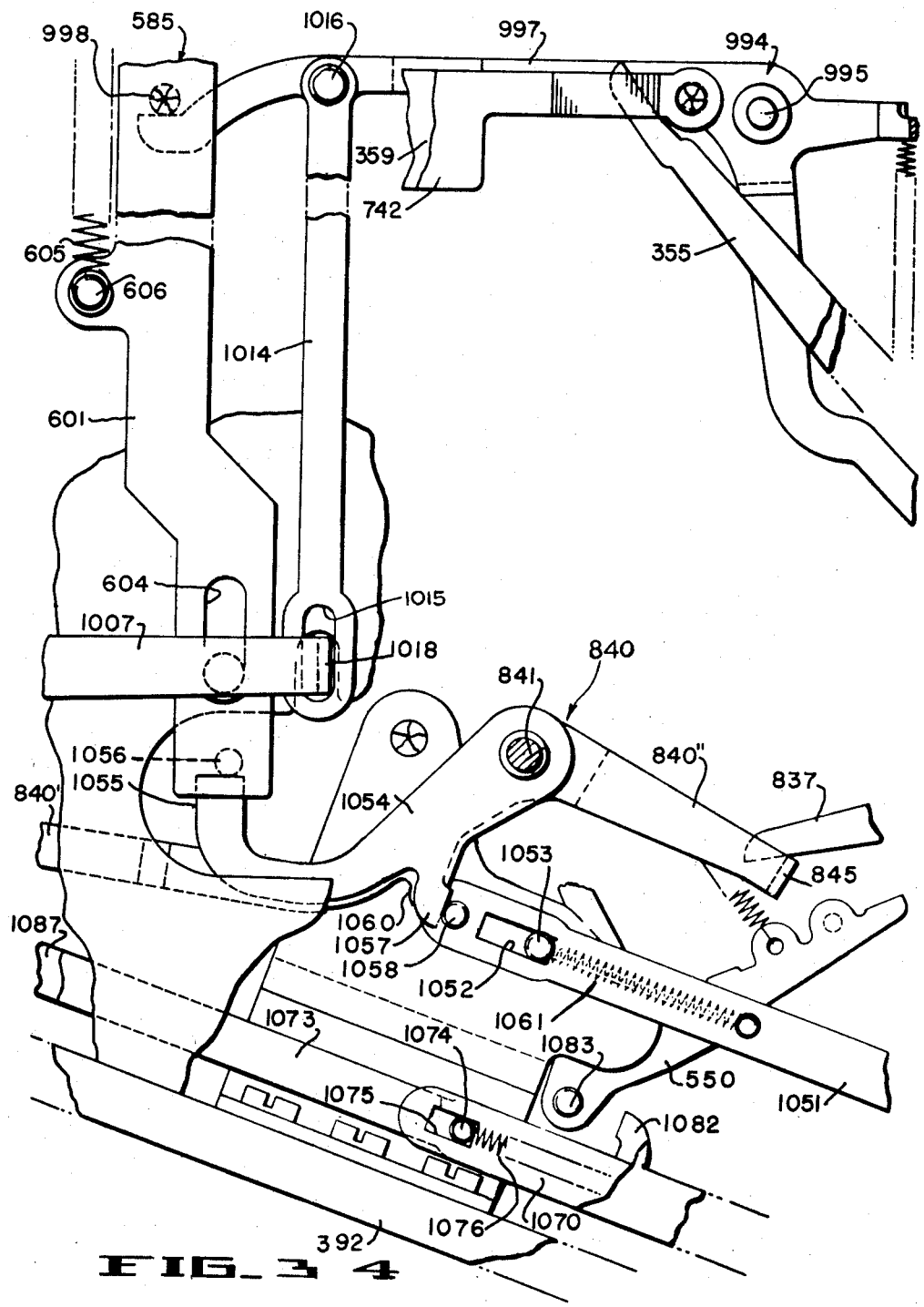

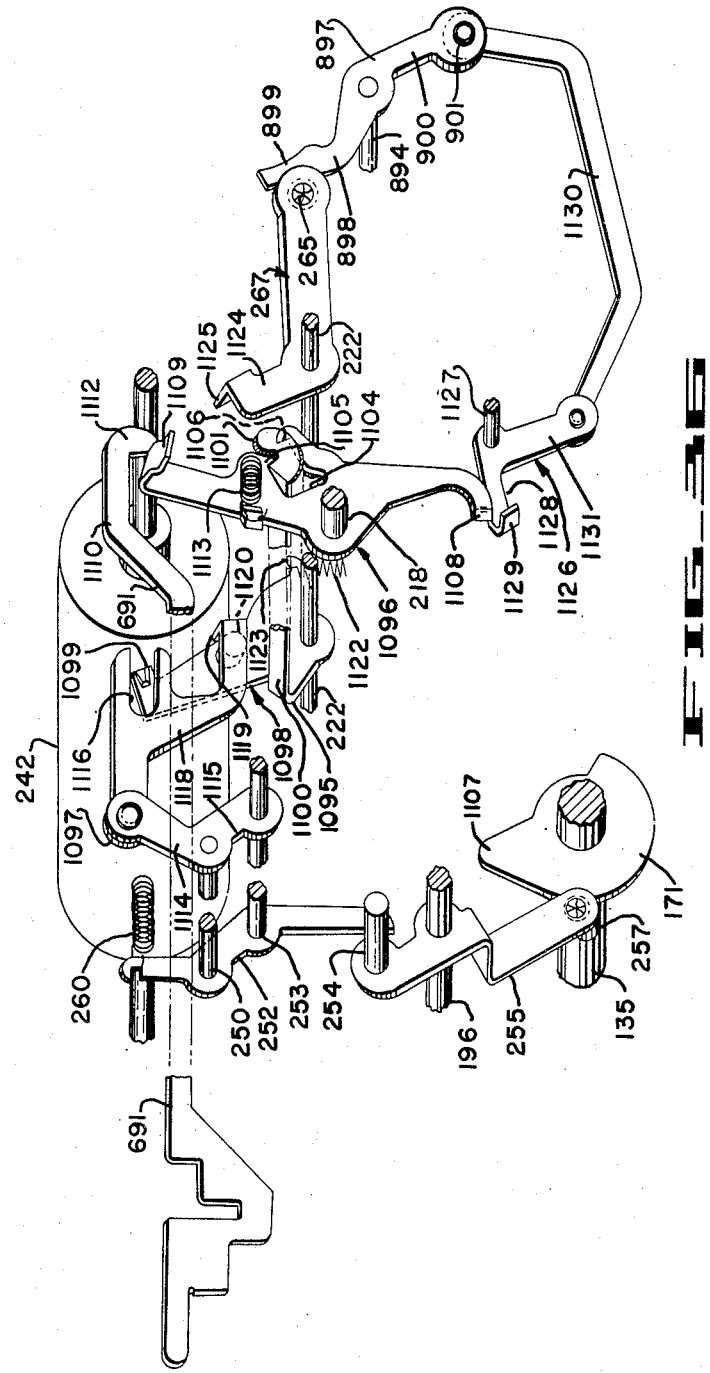

United States Patent Office 2,832,530
Patented Apr. 29, 1958

2,832,530

VALUE SELECTING AND TRANSMITTING MECHANISM FOR LISTING ADDING MACHINE

Harold J. Chall, San Leandro, Calif., assignor to Friden, Inc., a corporation of California Application January 29, 1954, Serial No. 407,016

9 Claims. (Cl. 235—60)

INDEX

|  | Column |
|---|---|
| A. Selection mechanism | 7 |
|    1. Keyboard mechanism | 7 |
|    2. Selector mechanism | 8 |
|    3. Escapement mechanism | 11 |
|    4. Zero key mechanism | 12 |
|    5. Stop pin retracting mechanism | 13 |
|    6. Shiftable selector unit return mechanism | 13 |
| B. Power cycle mechanism | 14 |
|    1. Speed reducing gear train | 14 |
|    2. Single rotation clutch | 14 |
|    3. Cam and cam shaft assembly | 15 |
| C. Actuating mechanism | 15 |
| D. Printing mechanism | 17 |
|    1. Print wheels and gear mechanism | 17 |
|    2. Zero foil latch mechanism | 18 |
|    3. Printing operation | 20 |
|    4. Actuator sector aligning and latching mechanism | 22 |
| E. Positive transmission gear mechanism | 24 |
|    1. Shifting mechanism for positive transmission gear mechanism | 25 |
|    2. Locking mechanism for positive gear transmission | 26 |
| F. Accumulator mechanism | 28 |
| G. Negative transmission gear mechanism | 30 |
| H. Tens-carrying mechanism of the accumulator | 32 |
| I. "Fugitive 1" addition and subtraction mechanism | 36 |
| J. Algebraic sign sensing mechanism of the accumulator | 38 |
| K. Accumulator conditioning mechanism for total and subtotal printing | 40 |
| L. Control key mechanism (control keys) | 42 |
|    1. Mechanism connecting the control keys to the power cycle clutch and motor switch | 44 |
|    2. Blocking interlock between keyboard value keys and control keys | 47 |
| M. Addition cycle | 51 |
| N. Subtraction cycle | 53 |
| O. Ribbon mechanism | 55 |
|    1. Ribbon supporting and feeding mechanism | 55 |
|    2. Ribbon shifting mechanism | 57 |
| P. Tape feed mechanism | 59 |
| Q. Subtotal printing cycle | 61 |
| R. Total printing cycle | 63 |
| S. Repeated addition cycle | 65 |
| T. Print only cycle | 67 |
| U. Keyboard clearing cycle | 68 |
| V. Symbol printing mechanism | 70 |
| W. Clear signal printing mechanism | 73 |
|    1. Operation of the clear signal symbol printing mechanism | 75 |

This invention relates to automatic calculating machines and more particularly to a ten-key adding machine, the present disclosure constituting a continuation-in-part of my application S. N. 354,151, filed May 11, 1953, for "Calculating Machine," now abandoned.

It is among the objects of the present invention to provide an improved ten-key adding or calculating machine of improved and simplified construction which is rapid in operation and has an operating cycle corresponding to a single rotation of its main drive shaft; which has visible entry dials so that an entry can be checked for correctness before being printed or added into the accumulated total carried by the machine and has means for clearing an incorrect value from the machine before such incorrect value is printed or accumulated; which simultaneously reads out all orders of an entry value for printing and accumulation; which provides for the additive or subtractive accumulation of entry values and carries the true positive or negative total of values additively or subtractively accumulated therein; which prints in readily distinguishable different colors for additive or positive values and subtractive or negative values and distinguishes printed entry values from printed total or subtotal values by increased spacing of the print lines after the total and subtotal values as well as by the printing of appropriate symbols; which will read out and print a total or subtotal value at any time following an entry cycle and leaves the machine in a cleared condition at the end of a total printing cycle and with the accumulated total left in the machine at the end of a subtotal printing cycle; which can be operated to repetitiously enter the same value into the printing mechanism and accumulator any desired number of times without re-entry of the value into the selector mechanism of the machine and to print a value without accumulating it; which prints appropriate symbols indicating the nature of a printed item and automatically senses the algebraic sign of a total or subtotal value; which prints a symbol following a total printing cycle indicating that the machine has been cleared of accumulated values; which utilizes a single bidirectional accumulator mechanism for the accumulation of both additive and subtractive values; and which includes mechanism precluding the operation of more than one control key at a time or the simultaneous operation of a control key and digitation key to thereby eliminate the probability of machine errors and protect the mechanism of the machine from damage.

Other objects and advantages will become apparent from a consideration of the following description and the appended claims in conjunction with the accompanying drawings wherein:

Fig. 3 is a fragmentary cross-sectional view on an enlarged scale on the line 3—3 of Fig. 2;

Fig. 4 is a fragmentary cross-sectional view on the line 4—4 of Fig. 3;

Fig. 5 is a fragmentary perspective view of the zero key stem and mechanism actuated thereby;

Fig. 6 is a plan view of a portion of the mechanism shown in Fig. 2 particularly illustrating the return mechanism for the shiftable selector unit of the machine;

Fig. 7 is a view of the speed reducing gear train of the machine from the motor shaft to the cam shaft clutch, such speed reducing gear train being located at the right-hand side of the machine;

Fig. 8 is a front elevational view showing the machine cam shaft, the cams carried by the cam shaft, the location of the various cams along the cam shaft, and the form in plan view of the various cams;

Fig. 10 is a side elevational view of one of the actuator sectors fragmentarily illustrated in Fig. 9;

Fig. 11 is an elevational view of the actuator sector trail and lead cams, a print controlling cam and tens-carrying accumulator operating cam, and the mechanisms operated by these several cams;

Fig. 12 is a left side elevational view of the zero foil releasing cam for the printing mechanism and the mechanisms operated by this cam;

Fig. 13 is a general illustration of the ribbon shifting and tape feeding mechanism of the machine;

Fig. 14 is an elevational view from the left-hand side of the machine showing the crank for operating the return mechanism of the shiftable selector unit, the positive and negative transmission gear locking cam, the crank pin for releasing the control keys at the left-hand side of the keyboard and the print controlling cam together with the mechanisms operated by the several cams;

Fig. 15 is an elevational view from the right-hand side of the machine showing the mechanism for aligning the actuator sectors of the machine in proper rotational position for the printing operation and means for releasably locking the actuator sectors in properly aligned condition during the printing operation;

Fig. 16 is a cross-sectional view of the accumulator, the positive gear transmission mechanism, the negative gear transmission mechanism, and the immediately associated parts of the machine, the view being taken approximately on the section line 16—16 of Fig. 20;

Fig. 17 is a side elevational view looking from the right side of the machine of the means operated by the addition and subtraction keys for controlling the shifting of the positive and negative transmission gear mechanisms;

Fig. 18 is a fragmentary top plan view of the mechanism shown in Fig. 17 looking from a plane indicated by the section line 18—18 of Fig. 17;

Fig. 19 is a fragmentary longitudinal cross-sectional view of the machine showing in elevation the mechanism which controls the positioning of the symbol printing wheels of the printing mechanism of the machine;

Fig. 20 is a plan view on an oblique plane of the accumulator unit of the machine, such plane being indicated by the section line 20—20 of Fig. 22;

Fig. 21 is a fragmentary front elevational view of the accumulator mechanism shown in Fig. 22;

Fig. 22 is a side elevational view of the accumulator unit looking from a plane indicated by the line 22—22 of Fig. 20;

Fig. 23 is a left side elevational view of the cam and associated mechanism for controlling the operation of the tens-transfer mechanism of the accumulator;

Fig. 25 is an elevational view from the right-hand side of the machine showing the control keys at the right-hand side of the machine keyboard, the machine cycle initiating mechanism controlled by these control keys and the blocking means precluding the depression of more than a single selected control key at one time;

Fig. 26 is a side elevational view from the left-hand side of the machine showing the control keys at the left-hand side of the machine, the mechanism actuated by these control keys for initiating operating cycles of the machine and the mechanism for precluding simultaneous depression of more than one control key;

Fig. 27 is a longitudinal cross-sectional view of the machine showing in elevation the total and subtotal control keys mounted at the front end of the machine keyboard together with the mechanism operated by these keys for initiating operating cycles of the machine and mechanism for blocking the simultaneous depression of two or more control keys;

Fig. 28 is a somewhat diagrammatic perspective view showing the several control keys, the cam shaft clutch and the motor controlling switch, and the mechanism operated by the control keys for closing the motor switch and conditioning the clutch for a single rotation of the cam shaft whenever any one of the control keys is depressed;

Fig. 29 is a fragmentary cross-sectional view on the line 29—29 of Fig. 2 showing in detail a portion of the blocking mechanism operated by the numeral selection keys of the keyboard and the zero key;

Fig. 30 is a fragmentary top plan view showing the left-hand portion of the ribbon winding mechanism of the machine;

Fig. 31 is a fragmentary elevational view looking from the line 31—31 of Fig. 27;

Fig. 33 is a fragmentary longitudinal cross-sectional view of the machine showing in elevation the right-hand end of the shiftable selector unit of the digitation mechanism and a zero latch blocking bail actuated by the repeat addition control key of the machine to prevent relatching of the selector sectors in their zero settings while the machine is undergoing repeat addition operations;

Fig. 34 is a fragmentary side elevational view from the right-hand side of the machine showing the print only control key stem at the right-hand side of the machine keyboard and the mechanism operated by the print only control key;

Fig. 35 is a fragmentary cross-sectional view on the line 35—35 of Fig. 19; and

Fig. 36 is a somewhat diagrammatic perspective view illustrating the clear signal symbol printing mechanism of the machine which mechanism operates to print a clear signal symbol on the printing tape following a machine clearing, total printing cycle.

In Figs. 7, 9, 11, 12, 13, 16, 17, 19, 22, 23 and 24, a broken line A—A, indicating a plane parallel to the plane of the keyboard of the machine, has been drawn through the axis of the main or cam shaft of the machine, and a second line B—B has been drawn through the axis of the cam shaft perpendicular to the line A—A and indicates a second reference plane perpendicularly intersecting the plane indicated by the line A—A along the axis of the cam shaft.

Figure 1:
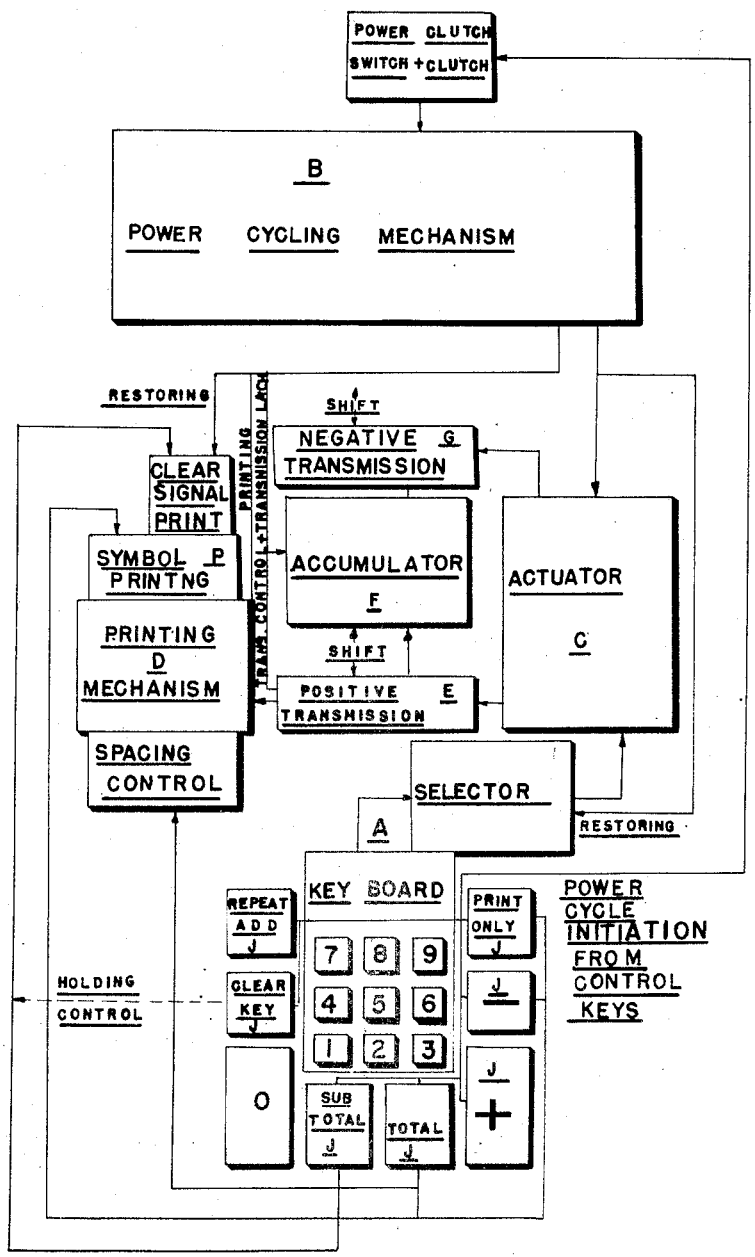
Fig. 1 is a diagrammatic illustration of the adding machine.

With continued reference to the drawings and particularly to Fig. 1, the adding machine of the present invention comprises, in addition to a suitable base, a suitable mechanism supporting framework and a mechanism cover, selection mechanism A including a ten-key keyboard and a selection device having selector racks which are sequentially set to selected values from the highest to a lower order corresponding to values entered therein by manual depression of selected keys of the keyboard. It also comprises a printing mechanism D, and accumulator F, a power driven actuator C controlled by the selection device, power cycling mechanism B, a positive transmission E which drivingly connects the actuator with the printing mechanism at all times and alternatively connects the actuator with the selector mechanism or the accumulator, a negative transmission G which at times connects the actuator to the accumulator, and a set of control keys J including an addition key, a subtraction key, a subtotal key, a total key, a print only key, a keyboard clearing key and a repeat addition key, all as diagrammatically indicated in Fig. 1.

The power cycling device includes a motor driven cam shaft carrying a plurality of mechanism actuating cams and transmission means between the motor and the cam shaft effective to turn the cam shaft through one complete rotation and bring it to a stop each time a control key of the machine is operated.

The positive and negative transmissions each have a neutral position and one transmission always occupies its neutral position while the other is in its operative position and both are bidirectionally operative to either transmit values from the selector mechanism to the accumulator or to transmit values from the accumulator to the printing mechanism.

The selector includes a unit laterally shiftable relative to the actuator and accumulator under control of an escapement mechanism as values are entered therein so that the digits of a value of any number of digits within the capacity of the selector are simultaneously transmitted through the actuator to the printing mechanism and the accumulator upon the operation of any one of the addition, repeat addition or subtraction control keys.

Before operation of a value transmitting control key, a value can be cleared from the selector by operation of the keyboard clearing key without printing and without changing the total in the accumulator or feeding the printing tape.

The printing mechanism includes a paper tape on which the values are printed and an ink carrying ribbon which is preferably divided longitudinally into two portions of different colors. There is a tape feeding mechanism provided with a spacing adjustment which is effective to feed the tape in single space steps while entry values are being entered into the machine and printed and when a value is printed without entry into the machine accumulator, to double space the tape feed whenever a "total" or "subtotal" value is printed to thereby clearly offset the total and subtotal figures from the following column of entry value figures on the tape, and to interrupt tape feeding when the keyboard clearing key is depressed. There is also a ribbon shift means which is effective to position the ribbon in one color position when a positive or additive quantity is printed and in a different color position when a negative or subtractive quantity is printed and means are provided for winding the ribbon back and forth between spaced-apart ribbon spools.

The actuator includes a plurality of sectors which are power oscillated to accomplish an advance stroke and a return stroke each time a control key is operated. On the advance stroke the actuators are moved to an extent determined by the positioning of the associated selector elements by the keyboard keys and, on the return stroke, are moved to their home or full-cycle position. On their advance stroke the actuator segments transmit the selector values through the positive transmission to the printing mechanism, the printing ribbon being shifted in accordance with whether the addition or subtraction control key is operated. On their return stroke, the actuator segments transmit the value through either the positive or negative transmission to the accumulator in accordance with the operation of the addition or subtraction control key. The accumulator is operated in one direction by the positive transmission and in the opposite direction by the negative transmission and includes tens-transfer mechanism effective to transfer tens from any order to the next higher order in either direction of operation. The accumulator will thus accumulate both positive and negative values to a positive or negative total, as the case may be.

Because of mechanical requirements the positive zero setting of the accumulator is spaced one unit space from the negative zero setting with the consequence that when the positive zero setting is a series of zeros, the simultaneous negative setting is a series of nines and, conversely when the accumulator has a negative zero setting, the corresponding positive setting is a series of nines. Under these conditions, if the accumulator were at its positive zero setting and a unit digit were subtractively entered, this entry would move the negative setting from a series of nines to a series of zeros giving an erroneous total of zero. Likewise, if the accumulator is at its negative zero setting and a unit digit is additively entered, the positive setting would be changed from a series of nines to a series of zeros also giving an erroneous total. This error would always occur regardless of the value entries whenever the accumulator passed through a positive or negative zero setting following a change in its direction of operation.

This mechanical inaccuracy in the accumulator is compensated by a "fugitive 1" addition mechanism which adds a unit to the lowest order of the accumulator whenever the highest order passes through its "0" position after a change in operational direction. This addition of the "fugitive 1" when a unit digit is added to the accumulator while in its negative zero position, changes the erroneous zero total to the correct positive "1" total and, when a unit digit is subtracted from the accumulator when in its positive zero position, changes the erroneous zero total to the correct negative "1" total.

The accumulator will thus carry the true total whether the sign be positive or negative.

The accumulator also includes mechanism which senses the sign of the total value in the accumulator and conditions the associated total taking mechanism to take either a positive or a negative total.

When the total or subtotal control key is depressed, the actuator is drivingly connected with the accumulator through either the positive or negative transmission, depending on the condition of the sign sensing mechanism of the accumulator, and, upon cycling of the machine by the power cycling mechanism, reads out the total in the accumulator and transfers the total to the printing mechanism which prints it on the associated tape near the middle of the machine cycle.

When the total key is depressed, the actuator is connected to the accumulator during the advance stroke of the actuator to read out the total in the accumulator and transfer this value to the printing mechanism and is disconnected from the accumulator at the end of the advance stroke of the actuator so that the accumulator is not operated during the return stroke of the actuator but is left in its zero setting or cleared condition. However, when the subtotal key is operated, the actuator is maintained in driving relationship with the accumulator during both the advance stroke and the return stroke of the actuator so that the total value read out of the accumulator on the advance stroke of the actuator is returned to the accumulator on the return stroke of the actuator and further entries are added to, or subtracted from, this restored total.

The printing mechanism includes symbol printing apparatus which is driven by a special unit of the actuator and power cycling mechanism but controlled by the control keys and accumulator so that it will print the proper symbol for the operation performed and give the proper sign to the symbol. Thus, the following symbols may be used to indicate the different operations and the sign of the quantity printed:

Addition_____ No symbol.
Subtraction_____ (Minus sign in negative ribbon color).
Subtotal—positive_____ S.
Subtotal—negative_____ S̄.
Total—positive_____ T.
Total—negative_____ T̄.
Print only_____ N.

There is also a clear signal printing mechanism which, upon the next additive, substractive or print only cycle following a total cycle, prints a clear signal symbol, for example a "C," on the tape to indicate that the accumulator had been cleared before the new entry was made.

The print only key is used when it is desired to print a number, such as an identifying or code number, on the tape without entry of such number as a value into the accumulator. This is accomplished by connecting the selector to the printing mechanism through the positive transmission and actuator during the advance stroke of the actuator and blocking any connection between the actuator and accumulator during the return stroke of the actuator.

The control keys are all connected to the power cycling mechanism in a manner to initiate a cycle or rotation of the power cycling mechanism whenever a control key is operated. The power cycling mechanism is so constructed and arranged that it will automatically complete a full cycle or rotation and come to a stop at a predetermined angular position once a cycle has been initiated by depression of a control key. Blocking means are also provided so associated with the control keys that only one control key can be operated at a time and no other control key can be operated until after the completion of the cycle initiated by this operated key.

This precludes the possibility of forcing the machine to attempt two or more different operations at the same time and thus avoids probable errors and damage to the machine mechanism.

The machine will thus print positive and negative entries and distinguish between the positive and negative values printed, will accumulate the entry values into positive and negative totals and compensate inherent mechanical errors to provide true total values, will read out and print totals and substotals and automatically sense the positive or negative nature of such totals, will repeat add the same value any desired number of times, will print numbers without entering such numbers into the accumulator, will clear itself whenever a total is taken but will retain its total when a subtotal is taken, will print appropriate symbols indicating the nature of the entry or the total and can be cleared of an erroneous entry before the entry is printed or accumulated.

Suitable mechanical assemblies for carrying out the above-noted functions of the machine are shown in Figs. 2 to 36, inclusive, to which reference may now be had.

A. *Selection mechanism*

While the selection mechanism is similar in construction and operation to that disclosed in the Taylor Patent No. 2,628,030 and in the Friden Patents Nos. 2,371,752 patented March 20, 1945 and 2,376,997 patented May 29, 1945, it differs in several respects from these prior art devices and particularly in that, whereas the selector segments of the prior art devices are read out seriatim, in the device of the present invention the value carrying sectors are all read out simultaneously.

Referring now to Figs. 2, 3, 4 and 5, the selection mechanism comprises in general a keyboard assembly 10, a selector assembly 11 and a zero latch and settable stop pin assembly 12.

1. KEYBOARD MECHANISM—FIGS. 2, 3, 4 AND 5

The keyboard assembly includes a key supporting structure disposed between and fixedly mounted on longitudinally extending machine frame plates 13 and 14 which are mounted substantially perpendicularly from the machine base and are substantially parallel to each other. The supporting structure includes plates 15 and 16 disposed in spaced-apart and substantially parallel relationship to each other above the forward portion of the machine base and provided with apertures which slidably receive the stems of the selection or value setting keys 17, the zero key 18 being slidably mounted on the left-hand side of the keyboard.

Each value setting key 17 has a stem 20 of rectangular cross-section shape slidably received in corresponding mutually registering apertures in the upper and lower support plates 15 and 16 and has a head or button 19 fixed on the upper end of its stem. The keys 17 are arranged in a square of three rows with three keys in each row and are consecutively numbered from "1" to "9."

Each key stem 20 has a portion extending directly from the upper plate through an aperture in the lower plate and a laterally offset arm 21 extending across the longitudinal center line of the keyboard, each arm having a downwardly directed plunger portion extending through an aperture in the bottom plate 16, which apertures are arranged substantially in a line extending longitudinally of the keyboard intermediate the width thereof.

A compression spring 22 is so connected between each key stem 20 and the bottom plate 16 that these springs resiliently urge the keys upwardly to a limiting position as determined by the engagement of the top edges of the offset arms 21 with the bottom surface of the upper key supporting plate 15.

2. SELECTOR MECHANISM—FIGS. 2, 3 AND 16

The selector assembly 11 includes a cage having end plates 23 and 24 extending longitudinally of the machine substantially perpendicular to the plane of the machine base and held in substantially parallel relationship to each other by spaced-apart tie rods 25, 26, 27, 28 and 29 extending through the cage end plates and transversely of the space therebetween. The end plates are slidably mounted on parallel guide rails 30 and 31 which extend transversely of the machine and through apertures in the end plates 23 and 24, the length of the guide rails being such that the selector unit has a freedom of translational movement substantially equal to its own length transversely of the machine. The end plates 23 and 24 support a sector mounting shaft 32 which extends transversely of the space between the end plates substantially parallel to the tie rods 25 to 29, inclusive. A plurality of ordinarily arranged selector sectors, generally indicated at 33, are journalled on the shaft 32.

Each selector sector includes a rack element having a hub 34 mounted on the shaft 32, a toothed arcuate rim 35 spaced from the hub 34, and extending through an angle of approximately 90 degrees, and a spoke structure 36 mounting the rim 35 on the associated hub 34, and a dial element including a hub 37 mounted on shaft 32, an arcuate rim 38 spaced from the hub and extending through an angle of approximately 90 degrees in spaced relationship to the rack element rim 35, and a spoke structure 39 mounting the rim 38 on the dial hub 37. The dial rim 38 has a peripheral surface of partly cylindrical shape and has a series of numerals from "0" to "9" spaced apart therealong.

An arm 40 projects radially from the dial rim 38 and has a notched outer end disposed adjacent one side of the rack rim 35. A stud 42 projects from the rack rim into the notch in the outer end of the arm 40 but has a diameter less than the width of the notch so that a limited freedom of angular movement is provided between the rack element and the dial element of each selector sector 33. The rack hub 34 has a radial projection 43 and a tension spring 44 connected between the projection 43 and the related dial spoke structure 39 resiliently urges the dial element of the selector sector 33 to a limiting angular position relative to its associated rack element. The angular movement of the dial element relative to the rack element suppresses the tendency of the selector sector 33 to rebound when its rack element encounters a pin stop or a fixed zero stop, as will be presently described.

A live pawl 45 is pivotally mounted at one end on the rack element hub extension 43 and bears adjacent its other end against the distal end of a tangential extension 46 of the rack element rim 35. A clip 47 mounted on a lateral extension 48 of the pawl 45 slidably engages the rack element rim 35 to guide the pawl in its rocking movements about its pivotal connection with the hub extension 43 and dampen the free movement of the pawl.

Each selector sector is releasably held in its full-cycle or home position by a latch lever 50 pivotally mounted intermediate its length on a latch shaft 51 which extends across the space between the cage end plates 23 and 24 and is secured at its ends to these end plates. The latch lever 50 extends longitudinally of the machine and is resiliently urged by tension spring 52 to latching position in which its rearward end engages the forwardly projecting nose 53 on the free end of the pawl 45. Each selector sector is urged to turn about shaft 32 in a clockwise direction, as viewed in Fig. 3, by a tension spring 54 which is wound partly around the sector hub and has one end connected to a sector carried stud 55 and its other end connected to the tie rod 28. Each live pawl 45 is resiliently held against the adjacent end of the corresponding rack element rim extension 46 by a tension spring 56 connected between the live pawl and the spoke structure 36 of the corresponding rack element.

The machine cover is provided with a sight opening, not shown, which is disposed just to the left of the selector unit when this unit is in its terminal right-hand or full-cycle position and the latch levers 50 releasably hold the selector sectors in position against the force of springs 54 such that the "0" indication near the top of the dial element rims are in alignment with the sight opening in the housing. Limit stop means for this home or "0" position of the selector sectors is provided by engagement of an abutment formation 57 on each rack element spoke structure 36 with the tie rod 27. A limit stop for the selector sectors when in their other limiting position, that is, when the "9" designation near the lower end of the dial rim 38 of a sector is in alignment with the sight opening in the cover, is provided by engagement of the spoke structure 39 of the dial element with the tie rod 27. The selector sectors also have intermediate positions corresponding to the numeral designations on their dials between "0" and "9" and provided by key set stop means presently to be described.

Since the selector sectors may be substantially identical in construction, a detailed description of one only has been given but it is to be understood that there are a plurality of such sectors arranged ordinally or in side-by-side relationship along the shaft 32, ten such sectors being shown in the drawings.

In addition to the end plates 23 and 24 and the tie rods 25 to 29, the selector mechanism cage includes forward and rearward or outer and inner stop pin guide plates 58 and 59 disposed in spaced-apart and substantially parallel relationship to each other at the front side of the cage and between the end plates thereof. The inner plate 59 is provided with series of apertures extending transversely thereof and spaced apart therealong with each series containing eight apertures spaced apart transversely of the plate and in alignment with the stop pawls of the corresponding selector sectors as the sectors turn about the axis of their mounting shaft 32. The outer plate 58 is also provided with a plurality of apertures, each of which registers with a corresponding aperture in the inner plate 59, and a plurality of settable stop pins 60 are slidably mounted in the plate apertures, each pin being received in a pair of mutually registering apertures disposed one in the outer plate 58 and the other in the inner plate 59. Each pin carries limit stop means, such as the through pins 61 and 62, extending transversely through the stop pin at locations spaced apart longitudinally thereof and engageable respectively with the plates 58 and 59 to limit longitudinal movements of the stop pin relative to the supporting plates to the proper retracted and projected positions of the stop pin. A spring detent 63 may also be engaged with each stop pin to releasably hold the associated stop pin in either its retracted or projected position. There is one settable stop pin for each numeral designation between, but not inclusive of, "0" and "9" of each selector rack, a fixed stop being provided for the "0" and "9" positions as described above.

An arbor 65 is mounted on the frame and extends transversely thereof below the bottom plate 16, and pin setting bellcranks 66, corresponding to the "1" to "8" keys of the keyboard, are pivotally mounted intermediate their lengths on this arbor in side-by-side relationship to each other. The bellcrank levers 66 have upwardly curved front ends so positioned below the bottom plate 16 that they are in alignment with the lower ends of corresponding plunger portions of the numeral key stems whereby the manual depression of any numeral key 17 will impart a rocking or angular movement to its corresponding pin setting lever 66.

Rearwardly of the arbor 65 the pin setting levers 66 are longitudinally bent or laterally offset so that their rearward end portions are slidably received, one above another in a slot 67 in a fixed plate 68 which is upstandingly disposed immediately in front of the pin carriage section of the selector cage and extends transversely of the machine. The slot 67 extends upwardly from a location above the machine base and the pin setting levers are so constructed and arranged that the lever operated by the "1" key 17 has its rearward end at the lowest position in the slot 67, the lever operated by the "2" key has its rearward end next above the rearward end of the lever operated by the "1" key, the arrangement continuing in order up to the lever operated by the "8" key which lever has its rearward end at the highest position in the slot 67. Each lever 66 has its rearward end in alignment with the forward end of a corresponding stop pin 60 in the ordinal row of pins in alignment with the rearward ends of the pin setting levers 66 so that, when a numeral key is manually depressed, a corresponding stop pin will be set, that is, will be moved rearwardly from its retracted to its projected position.

A fixed bracket 70 is mounted on the machine base immediately forwardly of the pin engaging portions of the pin setting levers 66 below the arbor 65 and the levers are provided with abutment nose formations 71 which abut against the rearward face of this bracket to positively position the levers in their normal or home position in which they are withdrawn from the corresponding stop pins. Tension springs 72 are connected one between an ear formation of each lever 66 and the bracket 70 and resiliently urge the levers to their normal or home position.

A sector latch releasing bar 73 extends longitudinally of the keyboard between the key supporting plates 15 and 16 and under the offset arms 21 of the key stems, in a longitudinal direction relative to the machine and this bar is supported at its ends by arms 74 and 75 secured on the ends of a shaft 76 journalled in the key support so that the bar can move downwardly under pressure of a manually depressed key and can be spring returned to its normal position.

A bellcrank lever 77 pivoted intermediate its length on the upper end of the bracket 70 has its upwardly curved forward end extended through an aperture in the lower plate 16 and positioned directly below the bar 73 so that the lever 77 will be rocked whenever the bar 73 is pressed down by depression of any one of the numeral keys.

A latch releasing dog 78 is pivotally mounted at its forward end on the machine base forwardly of the plate 68 and has at its rearward end a nose formation 79 which extends through an aperture 80 in plate 68, below and in alignment with slot 67, and underlies the forward end of the sector latch lever 50 at the bottom of the row of stop pins 60 in alignment with the slot 67. A link 81 is pivotally connected at its lower end to the dog 78 intermediate the length of the dog and pivotally connected at its upper end to the rearward end of the bellcrank lever 77, so that, when the lever 77 is rocked by downward movement of bar 73, the forward end of the latch lever 50 engaged by the nose 79 of latch releasing dog 78 is raised against the force of the associated spring 52 and the rearward end of the latch lever is moved out of engagement with the nose 53 of the corresponding selector sector live point or pawl 45.

With the selction mechanism so far described, when a numeral key bearing a numeral designation between "0" and "9" is depressed, the corresponding settable stop pin 60 is first projected into the path of the nose 53 of the pawl 45 of the corresponding selector sector and the latch lever 50 is then rocked to release the pawl 45 and free the sector to turn under the force of the associated spring 54 until the nose of the pawl 45 engages the projected stop pin 60 to terminate angular movement of the selector sector. The numeral designation on the sector dial corresponding to the depressed numeral key will then be brought into alignment with the sight opening in the machine cover.

It will be noted that if two or more numeral keys are simultaneously depressed, the sector will be turned to a position corresponding to the lowest numeral key value since the nose of pawl 45 will first encounter the stop pin set by the key having the lowest numeral value.

As there is no stop pin 60 or bellcrank 66 corresponding to the "9" key, depression of this key serves only to force the bar 73 downwardly. This releases the latch lever 50 from the pawl 45 of the sector in alignment with the slot 67 and frees the corresponding sector to turn until the dial element spoke structure 39 encounters the fixed stop bar 27. The "9" designation on the sector dial will then be brought into alignment with the sight opening in the cover.

As the selector segments are set to the selected dial readings, the shiftable selector unit 11, including the cage and the selector sectors, stop pins and latch levers carried by the cage, is stepped along the guide rails 30 and 31 in a direction from right to left so that selector sectors are successively brought into alignment with the slot 67 in fixed plate 68 as the digits of an entry number are registered from the highest to the lowest order of the entry by depression of the appropriate numeral keys 17.

Figure 2:
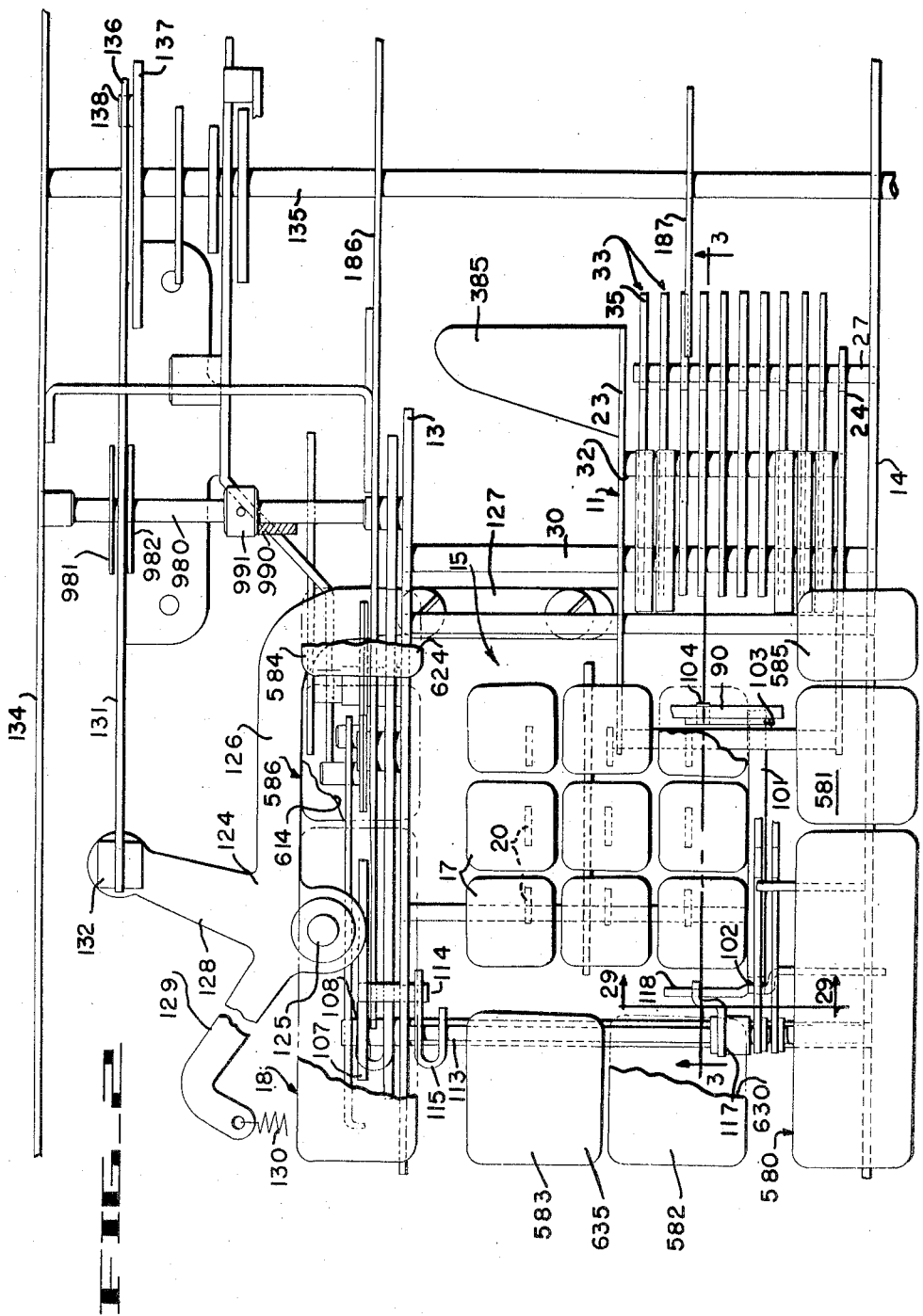
Fig. 2 is a fragmentary top plan view of the front portion of the adding machine with the cover removed.

A blade 385, as shown in Fig. 2, projecting to the left from the left-hand end of plate 23 engages the gears of the positive gear transmission 330, shown in Fig. 14, to the left of the shiftable selector unit 11, and holds these gears against movement away from their zero or full-cycle position, as will later appear.

3. ESCAPEMENT MECHANISM—FIGS. 3, 4 AND 5

A rack bar 84 is mounted on the upper edge portion of the rearward pin carrying plate 59 and has forwardly directed rack teeth 85 thereon. A sear arm 86 is pivotally mounted at one end on the rear, left-hand corner of the bottom key supporting plate 16, as indicated at 87, and extends to the left, as viewed in Fig. 4, along and below the rack bar 84. The arm 86 is provided on its free end with a detent formation 88 which projects upwardly between two adjacent teeth 85 of the rack bar 84 and releasably restrains the selector unit against movement to the left. A rack retarding pawl 90 is pivotally mounted at one end on the rearward right-hand corner of the bottom key supporting plate 16, as indicated at 91, and extends from its pivotal mounting to the right, as viewed in Fig. 4, along and forwardly of the rack bar 84.

The pawl 90 is provided at its free end with an inclined ear 92 which is normally disposed above the rack bar 84 but is movable into an interdental space of the rack bar when the selector unit is stepped to the left, as will be presently described. The sear arm 86 is provided at its pivoted end with a downwardly projecting extension 93. The pawl 90 is provided at its pivoted end with a similar downwardly projecting extension 94, and a tension spring 95 connected between the lower ends of the extensions 93 and 94 resiliently urges the free ends of the sear arm 86 and pawl 90 upwardly and the detent formation 88 into an interdental space of the rack bar 84.

The pawl 90 is provided near its free end with a longitudinally extending closed slot 96 having at its end nearest the free end of the pawl a downwardly extending recess 97 and a terminal extension 98 of the bar 73 beyond the pivot arm 75 is received in the recess 97.

When the bar 73 is pressed down by the depression of a numeral key, as described above, the terminal extension 98 of this bar forces the free end of pawl 90 downward and moves the detent 92 into the nearest interdental space of the rack bar 84. As the free end of pawl 90 moves downwardly, a shoulder 99 on the bottom edge of the pawl engages a pin 100 projecting forwardly from the free end of arm 86 and moves detent 88 downwardly and out of the interdental space in which it is engaged. As detent 92 has a thickness less than the distance between two adjacent teeth of the rack bar 84, this will permit a sufficient movement of the rack bar to the left to bring a tooth of the rack bar 84 above the detent 88 on the sear arm 86. When the manually depressed number key is released freeing the spring 95 to restore the arm 86 and pawl 90, the detent 92 will be moved out of the interdental space in which it is engaged and the detent 88 will first contact the bottom surface of the rack tooth immediately above it and then, as the rack bar 84 shifts to the left, set into the next interdental space to the right and terminate the leftward movement of the shiftable carriage 11. The selector mechanism will then have been shifted one ordinal space, that is, the overcenter distance between two adjacent selector sectors, to the left.

4. ZERO KEY MECHANISM

A shaft 101 is journalled near its ends in brackets upstanding from the plate 16 near the left-hand edge of the plate and carries on its forward end a blocking lever 102, the purpose of which will be later explained. On its rearward end the shaft 101 carries an actuating arm 103 from which a pin 104 projects into the slot 96 of the escapement pawl 90 and which is effective to actuate the escapement when the shaft 101 is rocked.

The "0" key 18 has an upright stem 107 mounted for vertical sliding movement on the machine frame plate 13 by vertically spaced-apart guide pins 108 and 109 extending from the frame plate 13 through corresponding slots provided in the key stem at locations spaced apart longitudinally of the stem. This key is resiliently urged to its upper limiting position by a spring 110 connected between the upper guide pin 108 and a stud 112 mounted on the key stem below the upper guide pin.

A shaft 113 is journalled in the keyboard supporting structure and extends transversely of the keyboard at the forward end of the latter.

A pin 114 is secured at one end to the zero key stem 107 adjacent the upper guide pin 108 and extends to the right from the key stem, and an arm 115 is fixed on and projects rearwardly from the shaft 113 adjacent the zero key stem 107 and also has in its rearward end a notch 116 through which the pin 114 extends. The shaft 113 is thus rocked when the zero key is depressed and restored. A second rearwardly directed arm 117 is mounted on shaft 113 adjacent and to the left of shaft 101 and overlies a leftwardly directed arm 118 of blocking lever 102 to rock the shaft 101 in a direction to operate the escapement mechanism and step the shiftable selector unit 11 one step to the left each time the zero key 18 is depressed.

As the zero key does not move the bar 73, none of the selector sector latches 50 are released. The selector sectors are thus restrained against angular movement and the only effect of operation of the zero key is to move the shiftable selector unit one step to the left to bring the zero designation on that selector sector immediately to the right of the sight opening in the cover into the sight opening.

The shiftable selector unit is resiliently urged in a left-hand direction along the guide rails 30 and 31 by suitable spring-actuated mechanism, such left-hand movement being controlled by the escapement mechanism above described, and is returned or restored from any position to the left of its limiting right-hand or home position by the power cycle mechanism of the machine during a power cycle operation.

The left-hand side of the detent formation 88 on the escapement sear arm 86 is so shaped that when the shiftable unit is returned to the right, the teeth of the rack bar 84 will slide over this detent, the escapement mechanism being effective to interrupt left-hand movement only of the shiftable unit.

5. STOP PIN RETRACTING MECHANISM

When the shiftable selector unit is returned to its home position, any of the settable stop pins 60 which have been projected during the leftward movement of the unit from its home position are automatically retracted.

Each pin is provided at the outer side of the outer pin carriage plate 58 with a longitudinally extending closed slot 120 and pin retracting finger bars 121 extend through the pin slots, there being one finger for each row of pins extending transversely of the machine or longitudinally of the shiftable selector unit. The finger bars are all secured at their right-hand ends to a fixed part of the machine frame so that the shiftable unit moves longitudinally of the finger bars and relative thereto and each finger bar has a recess near its left-hand end and in alignment with slot 67 in plate 68 so that the settable pins in alignment with this slot can be projected by the number keys as described above. The right-hand sides of the above-described recesses in the finger bars are provided as cam surfaces which restore the settable pins of the corresponding rows to their retracted position as the pins move to the right of the cam surfaces. In order that the pins at the left-hand end of the shiftable selector mechanism may be restored to their retracted position by the finger bars 121 and then released for projection by the number keys the selector unit return mechanism is effective to first move the shiftable unit one step to the right past the home position of this unit and then return the unit to its home position where it is releasably held by the escapement mechanism.

6. SHIFTABLE SELECTOR UNIT RETURN MECHANISM—FIGS. 2, 4, 6 AND 14

The mechanism for resiliently urging the shiftable selector unit to the left and returning it to its right-hand position during an operating cycle of the machine comprises a bellcrank lever 124, as shown in Figs. 2 and 6, pivotally mounted at its knee on the machine frame by a pivotal mounting 125 for rocking movement about an upright axis. One arm 126 of lever 124 extends rearwardly from pivotal mounting 125 and a link 127 connects the distal end of this arm to the left-hand end plate 23 of the cage of the shiftable selector unit 11. The other principal arm 128 of bellcrank lever 124 extends to the left from the pivotal mounting 125 and a third, minor arm 129 extends forwardly from the pivotal mounting.

A tension spring 130 is connected between the distal end of bellcrank arm 129 and a fixed point on the machine frame in a manner to resiliently urge the shiftable selector unit 11 to the left. An elongated link 131 is pivotally connected at its front end to the distal end of the bellcrank arm 128 by a pivotal connection 132 having two mutually perpendicular pivot axes.

The link 131 extends from the pivot connection 132 rearwardly of the machine above and beyond a power driven cam shaft 135, as seen in Figs. 2 and 14, and is provided at its rearward end with a downwardly extending hook formation 136. A radially projecting arm 137 on the cam shaft carries at a location spaced from the cam shaft a laterally projecting pin 138 which is engageable with the hook formation 136. When the pin 138 is above the level of the cam shaft 135 during a power cycle operation of the cam shaft, the pin moves rearwardly relative to the machine and, upon engagement with the hook formation 136, pulls the link 131 rearwardly. This rocks the bellcrank 124 in a direction to push the shiftable unit 11 to its limiting right-hand position one step to the right of its home position. When cam shaft 135 has turned sufficiently to disengage the pin 138 from hook formation 136, spring 130 moves shiftable unit 10 leftward to its home position where it is latched by the escapement mechanism.

B. Power cycle mechanism

The power cycle mechanism of the machine includes an electric motor, not illustrated, mounted in the rear portion of the machine and provided with a suitable normally open switch 139, as shown in Fig. 28, which, when closed, completes the motor energizing circuit.

1. SPEED REDUCING GEAR TRAIN—FIG. 7

The mechanism of the present machine is driven by a motor, not shown herein, which drives a shaft 140 projecting through the frame side plate 14 of the machine and carrying a small spur gear 141 at the outer side of the frame plate. A cam shaft 135 is journalled in the frame plates 13 and 14 and the left-hand side plate 134 and extends transversely of the machine with its axis in spaced and substantially parallel relationship to the axis of the motor shaft. One end of the cam shaft projects through the plate 14 and a spur gear 142, larger than the gear 141, is journalled on this projecting end of the cam shaft. A first idler gear 143, larger than the gear 141, is journalled on an arbor 144 mounted on the frame plate 14 and meshes with the gear 141 and a gear 145, smaller than gear 143, is journalled on arbor 144 and secured to gear 143. A second idler gear 146, larger than the gears 141 and 145, is journalled on a frame carried arbor 147 and meshes with the small gear 145 and a reversing gear 148 journalled on a frame carried arbor 149 and meshes with the gears 146 and 142 to complete a speed reducing gear drive between the motor shaft and the cam shaft gear. The direction of rotation of gear 142 is retained the same as the direction of rotation of the motor shaft 140, or clockwise, as viewed in Fig. 7. At their outer ends, arbors 144 and 149 and shafts 140 and 135 are supported in a bracket 14' secured to, and spaced outwardly, from the right-hand frame plate 14.

2. SINGLE ROTATION CLUTCH—FIGS. 7, 8 AND 28

A one rotation or single cycle clutch, generally indicated at 150, is connected between the cam shaft gear 142 and the cam shaft 135 and includes a ratchet wheel 151, Fig. 8, secured to the gear 142, a ratchet pawl 152 pivoted at one end on a cam plate 157 secured on shaft 135 and having intermediate its length a single tooth engageable with the teeth of the ratchet wheel to drivingly connect the gear 142 to the cam shaft 135.

The pawl 152 is urged in a ratchet engaging direction by a spring 153 connected between the clutch plate 147 and the free end of the pawl 152, and a transverse shoulder 154 is provided on the pawl at the free end thereof. A pawl latch dog 155 is pivoted at one end on the frame plate 14 by a pivotal mounting 156 and is engageable at its free end with the pawl shoulder 154 to hold the pawl out of engagement with the ratchet wheel 151 under which conditions the motor shaft can rotate the gear 142 without rotating the cam shaft 135. When the latch dog is disengaged from the pawl shoulder 154, the pawl engages the ratchet wheel and drivingly connects the motor driven gear 142 to the cam shaft 135 for a single complete rotation of the cam shaft. Rotation of the cam shaft is terminated when the pawl shoulder 154 again comes into engagement with the free end of the pawl latch dog 155 and the pawl is moved out of engagement with the ratchet wheel.

The cam disk 157, which carries the pawl 152, is mounted on the cam shaft adjacent the gear 142 and has a circular periphery interrupted by a single low portion 158 of limited angular extent. The latch dog 155 carries a laterally projecting roller 159 which rides on the periphery of the cam disk 157 and holds the latch dog 155 out of its pawl engaging position until the cam shaft has completed a rotation and returned to its home position at which time the roller 159 drops into the low portion 158 of cam 157 and frees the latch dog 155 to engage the pawl shoulder 154. This cam disk 157 also serves to hold a depressed control key down until the end of the operating cycle which was initiated by the depression of the control key, as will be presently described.

A spirally-shaped antibacklash cam disk 160, Fig. 7, is mounted on the cam shaft 135 and has a single radially disposed shoulder 161. A pawl 162 is pivotally mounted at one end on frame bracket 14′ by a pivotal connection 165 and the free end of this pawl is held in engagement with the periphery of cam disk 160 by a spring 166 connected between the bracket 14′ and the distal end of a pawl extension or tail 167. The pawl 162 engages the cam shoulder 161 when the cam shaft is in its home or full-cycle position and precludes any reverse rotation of the cam shaft when the rotation of the cam shaft starts or terminates.

The clutch pawl latch dog 155 is moved to its pawl releasing position upon operation of a control key of the machine by a link 168 pivotally connected at its rear end to the latch dog 155. An extension 169, also shown in Fig. 28, of this link extends rearwardly from the rear end of the link 168 to a connection with the motor switch 139 to energize the motor when the cam shaft clutch is engaged. Forward movement of the link 168 and link extension 169 to engage the clutch and close the motor switch is resiliently resisted by a spring 164.

3. CAM AND CAM SHAFT ASSEMBLY—FIG. 8

The cam shaft 135, in addition to the clutch control cam disk 157, the antibacklash cam disk 160 and the shiftable selector carriage return cam 137 carries at locations spaced apart therealong, machine operating cam disks as illustrated in Fig. 8 and including, from left to right along the cam shaft, the carriage return cam 137 and pin 138 for returning the shiftable selector unit to its home position, a pendant gear or shiftable transmission latching cam 170, a zero foil actuating cam 171 for the printing mechanism, a printing cam 172, a tens-carry actuating cam 173 for the machine accumulator, an actuator operating trail cam 174, an actuator operating lead cam 175, an actuator sector aligner cam 176, a subtotal cycle cam 177, a total cycle cam 178, and a transmission shifting cam 179.

All of the cams are shown in Fig. 8 in their home or full-cycle position from which they turn in a clockwise direction when viewed from the right-hand side of the machine, as explained above in connection with Fig. 7.

C. Actuating mechanism—Figs. 9, 10 and 16

Figure 9:
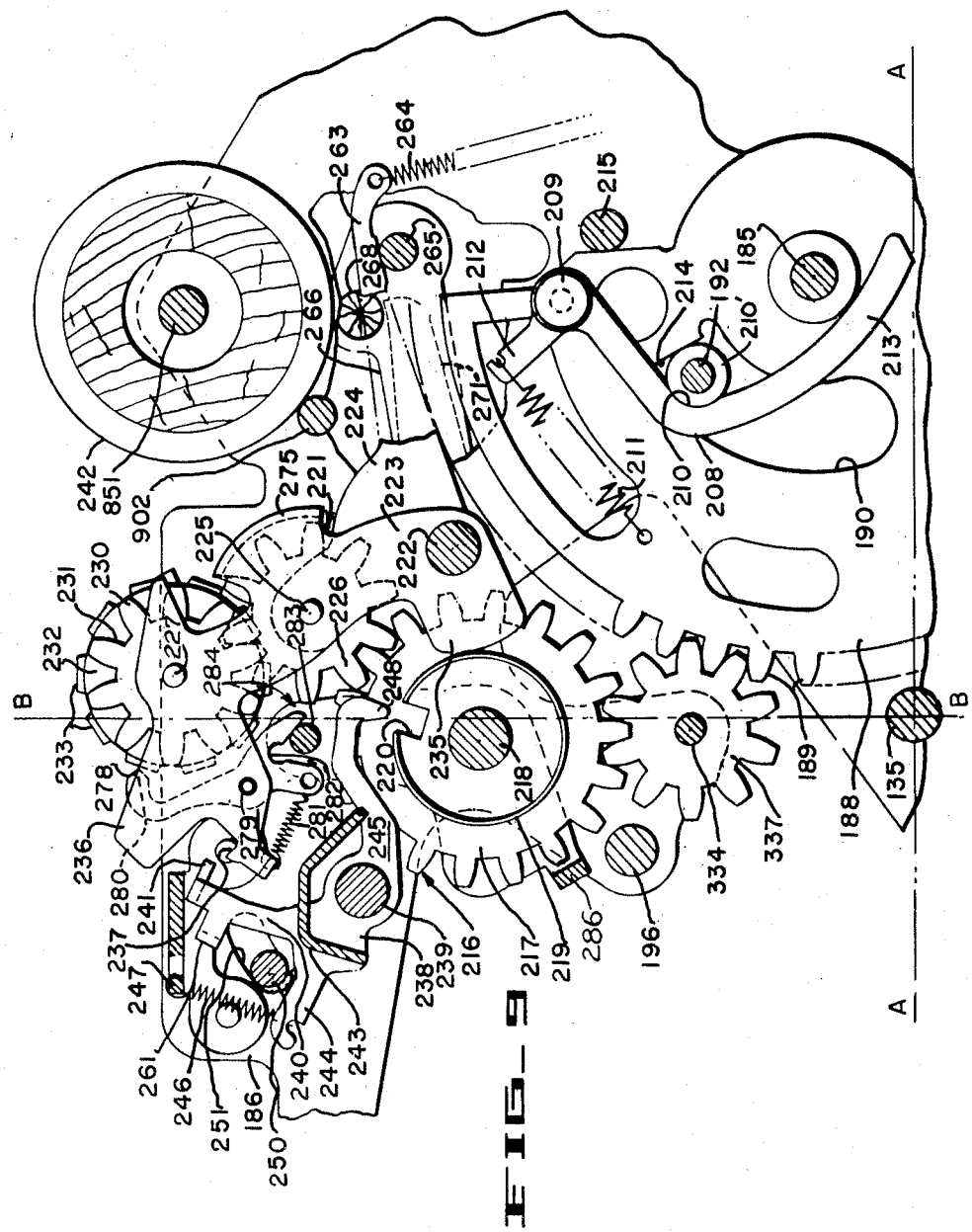
Fig. 9 is a view showing a portion of the printing mechanism and particularly the print wheels, the print wheel drive and the operating mechanism for the print wheels.

The actuator mechanism, Figs. 9 and 10, comprises an axle shaft 185 journalled at its ends in intermediate frame plates 186 and 187 (Fig. 2) and extends transversely of the machine above and substantially parallel to the cam shaft 135. Actuator sectors 188, equal in number to the number of selector sectors plus two, are journalled in side-by-side or ordinal arrangement on the axle shaft 185 and extend from the axle shaft toward the shiftable selector unit 11.

Each actuator sector is substantially of the shape of a section of a circle and the axis of the axle shaft 185 extends through the centers of the hypothetical circles of which the corresponding sectors constitute sections. Gear teeth 189 are provided on the arcuate edges of the actuator sectors and each sector is provided with an elongated opening 190 having a longitudinal curvature centered on the axis of shaft 185. The sectors may also be provided with weight reducing openings, as shown in Figs. 9 and 10, if desired.

A rod or bail 192 extends through the openings 190 in the several actuator sectors. A pair of arms 193 and 194, shown in Fig. 11, rockably support the corresponding ends of the bail 192, which arms are mounted on the shaft 185 near the correspondingly opposite ends of this shaft, thereby supporting the bail 192 in spaced and parallel relationship to the axle shaft 185.

A yoke 195 of somewhat elliptical shape surrounds the cam shaft 135 and the actuator trail and lead cams 174 and 175. The yoke has an upwardly and forwardly projecting extension pivotally mounted on a fixed cam follower shaft 196 which extends transversely of the machine above and forwardly of the cam shaft 135, which follower shaft is supported in the side and intermediate plates of the machine frame. An arm 197 extends forwardly from the extension 195 and is pivotally connected by a spacing pin 198 to the distal end of one leg 199 of a ribbon feed actuating bellcrank lever 200 rockably mounted on the cam follower supporting shaft 196. The other leg 201 of bellcrank lever 200 extends upwardly from shaft 196 and is connected at its upper end to the forward end of a link 202 which drives the ribbon feed of the printing mechanism, presently to be described.

An arm 203 extends rearwardly from the rearward end of the yoke 194 and is pivotally connected at its rearward or distal end to the lower end of a link 204, the upper end of which is connected to the actuator bail 192.

The yoke carries on its upper side a cam following roller 205 riding on the peripheral edge of the actuator trail cam 174 and on its lower side a cam following roller 206 riding on the peripheral edge of the actuator lead cam 175, the yoke being disposed between the cams 174 and 175 and the roller 205 projecting from the right-hand side of the yoke while the roller 206 projects from the left-hand side of the yoke.

With this arrangement the bail 192 is positively moved both downwardly and upwardly and, during an operating cycle of the machine, is first moved to its lower position, is maintained in its lower position for a predetermined time interval and is then restored to its upper position.

A corresponding latch lever 208 is disposed adjacent one side of each actuator sector 188 and is pivoted at its upper end to the sector near the upper radial edge of the sector by a pivotal connection 209 and extends from the pivotal connection along the opening 190 in the actuator sector and past the side of the bail 192 remote from the axle shaft 185. The latch lever is angularly bent intermediate its length to provide at the side thereof adjacent the bail 192 a concave seat 210 which receives a roller 210′ rotatably mounted on the bail 192, the roller 210′ being received in the corresponding seat 210 when the bail is in its upper limiting position relative to the corresponding sector 188. The latch lever is resiliently held in engagement with the bail by a spring 211 connected between the sector 188 and the distal end of an arm 212 projecting angularly from the pivoted end of the lever 208. The portion of the lever 208 between the seat 209 and the free end of the latch lever constitutes a longitudinally curved tail portion 213 directed from the bail 192 toward the shaft 185.

When the bail is pulled downwardly by the action of the lead cam 175 on the cam follower 206, the engagement of the bail in the latch lever seat 210 pulls the sector 188 down until the sector is positively stopped at an angular position predetermined by the setting of a corresponding selector sector 33 at which time the bail moves out of the seat 210 and along the concave edge of the tail portion 213 of the latch lever to complete the downward movement of the bail. As the bail moves along the tail portion 213, it maintains downward pressure on the sector 188 and the angularity of the tail portion to the remainder of the latch lever is such that this pressure is sustained by the force of spring 211 when the bail starts up again and until the bail positively engages the sector and returns it upwardly to its home or full-cycle position, the bail being moved upwardly by the action of trail cam 174 on follower 205.

The actuator unit is fixedly mounted in the machine just to the left of the shiftable selector unit when the latter is in its right-hand, home position and, when the selector unit is stepped to the left by its escapement mechanism, the orders of the selector unit from left to right are successively brought into alignment with the corresponding orders of the actuator mechanism from right to left. Thus the digits carried by orders in the left-hand end portion of the selector will be read out by corresponding orders in the right-hand end portion of the actuator unit.

When the bail 192 moves upwardly relative to the actuator sectors 188, it comes into engagement with abutment formations 214 at the upper ends of the openings 190 in the sectors, simultaneously moving into the seats 210 of the latch levers 208, and then moves the actuator sectors upwardly until the upper radial edges of the sectors abut against a stop bar 215 in the upper or full-cycle position of the actuator sectors.

D. *Printing mechanism*

1. PRINT WHEELS AND GEAR MECHANISM—FIG. 9

The printing mechanism, generally indicated at 216, is disposed above the actuator mechanism with its orders in alignment with corresponding orders of the actuator mechanism. A plurality of print wheel drive gears 217 are journalled on a drive gear shaft 218 which extends transversely of the machine above and parallel to the cam shaft 135 and is mounted at its ends in the intermediate frame plates 186 and 187. The gears 217 are disposed in side-by-side or ordinal arrangement along the shaft 218 and the number of the gears is equal to the number of actuator sectors 188. Each gear 217 includes a central hub portion 219 of cylindrical shape provided with a peripheral notch 220, the purpose of which will presently be explained.

A plurality of print wheel carriers 221 are rockably mounted intermediate their length on a fixed shaft 222 which extends transversely of the machine in spaced and parallel relationship to the shaft 218. Each carrier 221 includes a pair of parallel arms 223 and 224 with the pairs of arms arranged in side-by-side or ordinal arrangement along the shaft 222 and in alignment with corresponding drive gears 217 and actuator sectors 188. Both arms 223 and 224 extend upwardly from the shaft 222 and near the upper ends of the arms a pivot pin or axle 225 extends transversely through the two arms of each pair and carries an idler gear 226 which meshes with the corresponding drive gear 217. The arm 223 of the carrier pair 221 is extended upwardly and forwardly beyond the upper end of the arm 224 and carries an axle pin 227 spaced above the axle pin 225. A print wheel gear 230 is journalled on the axle pin 227 and includes a spur gear portion 231, the teeth of which mesh with the teeth of the idler gear 226 mounted in the same carrier and which is formed on one side of a print wheel portion 232 having printing bosses 233 projecting from the periphery thereof at uniformly spaced angular intervals therearound. It will be noted that the printing bosses 233 are spaced apart and that the outer surfaces of these bosses are made concave in a direction circumferentially of the printing wheel so that the outer surfaces of the bosses will fit against the cylindrical surface of a printing platen 242 presently to be described.

2. ZERO FOIL LATCH MECHANISM—FIG. 9

Each of the arms 223 is provided with an extension 235 directed forwardly from the pivot shaft 222 and overlying one side of the outer portion of the corresponding drive gear 217 to serve as a guide for maintaining the corresponding drive gears 217 and idler gears 226 in meshing alignment with each other. The arm 223 is also extended forwardly of the print wheel axle pin 227, as indicated at 236, and this forward extension is notched out to provide at its lower portion a latch shoulder 237 facing upwardly and forwardly. A plurality of irregularly-shaped zero foil latch levers 238, equal in number to the number of print wheel drive gears 217 and print wheel carriers 221, are pivotally mounted intermediate their length on a fixed shaft 239 which extends transversely of the machine in spaced and parallel relationship to shafts 218 and 222. Each of these zero foil latch levers 238 has an upwardly directed arm 240 provided at its upper end with a rearwardly directed detent formation 241 which engages the shoulder 237 on the corresponding print wheel carrier arm 223 to releasably latch the corresponding print wheel in nonprinting position in which it is spaced from the associated printing platen 242. The latch levers 238 are received in corresponding transverse notches or recesses in a comb bar 243 which extends transversely of the machine above and parallel to the shaft 239 to maintain these latch levers in properly spaced relationship to each other. Each lever has a forwardly directed lever arm 244 and a rearwardly directed arm 245, the rear end portion of which is disposed against the same side of the corresponding drive gear 217 against which the forward extension 235 of the carrier arm 223 is disposed. A spring 246 is connected between the distal end of each forwardly directed latch lever arm 244 and a fixed spring attaching bar 247 extending transversely of the machine above and substantially parallel to the shaft 239, these springs urging the corresponding latch levers to rock in a clockwise direction as illustrated in Fig. 9. Each rearwardly directed latch bar arm 245 has on its rearward end a downwardly directed detent 248 which drops into the notch 220 in the corresponding print drive gear wheel hub 219 to free the latch arm for clockwise rocking movement by the associated spring 246 to a position in which the latching detent 241 at the upper end of the upwardly directed arm 240 of the latch lever engages over the corresponding shoulder 237 on the carrier arm 223.

A latch releasing bail 250 extends through slots, as indicated at 251, in the intermediate frame plates 186 and 187 and across the upper edges of the forwardly directed arms 244 of the latch levers 238. The bail 250 is supported at its ends in the upper ends of a pair of arms, one of which is illustrated in Fig. 12 and designated at 252, pivotally mounted at locations spaced below the bail 250 on the intermediate frame plates 186 and 187, as indicated at 253 for the arm 252 so that the bail 250 can swing forwardly and downwardly and upwardly and rearwardly in the slots 251.

The arm 252, as shown in Fig. 12, is extended downwardly beyond its pivotal mounting 253 upon the intermediate frame plate 187 and is provided at its lower end with a face which abuts a pin 254 located on cam follower lever 255. The cam follower lever 255 is pivotally mounted intermediate its length on the transverse shaft 196 and at its upper end, is in engagement with the forward side of the abutment pin 254. At its lower end the lever 255 carries a cam following roller 257 which rides on the peripheral edge of the zero foil cam 171 mounted on the cam shaft 135. The zero foil cam 171 is so shaped that during approximately the first 180 degrees of a machine cycle, during which time the actuator sectors 188 are undergoing their downward stroke, the bail 250 is held down on the forwardly directed arms 244 of the latch levers 238 holding the latch lever detents 241 out of engagement with the latching shoulders 237 on the print wheel carrier arms 223. This maintains the latch lever detents 248 out of the notches 220 in the print wheel drive gear hubs 219 and frees the drive gears for rotational movement. Near the end of the first half and beginning of the second half of the machine cycle, while the actuator sectors are being held in their limiting downward positions, the cam follower 257 rides into a low portion of the cam 171. A tension spring 260 connected between the upper end of the bail supporting arm 252 and the machine frame raises the latch lever bail 250 away from the latch lever arms 244 and thereby conditions the latch levers to move into engagement with the corresponding shoulders 237 under the actuation of the corresponding latch lever springs 246.

During the downward stroke of the actuator sectors and while the latch levers 238 are held out of engagement with the notches 220 in the drive gear hubs 219 by the bail 250, those drive gears in alignment with selector sectors which have been manually set to numeral values will be rotated away from their "0" positions in a manner presently to be described. Then, when the actuator bail 192 approaches the end of its downward movement and the bail 250 is moved to release the latch levers 238, the notches in the drive gears which have been rotated from their "0" positions will be moved out of registry with the corresponding zero foil latch lever detents 248 and these detents will not be able to re-enter the corresponding notches 220 and will be held on the cylindrical peripheral surfaces of the corresponding hub formations 219. In that event the corresponding latch lever abutments 241 will be held out of engagement with the shoulders 237 of the corresponding print wheel carriers 221 leaving these carriers free to rock the print wheels 230 carried thereby toward the platen 242 during the printing operation, presently to be described.

The upwardly directed arm 240 of each latch lever 238 has near its upward end a forwardly directed projection 261, the outer end portion of which is laterally directed to the left, as viewed from the front of the machine, and overlies the outer end of the projection 261 on the next latch lever to the left, these forward extensions being omitted from the upwardly projecting arms of the first two latch levers at the right-hand end of the assembly. The arrangement is such that if any print wheel drive gear to the left of the first two gears at the right-hand end of the assembly is moved away from its "0" position, all of the latch levers to the right of such drive gear will be held by the zero foil projections 261 out of latching engagement with the corresponding shoulders 237 on the print wheel carrier arms 223 and the print wheels to the right of the indicated drive gear will be free to move in a printing operation. Since the drive gears to the left of the indicated drive gear have not moved and still have their hub notches 220 in registry with the zero foil latch lever detents 248 and since the latch levers to the left are not restrained by the projections 261, these latch levers to the left of the indicated drive gear will be moved by their springs 246 into latching engagement with the corresponding shoulders 237 to hold the corresponding print wheels against printing movement so that the printing mechanism will not print zeros to the left of the highest order of the numeral entry made into the machine by the keyboard and selection mechanism as previously explained.

When the printing operation is completed near the middle of the machine cycle, the bail 250 will be moved downwardly by the cam 171 to raise all of the latch lever detents 248 out of the corresponding notches 220 in the print drive gear hubs 219 thereby freeing the print wheel drive gears for rotational movement by the downward stroke of the actuator sectors during the first portion of the next operating cycle of the machine.

The manner in which a driving connection is provided between the actuator sectors 188, the print wheel drive gears 217 and the selector sectors 33 will be described in detail in the next following section dealing with the positive, pendant gear transmission mechanism.

3. PRINTING OPERATION—FIG. 9

The lever arm 224 of each print wheel carrier 221 is provided with a rearwardly directed extension or tail portion 263. A tension spring 264 is connected between the rear end of each rearward extension 263 and the machine frame, and is effective, the print wheel carrier is released, to rock the corresponding print wheel carrier 221 about the shaft 222 in a direction such that the associated print wheel 230 is moved rearwardly to strike the adjacent, forward portion of the cylindrical surface of the platen 242.

A bail cross member in the form of a rod 265 extends transversely of the machine below the rearward extensions 263 of the carrier levers 224 and is supported at its ends in the rearward ends of a pair of bail supporting arms 266 and 267, as shown in Figs. 9, 13 and 14. At their forward ends the arms 266 and 267 are pivotally mounted on the carrier supporting shaft 222 and the arm 266 is provided at a location spaced somewhat above and forwardly of the bail 265 with a laterally projecting stud 268 which preferably carries a sleeve or roller 269.

A bellcrank lever 270, shown in Fig. 14, is pivotally mounted at its knee on the axle shaft 218 of the print wheel drive gears 217 and has the rearward or distal end of one of its arms 271 underlying the stud carried roller 269. The other arm 272 of this bellcrank lever extends downwardly and rearwardly from the shaft 218 and to a location opposite the cam shaft 135 and carries on its lower or distal end a cam following roller 273 which rides on the peripheral edge of the print cam 172.

The print cam 172 is so shaped that during the major portion of a machine cycle the bail 265 is supported in its upper limiting position in which it holds the lever extensions 263 upwardly and renders the springs 264 ineffective to move the print wheels 230 toward the platen 242. The cam 172 is provided with a recess 274 having an abrupt leading edge and a sharply sloping trailing edge, and of restricted angular extent into which the cam follower 273 drops during a time interval in which the actuator sectors 188 are retained at the end of their downward stroke, as described above. Such action of bellcrank 270 provides for sharply and momentarily moving the bail 265 downwardly away from the bottom edges of the carrier lever extensions 263 and enabling the springs 264 to rock the carriers 220 which have been freed from their associated latch levers 238 in a direction to strike the print wheels 230 against the platen 242. After the free print wheels have been moved to strike the platen 242, they are immediately returned to their home or full-cycle position by reason of the limited angular extent of the recess 274 in the printing cam 172.

A portion of the arm 223 of each print wheel carrier 221 is perpendicularly offset from the edge of the arm and arcuately curved longitudinally to overlie the portion of the corresponding idler gear 226 nearest the platen 242 to provide a dust shield 275 for the idler gear.

When a print wheel carrier 221 is rocked about the shaft 222 to move the corresponding print wheel 230 from its home or full-cycle position to its platen engaging position, the teeth of the corresponding idler gear 226 are moved out of mesh with the teeth of the associated print wheel drive gear 217, although they remain in mesh with the teeth of the associated print wheel gear 231. This unmeshing of the idler gear 226 and the drive gear 217 would leave the print wheel 230 free to turn while it is positioned near the platen 242 if some means were not provided to lock the print wheel in its rotational position during this printing movement of the print wheel.

A print wheel locking pawl 278 is pivotally mounted intermediate its length on each print wheel carrier arm 223 by a pivotal connection 279 disposed forwardly of and somewhat below the corresponding print wheel axle pin 227. The locking pawl 278 is disposed in substantially upright position at the forward side of the associated print wheel and has on its upper end a hook formation 280, the end of which is double beveled to fit between any two adjacent printing bosses 233 projecting from the periphery of the associated print wheel. A tension spring 281 is connected between the lower end of the locking pawl 278 and the forward extension 236 of the arm 223 below the shoulder 237 and resiliently urges the locking pawl to rock about the pivotal mounting 279 in a direction to engage the end of the hook formation 280 thereof between adjacent printing bosses on the print wheel. At its lower end the pawl 278 is provided with a notch 282 of inverted V-shape and an actuating bar 283 extends transversely of the machine through the notches in the lower ends of all of the print wheel locking pawls 278.

The pawl actuating bar 283 is disposed in spaced parallel relationship to the drive gear axle 218 and is carried at its ends on the distal ends of the legs 284, shown in Figs. 9 and 11, and 285 of a rectangularly-shaped bail 286 pivotally mounted on the axle shaft 218.

A cam following rocker arm 290, Fig. 11, is pivotally mounted intermediate its length on the drive gear axle shaft 218 at the outer side of the intermediate frame member 186 and is disposed in substantially upright position. A cam following roller 291 on the bottom end of the arm 290 rides on the peripheral edge of the tens-transfer cam 173 at the forward side of this cam and a tension spring 292 connected between the upper end of the rocker arm 290 and the machine frame resiliently holds the cam following roller 291 against the associated cam 173. A spacing pin 293 extending through a slot in the intermediate frame plate 186 connects the rocker arm 290 above the shaft 218 to the leg 284 of the bail 286. A second spacing pin 294 connects a forward extension of the rocker arm 290 to the forward portion of the leg 284 of the bail 286.

The shape of the tens-transfer control cam 173 is such that the spring 292, which holds roller 291 against the peripheral edge of this cam, will hold the actuating bar 283 in such position, as illustrated in Fig. 9, relative to the lower ends of the locking pawls 278, that the pawls will be held out of engagement with the corresponding printing wheels until the actuator bail 192 nears the end of its downward stroke. At this time the roller 291 rides off of the lobe 295 of the cam 173 and frees the spring 292 to move the bar 283 in a direction to free the springs 281 to force the ends of the hook formations 280 at the outer ends of the locking pawls 278 into engagement between the angularly spaced-apart printing bosses 233 of the associated printing wheels. At the same time the actuator sectors 188 are aligned and latched in position by means presently described, and immediately afterward the print control bail 265 is moved to free the springs 264 to swing the released print wheel carrying arms 221. As the print wheel carrying arms are swung, the print wheel idler gears 226 are moved out of mesh with the print wheel drive gears 217. As the idler gears are held against rotation by engagement of the pawls 278 with the print wheels and the actuator sectors and print wheel drive gears are latched against rotation, no relative rotation between the idler gears 226 and drive gears 217 takes place during printing. The print wheels are also held firmly against rotational movement during the printing movement of the print wheel carrying arms.

When the printing operation has been completed and the print control bail 265 moved upwardly to restore the print wheel carrying arms 221 to their full-cycle position, a pin 296 on the actuator lead cam 175, Fig. 11, engages an offset shoulder 297 near the lower end of arm 290 and rocks this arm back to the full-cycle position shown in Fig. 9, thereby moving the pawls 278 out of engagement with the print wheels and restoring the rotational freedom of the print wheels so that the print wheels, which have been moved away from their "0" position, can be restored to their "0" position on the upward stroke of the actuator bail 192. Shortly after the pin 296 has restored the arm 290 the roller 291 again rides onto the lobe of cam 173 and the arm holds the bar 283 in position to maintain the pawls 278 clear of the print wheels 230 until the next printing operation.

4. ACTUATOR SECTOR ALIGNING AND LATCHING MECHANISM—FIG. 15

While the idler gears 226, Fig. 9, are out of mesh with the drive gears 217, it is also necessary to hold the drive gears against accidental rotation so that the idler gears will remesh smoothly with the associated drive gears when the print wheels are returned from their printing to their full-cycle, or home, position. Locking of the drive gears 217 is accomplished by aligning and temporarily locking the actuator sectors 188 during the time that these sectors are retained at the bottom end of their downward stroke, and suitable mechanism for this purpose is illustrated in Fig. 15.

A plurality of bellcrank shaped, sector locking pawls 298 are pivotally mounted in side-by-side or ordinal arrangement on a pawl supporting shaft 299 which extends transversely of the machine rearwardly of, and below the cam shaft 135 and is mounted at its ends in the intermediate frame plates 186 and 187. Each of the locking pawls 298 comprises an arm 300 extending forwardly from the mounting shaft 299 and having on its distal end an upwardly projecting ear 301, and an arm 302 extending downwardly from the shaft 299. A spring 303 is connected between the lower end of each pawl leg 302 and a bail mounting shaft 511 of the symbol printing mechanism, to be described later, and resiliently urges the pawl to rock about the shaft 299 in a direction to insert the corresponding pawl detent 301 between two adjacent teeth 189 of the actuator sector 188 in alignment with the particular pawl. A comb bar 304 of right-angular cross-sectional shape is disposed below and transversely of the shaft 299 and is mounted on the shaft for pivotal movement by arms, as indicated at 305, positioned one at each end of the comb. The comb has an upwardly extending leg 306 provided with spaced-apart notches or slots respectively receiving the legs 300 of the locking pawls 298 and a substantially horizontally disposed leg 307 having spaced-apart slots or notches receiving the downwardly extending legs 302 of the locking pawls. A cam follower lever 310 is mounted at one end on the shaft 299 at one end of the shaft and is drivingly connected to the comb 304. A cam following roller 311 is mounted on the forward end of the lever 310 and rides on the peripheral edge of the total taking cam 178.

When the roller 311 is disposed on the lobe of the cam 178, as shown in Fig. 15, the comb 304 is held in such position that the forward edges of the locking pawl legs 302 engage the inner edges of the corresponding notches in the bottom or horizontal leg 307 of the comb and the detents 301 of the locking pawls are held by the comb out of engagement with the teeth of the actuator sectors 188. The locking pawls are held out of engagement with the actuator sectors until the end of the downward stroke of the actuator sectors and are brought into engagement with the sector gear teeth at the end of the downward movement of the sectors by riding of the cam follower 311 off of the lobe of cam 178 to hold the actuator sectors against movement below the positions determined by the corresponding selector sectors 33. In the upward movement of the actuator sectors the sector teeth ratchet over the pawl detents 301, the cam follower 311 riding up on the lobe of cam 178 to withdraw the pawls from the actuator sectors near the end of the operating cycle of the machine. The locking pawls 300 are made separately, one for each actuator sector, so that the detents 301 thereof can drop into interdental spaces of the corresponding actuator sectors as the sectors are brought into alignment at the positions in which they are stopped at the end of the downward stroke of the actuator bail 192, as described above.

When the movable selector sectors 33, Fig. 16, have been brought back to their home position and stopped, the latch levers 208 connecting the actuator bail 192 to the respective actuator sectors 188 will yield, so that the bail can complete its downward movement with no further movement of the actuator sectors.

Just prior to the locking of the actuator sectors by the detents 301 of the pawls 300, the actuator sectors are brought into alignment at the end of their downward stroke by suitable aligning mechanism also shown in Fig. 15. This is necessary because the stop bar 27, Figs. 3, 16 and 27, for the home position of the selector sectors is so positioned that these sectors can move slightly beyond their normal home or full-cycle position in order to re-engage the noses 53 of the pawls 45 with the rearward ends of the sector latch dogs 50 when the selector sectors are returned to their "0" position by the downward stroke of the corresponding actuator sectors. This puts the actuator sectors and the print wheels driven thereby slightly out of their proper printing position and may leave the print wheels which have been released for printing out of accurate alignment across the print wheel orders.

The mechanism for accurately aligning the actuator sectors and the print wheels, when the sectors reach the end of their downward stroke and just before printing occurs, comprises a cam following rocker 312, Fig. 15, pivotally mounted intermediate its length on a cam rocker pivot shaft 313 positioned below the actuator sectors 188 and substantially parallel to the cam shaft 135. At its forward end the rocker 312 carries a cam following roller 314 which rides on the peripheral edge of the actuator aligning cam 176 and a spring 315 extends downwardly from the rearward end of the rocker or lever 312 and is connected at its lower end to the machine frame to resiliently maintain the roller 314 in engagement with the periphery of the cam 176. A bail 316 of right-angular shape has substantially parallel legs, as indicated at 317 in Fig. 15, spaced apart a distance slightly greater than the length of the actuator mechanism and disposed at the inner sides of the intermediate frame plates 186 and 187. At the open end of the bail these legs 317 are pivotally mounted on a shaft 319 carried by the actuator frame and extend downwardly and forwardly so that the intermediate or cross member 318 of the bail is disposed immediately below the actuator sectors. The cross member 318 carries at its front edge an upwardly and forwardly directed stop rib 320 so positioned that its edge remote from the cross member 318 will engage in approximately aligned interdental spaces of the actuator sectors 188 and bring these sectors into accurate angular or rotational alignment when the bail 316 is swung forwardly and upwardly about its pivotal mounting on the stop shaft 319.

An arm 321 of the rocker or lever 312 extends upwardly and rearwardly from the pivotal mounting of the lever 312 on the shaft 313 and is provided in its upper end with a notch 322. The lever 312 is positioned at the outer side of the intermediate frame plate 187 and this plate is provided with an aperture 323 at the upward end of the lever arm 321. A pin 324 extends from the bail leg 317 adjacent the plate 187 through the aperture 323 in this plate and is engaged in the notch 322 at the upper end of the lever arm 321 so that, when the forward end of the rocker arm 312 is forced downwardly by engagement of the lobe 325 of the cam 176 with the cam following roller 314, the bail 316 will be swung forwardly and upwardly to engage the leading edge of the rib 320 in interdental spaces of the actuator sectors 188 and bring these sectors into accurate alignment. As is apparent from the shape and relative position of the cams 176 and 178 in Fig. 15, the cam 176 acts first to bring the actuator sectors into alignment and immediately after the sectors have been aligned the rocker arm 310 is released to move the comb bar 304 in a direction to release the locking pawls 300 so that these pawls may be actuated by their springs 303 into locking engagement with the actuator sectors.

E. *Positive transmission gear mechanism—Fig. 16*

The mechanism, as mentioned above, which drivingly connects the actuator sectors 188 to the selector sectors 33, comprises a positive transmission gear mechanism disposed between the actuator and selector sectors and generally indicated at 330 in Fig. 16. This gear mechanism 330 comprises a bail including parallel legs, as indicated at 331 in Fig. 16, spaced apart a distance somewhat greater than the length of the actuator mechanism and interconnected by a suitable cross member 332 and the gear shafts 334, 335 and 336. A top cross member or transmission shifting member 333, shown in Figs. 13, 17 and 24, extends perpendicularly from the upper end of one leg above the top gear shaft and is used to shift the positive gear transmission mechanism, as will later appear.

The cross member 332 provides a rigid cage or carriage for the transmission gears and the three gear shafts or axles 334, 335, and 336 extend transversely of the space between the bail legs 331 in spaced-apart and parallel relationship to each other and are mounted at their ends in the corresponding bail legs 331. A plurality of transmission gears 337 are journalled on the upper gear shaft 334 in side-by-side or ordinal arrangement, the number of these gears being equal to the number of actuator sectors 188 and the gears being constantly in mesh with the corresponding actuator sectors 188 and with the corresponding print wheel drive gears 217, as is shown in Fig. 9. A plurality of intermediate or reversing gears 338 equal in number to the number of selector sectors 33, are journalled in side-by-side or ordinal arrangement on the intermediate gear axle 335 and these gears mesh respectively with the gears 337. A plurality of gears 340 are journalled on the gear axle 336 also in side-by-side or ordinal arrangement, the number of these gears also being the same as the number of selector sectors and the gears 340 mesh with the corresponding intermediate or reversing gears 338. The gears 337, 338 and 340 are preferably all ten-tooth gears of the same size with teeth of the size of the teeth on the selector sectors 33 and on the actuator sectors 188.

The upper gear axle 334 is extended beyond the legs of the gear carrying cage and is mounted at its ends in the intermediate frame plates of the machine so that the entire cage can swing about the axis of the axle 334 carrying with it the gear axles 335 and 336 and the gears 338 and 340.

In the addition and subtraction cycles of the machine, as will be later explained, the cage of the positive transmission mechanism is rocked by the cam 179, Fig. 17, to the position for meshing the gears at the free end of the cage with the selector sectors and this clockwise movement of the cage brings the transmission gears 340 corresponding to the number of selector sectors which have been stepped to the left during the entry of the figure to be added or subtracted into the selector mechanism, into mesh with the corresponding selector sectors 33 during the first portion of the machine cycle in which the actuator segment bail 192 is given its downward stroke. During the downward stroke of the actuator bail, the selector sectors which have been manually set and which are engaged or meshed with corresponding positive transmission gears 340 will be returned to their home or "0" position at which they are stopped by the stop bar 27. During the downward movement of the corresponding actuator sectors, the print wheels 230 in alignment with these sectors are rotated by the corresponding gears 337, 217 and 226, Fig. 9, to bring the numerals embossed on the print wheels, which correspond to the numbers for which the corresponding selector sectors are set, in position to impinge the platen 242 during the printing movement of the print wheels, as described above. During the subsequent upward stroke of the actuator bail while the selector sectors are disconnected from the actuator sectors, the print wheels are turned back to their zero setting.

1. SHIFTING MECHANISM FOR POSITIVE TRANSMISSION GEAR MECHANISM—FIGS. 16 AND 17

The positive or add gear mechanism 330 is moved into and out of operative engagement with the selector sectors 33 during the addition, subtraction, repeat-addition and print only cycles of the machine and is releasably latched in operative engagement with the selector sectors during the downward stroke of the actuator sectors by mechanism particularly illustrated in Figs. 14 and 17.

Referring first to Fig. 17, a three-armed bellcrank 342 is pivotally mounted at its knee on the rocker arm pivot shaft 313 and has arms 343 and 344 extending from the pivotally mounted knee portion of the lever divergently relative to each other. A cam following roller 345 on the distal end of the arm 343 of this lever rides on the peripheral surface of the pendant gear operating cam 179 and the distal end of the other arm 344 of the lever 342 is pivotally connected to one end of a link 346. The link 346 extends upwardly and forwardly from its pivotal connection with the distal end of the bellcrank lever leg 344 and has on its upper end of hook formation 347 positioned to engage the upper edge of the shifting element 333 of the transmission gear mechanism 330. An extension 348 is forwardly directed from the link 346 intermediate the length of this link. A spring 349 is connected between the distal end of the extension 348 and the bellcrank lever leg 344 intermediate the length of this leg and resiliently urges the hooked upper end of the link 346 forwardly and out of position to engage the shifting element 333 of the gear mechanism 330. At a location spaced from the hook formation 347, the link 346 is provided with a shoulder formation 350 projecting in the same direction as the hook formation. The distance between the opposed edges of the hook formation 347 and the shoulder formation 350 is slightly greater than the width of the shifting element 333, so that this element can be received between these opposed edgs.

A second link 351 is disposed alongside the link 346 and is pivotally connected at its lower end to the distal end of the bellcrank lever leg 344, this second link 351 having at its upper end a hook formation 352 but having no shoulder formation thereon corresponding to the shoulder formation 350 on the link 346.

Whenever the machine goes through an operative cycle, the cam 179 will, of course, be rotated through an angular distance of 360 degrees or one complete rotation and brought to a stop and the bellcrank lever 342 will be rocked about its pivotal mounting on the shaft 313 each time the cam 179 is rotated, the cam follower 345 being resiliently maintained in engagement with the peripheral edge of the cam 179 by a suitable spring 357 connected to the bellcrank lever 342.

A lever 353, Fig. 17, pivotally mounted intermediate its length on the print mechanism drive gear shaft 218 extends upwardly and forwardly and downwardly and rearwardly from the shaft 218 and has its upper end engaged by an abutment pin 354 on the rearward end of a link 742 connected to the mechanism operated by the addition control key of the machine, shown in Fig. 25. Therefore, forward movement of the pin 354 in response to a depression of the addition control key, as will be later explained, swings the lever 353 about its pivotal mounting on the shaft 218 to move the lower end of this lever upwardly, counter-clockwise in Fig. 17. At its lower end the lever is provided with an elongated slot or notch 355 which receives a pin 356 projecting laterally from the link 346 near the shoulder formation 350 on this link.

The lever 353 will be rocked in the manner indicated above not only upon depression of the addition key of the machine, but also upon depression of the repeat-addition key.

A second lever 358, also pivotally mounted intermediate its length on the shaft 218, is disposed alongside the lever 353 and is engaged at its upper end by an abutment pin corresponding to the abutment pin 354 projecting laterally from a link 359 extending rearwardly from the subtraction key mechanism, Fig. 25, so that the link 359 will be moved forwardly when the subtraction key is depressed, this link being also moved forwardly when the print only control key of the machine is depressed. At its lower end the lever 358 is provided with a notch similar to the notch 355 slidably receiving a pin projecting laterally from the link 351.

When the addition control key or repeat-addition control key of the machine is depressed, the link 346 is swung by the lever 353 to a position in which the transmission shifting element 333 of the gear mechanism 330 is received between the hook formation 347 and shoulder formation 350 on this link. With the element 333 engaged by the link 346, as the cam 179 is rotated, the link 346 is pulled downwardly to swing the transmission gear mechanism in a direction to mesh its gears 340 with the gear teeth of the selector sectors when the lobe portion of the cam 179 passes under the cam following roller 345. This movement of the gear mechanism 330 connects the actuator sectors 188 with the corresponding selector sectors 33 for the downward stroke of the actuator sectors and limits the downward movement of the actuator sectors to the digital positions of the corresponding selector sectors.

After the actuator sectors have been moved downwardly to their terminal position, aligned and locked in position, as described above, the reduced portion of the cam 179 comes opposite the roller 345 and the retracting spring 357 connected to the bellcrank lever 342 rocks the lever in a direction to move the link 346 upwardly thereby swinging the shifting element 333 of the gear mechanism 330 upwardly to move the gears 340 out of mesh with the teeth of the selector sectors, back to a neutral position, and from the neutral position into mesh with the drive gears of an accumulator mechanism, presently to be described, so that the entry value read out from the selector sectors 33 by the actuator sectors 188 on the downward movement of the actuator sectors and transmitted to the print wheels, will be transmitted to the accumulator on the upward, return stroke, of the actuator sectors.

In a similar manner the lever 358 moves the link 351 to position such that the hook formation 352 of this link engages the upper edge of the transmission shifting element 333 of the positive gear transmission mechanism 330 and, when the cam 179 is rotated, the transmission mechanism 330 is first swung to bring the gears 340 thereof into mesh with the selector sectors 33 before the downward stroke of the actuator sectors 188 of the machine. However, since the link 351 has no shoulder formation corresponding to the shoulder formation 350 on the link 346, the link 351 is not effective to move the gears 340 of the transmission mechanism 330 into mesh with the accumulator drive gears but only frees the transmission for a return to its neutral position when the cam following roller 345 rides onto the reduced portion of the cam 179.

2. LOCKING MECHANISM FOR POSITIVE GEAR TRANSMISSION—FIG. 14

The mechanism for locking the positive gear transmission mechanism 330 in each one of its three positions, that is, its position in which its gears 340 are in mesh with the selector sector gear teeth, its neutral position and its position in which its gears 340 are in mesh with the accumulator drive gears, is shown in Fig. 14 and comprises a T-shaped locking bar 362 which inclines downwardly and forwardly from the cam shaft 135. The upper end of the bar 362 is notched out to slidably receive the cam shaft and this notch is continued longitudinally of the bar at a reduced width to receive a guide pin 363 which insures rectilinear movement of the locking bar. A crosshead 364 on the lower end of the bar extends perpendicularly to opposite sides of the bar 362 and carries at its ends teeth 365 and 366 which are directed from the crosshead back along the bar 362 toward the cam shaft 135. The leg 331 of the cage of the transmission gear mechanism is provided at its free end with a formation 367 of increased width and spaced-apart notches 368, 369 and 370 are provided in the end of the formation 367, the portions of the formation between and at the outer sides of these notches being provided with inclined edges for camming the detent 365 into the notches.

A cam following rocker arm 372, Fig. 14, is mounted at its lower end on the rocker arm pivot shaft 313, Figs. 15, 17 and 19. The rocker arm 372 carries on its upper end a cam following roller 373 which rides on the peripheral edge of the transmission locking cam 170. A second lever arm 375 disposed in spaced and almost parallel relationship to the lever arm 372 is also pivotally mounted at its lower end on the shaft 313 and is pivotally connected at its upper end to the slide or locking bar 362 by a suitable pivotal connection 376. The lever arm 372 is drivingly connected to the lever arm 375 by a bail, not shown, in a manner to force the upper end of lever arm 375 to duplicate the cam following movements of the upper end of lever arm 372 while providing for lever arm 375 a limited freedom of movement which permits the upper end of the lever 375 to follow the rectilinear movement of the locking bar 362. A suitable spring, not illustrated, is connected between the machine frame and the lever 372 maintains the cam following roller 373 against the peripheral edge of the cam 170.

The cam 170 has lobe portions 377 and 378 of restricted angular extent disposed in substantially diametrically opposite relationship to each other and effective, when in engagement with the cam following roller 373 to move the locking bar 362 outwardly to retract the detent 365 from the end of the formation 367 on the end of the leg of the transmission cage.

While the transmission gear mechanism 330 is being swung by the cam 179 to mesh the transmission gears 340 with the selector mechanism sectors, the lobe 378 of the cam 170 holds the tooth 365 out of engagement with the end of the cage formation 367 and, as soon as the shifting of the transmission mechanism is complete, the roller 373 rides off of the cam lobe 378 permitting the tooth 365 to engage in the notch 370 and hold the transmission gears 340 firmly in mesh with the gear teeth of the selector sectors. Near the end of the dwell of the actuator sectors 188 at the end of their downward stroke, the roller 373 rides upon the cam lobe 377 forcing the tooth 365 out of the notch 370 and the transmission gear unit is then returned to its neutral position both by the cam 179 and by resilient centering means connected to the gear unit and presently to be described. If the transmission gear mechanism is stopped at its neutral position, when the roller 373 rides off of the cam lobe 377, the tooth 365 is engaged in the center notch 369 in the free end of the leg 331 of the transmission cage. However, if the transmission gear mechanism is moved past its neutral position by the link 346, as described above, to engage its gears 340 with the drive gears of the accumulator mechanism, the tooth 365, when released by the riding of the roller 373 off of the cam lobe 377, engages in the notch 368 to hold the gears 340 of the transmission mechanism firmly in mesh with the accumulator drive gears during the upward stroke of the actuator sectors.

The tooth 366 on the end of the crossbar 364 remote from the tooth 365 operates in a similar manner to lock a negative transmission mechanism in either its neutral, or its operative, position but this negative transmission is reserved for a later description in connection with the subtraction cycle and total taking cycles of the machine.

The mechanism which resiliently urges the pendant, transmission gear mechanism 330 to its neutral position in which its gears 340 are clear of both the selector sectors 33 and the accumulator drive gears is illustrated in Fig. 19 and generally indicated at 380. This mechanism comprises a pair of opposed jaws 381 and 382 pivotally mounted at corresponding ends on one end of the positive transmission gear shaft 334 and extending from the shaft 334 past the respectively opposite edges of the transmission shifting element 333 of the positive transmission cage. A stop pin 383 mounted on the adjacent frame plate is disposed between the free ends of the jaws 381 and 382, when a gear train is in its neutral position. A tension spring 384 connected between the jaws at a location between the gear shaft 334 and the element 333 resiliently urges the jaws toward each other and the free ends of the jaws against the stop pin 383 to hold the element 333 in its centered or neutral position. When the shifting element 333 is moved to one side or the other in consequence of rocking movement of the positive gear transmission mechanism in one direction or the other from its neutral position, the corresponding jaw 381 or 382 is forced away from the stop pin 383 tensioning the spring 384 which then resiliently urges the jaw back to its position at rest against the stop pin 383 and urges the shifting element 333 back to its position corresponding to the neutral position of the transmission gear mechanism.

In order to prevent incidental angular movements of those positive transmission gears and actuator sectors which are not being used to transmit a value entered into the selector unit of the digitation mechanism to the printing mechanism and the accumulator, a locking blade 385, as indicated in Fig. 16, is secured at one end to the left-hand end of the carriage of the shiftable selector unit and extends to the left from this unit parallel to the axis of the selector sector shaft 32. This blade has its outer edge in alignment with the outer ends of the second gear teeth of the selector sectors from the zero latch ends of the sectors and, when the transmission gears 340 are moved into meshing engagement with those selector sectors which have been stepped to the left of the right-hand side of the positive transmission mechanism, the locking blade 385 enters into interdental spaces of all of the gears 340 to the left of the left-hand end of the shiftable selector mechanism and holds these gears 340 against any rotational movement during the downward stroke of the corresponding actuator sectors 188. This insures that any print wheel which is not moved from its "0" position in response to the transmission of an entry value from the selection mechanism to the printing mechanism will be retained in its "0" position.

F. *Accumulator mechanism—Figs. 16, 20, 21, 22 and 24*

The accumulator mechanism of the adding machine is generally indicated at 390 and particularly illustrated in Figs. 16, 20, 21, 22, and 24. This mechanism is provided as a unitary structure which is installed in the machine through an opening 391 in the machine base 392 and has a rigid frame including brackets 393 and 394 which are disposed one along each side of the opening 391 and extend upwardly through the opening, these brackets having perpendicularly offset, apertured lugs, which extend into recesses in the base at the corresponding sides of the opening 391 and are secured to the base by screw fasteners, as indicated at 395. The frame also includes left and right end plates 396 and 397, disposed in spaced-apart and parallel relationship to each other, and a plurality of separator plates 398 uniformly spaced apart between the end plates 396 and 397 and disposed in parallel relationship to each other and to the end plates. The end plates and the separator plates are provided with aligned apertures including one series of aligned apertures near the bottom edges and the front ends of these plates and one set of aligned apertures near the bottom edges and the rear ends of the plates. A supporting bar 400 of rectangular cross-sectional shape extends through the series of apertures near the front edges of the plates while a similar bar 401 extends through the series of apertures near the rear edges of the plates. The bars 400 and 401 are secured to the upstanding portions of the brackets 393 and 394 by suitable means, such as the screw fasteners 402 extended through apertures in the brackets and threaded into tapped holes in the corresponding ends of the bars.

Suitable clamping means such as a base plate 403, as illustrated in Fig. 16, or clamping strips, underlie the bottom edges of the plates 396, 397 and 398 parallel to the supporting bars 400 and 401. Screw fasteners 404 extend through apertures in the clamping means and are threaded into tapped holes extending transversely of the bars 400 and 401 to clamp the end plates and spacer plates rigidly in their position on the supporting bars. The plates are also reinforced in their spaced and parallel relationship to each other by various shafts and through pins, as will become apparent during the following description of the accumulator mechanism.

A main axle shaft 405 extends transversely through the plate assembly intermediate the height of the plates and is secured at its ends in the end plates 396 and 397, projecting at its ends beyond the outer sides of these end plates shown in Fig. 20. A plurality of accumulator gears 406, Figs. 16 and 20, are mounted in side-by-side or ordinal relationship on the shaft 405 and are disposed one gear in each space between the adjacent spacer plates 398 and one gear between each outside spacer plate 396' and 397' and the adjacent end plate, there being eleven of these accumulator gears or one more than the ten selector sectors, as described above. Each accumulator gear 406 has twenty gear teeth 407 uniformly spaced apart around its periphery and a tens-transfer cam structure 408 is disposed against one side of each accumulator gear and rigidly secured to the gear for rotation therewith.

Each tens-transfer cam structure 408 comprises a bar extending diametrically of the associated accumulator gear and having an enlarged and apertured center portion through which the shaft 405 extends and double beveled end portions terminating in blunted points disposed in alignment with interdental spaces at diametrically opposite sides of the gear.

A drive gear shaft 410 extends transversely through the plate assembly above and parallel to the shaft 405. This shaft 410 also extends at its ends outwardly of the outer sides of the end plates 396 and 397 of the plate assembly. Accumulator drive gears 411 are journalled in side-by-side or ordinal arrangement on the shaft 410, there being eleven of these gears disposed one in each space between adjacent plates of the plate assembly and meshing with the corresponding accumulator gear 406. Each drive gear has ten gear teeth 412 so that it requires two rotations of a drive gear to complete one rotation of the associated accumulator gear.

A detent shaft 414 extends transversely through the plate assembly at the upper, width reduced end of the assembly and detent pawls 415 are rockably mounted on the shaft 414 in ordinal arrangement along the shaft, there being one detent pawl for each of the accumulator drive gears 411. Each pawl has at one end a bearing portion 416 receiving the shaft 414 and at its other end a V-shaped detent formation 417 which engages in the interdental space at the upper side of the associated drive gear 411 to hold the drive gear and corresponding accumulator gear against accidental rotation. Each pawl is resiliently held in movement resisting engagement with its associated drive gear by a tension spring 418 connected between the pawl at a location intermediate the length of the pawl and a tie rod 419 which extends transversely of the plate assembly below and parallel to the detent shaft 414.

With the above-described arrangement it will be apparent that, when the positive gear transmission 330 is rocked, as described above, to mesh its gears 340 with the accumulator drive gears 411 during the upward or return stroke of the actuator sectors 188, the drive gears 411 will be rotated in an additive or clockwise direction and will impart an opposite or counterclockwise rotation to the associated accumulator gears 406.

G. *Negative transmission gear mechanism*

Means are also provided for rotating the accumulator gears in a negative or subtractive direction during the upward stroke of the actuator sectors 188 and this means includes a negative or subtractive gear transmission assembly, generally indicated at 420, Fig. 16.

The gear assembly 420 comprises a bail having parallel legs 421 spaced apart a distance at least as great as the length of the actuator mechanism and the accumulator mechanism and connected by a cross portion 422 extending transversely across the space between and joined at its ends to the legs 421. Spaced-apart and parallel gear shafts 423 and 424 are mounted at their ends in the bail legs 421 and extend across the space between these legs. A plurality of ten-tooth transmission gears 425 are mounted in side-by-side ordinal arrangement on the shaft 423 while a plurality of similar, ten-tooth transmission gears 426 are mounted in side-by-side or ordinal arrangement on the shaft 424 and mesh with corresponding gears 425.

It will be noted that the postive gear transmission 330 has an odd number of gear sets, three such sets being shown in the accompanying drawings, while the negative gear transmission 420 has an even number of gear sets, two such gear sets being illustrated. This provides an arrangement wherein the postive gear transmission will rotate the accumulator drive gear 411 in one direction to add a positive or additive value to the accumulator while the negative transmission 420 will rotate the drive gears in the opposite direction to apply a subtractive or negative value to the accumulator.

The bail legs 421 of the negative transmission bail extends beyond the gear shaft 423 in a direction away from the gear shaft 424, the bail being mounted on spaced-apart pivot studs 427 having a common axis, Fig. 14, which extends through the bail legs at the ends thereof at the side of the shaft 423 remote from the shaft 424. The studs 427 are mounted in the intermediate frame plates 186 and 187 of the machine to provide a pivotal mounting for the negative gear transmission parallel to but spaced from both of the gear shafts 423 and 424. The negative transmission mechanism is rocked about its pivot studs 427 by mechanism shown in Fig. 17 and comprising an arm 428 which projects perpendicularly from the subtraction control link 351 alongside of, and beyond the extension 348 of the addition control link 346, the arm 428 having its distal end disposed in alignment with a projecting end of the gear shaft 424 of the negative transmission mechanism.

With this arrangement, after the depression of the negative control key causes the hook formation 352 to engage the link 351 with the top cross member 333 of the positive gear transmission. The rotation of cam 179, which follows immediately, pulls link 351 downwardly to rock the positive gear train in a direction to bring its gears 340 into mesh with the selector sectors before the downward stroke of the actuator sectors 188. This arrangement also permits return of the positive gear transmission to its neutral position when the cam follower 345 on the rocker arm 342 rolls off of the lobe of the cam 179, movement of the rocker arm 342 by its retracting spring 357, being ineffective to move the shifting element 333 of the positive gear transmission cage in a direction to mesh the gears 340 of the positive transmission with the accumulator drive gears because of the absence of a shoulder formation on the link 351. However, the rocking of link 351 and its arm 428, clockwise in Fig. 17, positions the arm 428 so that the distal end portion 429 of this arm engages the projecting end portion of the gear shaft 424, so that the subsequent upward movement of link 351 will rock the negative gear transmission 420 in a direction to mesh the gears 426 with the accumulator drive gears 412, the gears 425 being in mesh with the actuator sectors 188, Fig. 16.

One leg 421 of the negative gear transmission cage is provided on its free end with a terminal formation 480, Fig. 14, of increased width and this formation is provided in its distal end with spaced-apart notches 481 and 482, the ends of the portions of the formation 480 at the sides of these notches being beveled to provide cam edges leading into the open, outer ends of the notches. During the cycling of the machine while a positive entry is being made into the accumulator or a positive total abstracted therefrom, the negative transmission unit remains in its neutral position and the tooth 366 on the crosshead 364 of the locking bar 362 is moved into the notch 481 to hold the negative gear transmission against movement at the times the positive gear transmission is held in mesh with the selector sectors. However, when a negative value is being entered into the accumulator or a negative total being taken therefrom and the negative gear unit is swung into meshing engagement with the accumulator drive gears, the tooth 366 is entered into the notch 482 in the formation 480 to hold the negative transmission gears in mesh with the actuator sectors and the accumulator drive gears during the upward or return stroke of the accumulator sectors.

The finger 428 is provided at its distal end with a laterally offset nose formation 429, Fig. 17, which engages the adjacent end of the shaft 424 when the link 351 is moved by the cam following rocker 342 when the link 351 has been raised by operation of the subtract key but which misses the end of the shaft 424 when the link 351 is moved by the rocker arm without first having been raised by operation of the subtraction key so that the negative gear transmission mechanism will not be rocked to operative position except when the subtraction key is operated or when a negative balance is to be read out of the accumulator, as will be later described.

The link shifting levers 353 and 358 are provided near their lower ends with forwardly directed nose or lug formations, as indicated at 430 for the lever 353, which lug formations rest at their distal ends on the upper surface of a fixed guide plate 431 which extends transversely of the machine immediately above the cam 179 and constitutes a portion of a bracket 434 which carries the shafts 196 and 218, to limit the movement of the lever arms 353 and 358 in a link retracting direction, and the links 346 and 351 are provided near their upper ends with downwardly and forwardly extending guide fingers 435 and 436, respectively, which are guided in corresponding slots extending transversely of the plate 431.

From the above description it will be observed that the actuator sectors 188 while undergoing their upward or return strokes are effective to rotate the accumulator drive gears 411 in either a positive direction or a negative direction depending upon whether the positive transmission gear mechanism 330 or the negative transmission gear mechanism 420 is moved into driving engagement with the accumulator drive gears 411.

For a more convenient understanding of the subsequent description, it will be noted that, when looking at the accumulator mechanism from the right-hand side of the machine, as in Fig. 16, the positive rotational direction of the accumulator drive gears 411 is clockwise and that of the associated accumulator gears 406 counter-clockwise and that the direction of negative rotation of the drive gears 411 is counter-clockwise and the direction of negative rotation of the accumulator gears 406 clockwise.

H. *Tens-carrying mechanism of the accumulator—Figs. 16, 20 and 22*

As in all mechanical accumulators, it is necessary to provide mechanism which becomes effective when any particular accumulator gear advances past its "9" and to its "0" position to advance the accumulator gear of the next highest order an angular extent corresponding to one gear tooth or a single unit space. This is a tens-transfer mechanism and in the accumulator of the present invention this mechanism is provided in two symmetrical parts located at diametrically opposite sides of the accumulator gears so that it can accomplish its tens-transfer function in either a positive or a negative rotational direction of the corresponding accumulator gears depending upon whether a positive or a negative entry is being stored in the accumulator.

Shafts 438 and 439 extend transversely of the accumulator plate assembly below the accumulator gears 406 and in spaced and parallel relationship to each other and the accumulator gear shaft 405. A number of bellcrank levers 440, equal in number to the number of accumulator gears 406, are pivotally or rockably mounted at their knees on the shaft 438 in side-by-side or ordinal arrangement. Each of these bellcrank levers has one arm 441 extending downwardly and rearwardly toward the complementary shaft 439 and terminating substantially midway between the shafts 438 and 439 and has an arm 442 projecting upwardly and forwardly from the shaft 438 and provided near its upper end with a rearwardly directed hook formation 443. Bellcrank levers 444 are rockably mounted at their knees on the shaft 439 in side-by-side or ordinal arrangement relative to each other and are also equal in number to the number of accumulator gears 406. Each lever 444 has a leg 445 extending upwardly and forwardly toward the shaft 438 and terminating medially of the distance between the shafts 438 and 439, it being noted that the distal ends of the lever arms 441 and 445 overlap between the lever supporting shafts 438 and 439. Each lever 444 also has a rearwardly directed leg 446 provided near its distal end and on its upper edge with an upwardly directed hook formation 447. Tension springs 448 extend between the hook formations 443 and 447, each spring being connected at one end to the hook formation 443 on a bellcrank lever 440 and at its other end to the hook formation 447 on the opposite bellcrank lever 444 and tending to resiliently rock the two bellcrank levers toward each other about their pivotal mountings on the shafts 438 and 439.

A tens-transfer pawl 450 is pivotally mounted by a pivot connection 451 on the upper end of each bellcrank leg 442 and has an angularly-shaped arm 452 directed toward the aligned accumulator gear 406 and terminating at its distal end in a nose formation 453 which will engage a tooth of the aligned accumulator gear and rotate the corresponding gear through one unit space in a positive entry direction when the bellcrank lever 440 is rocked about the shaft 438 by the spring 448 in a direction such that the hook formation 443 moves toward the hook formation 447 of the opposite bellcrank lever 444. Adjacent the nose 453, the arm 452 is provided with a terminal shoulder 454 which engages a stop bar 455 extending transversely through the accumulator plate assembly and limits the rotational movement imparted to the accumulator gear by the nose 453 to a single unit space.

The axis of the stop bar 455 is in or adjacent to a plane including the axes of the accumulator gear shaft 405 and the bellcrank pivot shaft 438 intermediate the distance between the shaft 405 and the shaft 438 and this stop bar also serves as a tie rod to reinforce the accumulator plate assembly.

The pawl 450, in addition to the arm 452, includes a hook formation 456 which projects from the pawl radially of the pivotal connection 451 and in a forward direction and which is connected by tension spring 457 to a lug 458 projecting radially from the forward edge of the bellcrank lever 440 adjacent the shaft 438. The spring 457 resiliently urges the pawl 450 to rotate in a direction to raise the nose 453 into engagement with the teeth of the aligned accumulator gear when the bellcrank 440 is rocked in a rearward direction by the spring 448. The pawl is also provided with a radially directed stop arm 459, the distal end of which engages a stop pin or stud 460 carried by the bellcrank arm 442 to limit rotational movement of the pawl 450 by the spring 457. The arm 452 of the pawl is provided intermediate the length of its upper edge with a latching shoulder 461.

Shafts 462 and 463 extend transversely of the accumulator plate assembly above the accumulator gear shaft 405 and near the front and rear edges, respectively, of the plate assembly. These shafts 462 and 463 are disposed in spaced and parallel relationship to each other and to the shaft 405 and the shaft 462 is above the shaft 438 while the shaft 463 is above the shaft 439.

A plurality of latch levers 465 are rockably mounted each at its upper end on the shaft 462 in side-by-side or ordinal arrangement relative to each other and these latch levers depend from the shaft 462 and each carries at its lower end an abutment formation 466 which engages the shoulder 461 on the corresponding transfer pawl 450 and holds the pawl in retracted position with its nose 453 spaced from the corresponding accumulator gear 406. Each latch lever 465 has intermediate the length thereof and at the side thereof nearest the accumulator gears 406 a rearwardly extending nose formation 467 which abuts against a stop bar 468 when the lever is in latching engagement with its associated pawl 450 to limit rocking movement of the lever about the shaft 462 in a direction toward the accumulator gears. A tension spring 469 connected between the lower end portion of the latch lever 465 and a tie rod 470 extending transversely through the accumulator plate assembly between the lower end of the latch lever 465 and the accumulator gear assembly, resiliently urges the latch lever to rock toward the gear assembly.

A live pawl or actuating dog 472 is disposed against one side of each of the latch levers 464 and pivotally connected to the corresponding latch lever by a pivotal connection 473 located medially of the length of the latch lever. The actuating dog 472 is provided with an abutment formation 474 which projects radially from the pivotally mounted portion of the dog into the path of the outer end portions of the tens-transfer cam 408 carried by the corresponding accumulator gear and is also provided with a forwardly directed arm 475 connected near its distal end by a spring 476 to the upper end portion of the latch lever 465. The spring 476 resiliently urges the actuating dog 472 to rotate relative to the associated latch lever 465 until a stop arm 477 on the actuating dog is brought to bear against a stud 478 projecting laterally from the corresponding latch lever 465. The stop arm 477 bears against the side of the stud 478 remote from the accumulator gear assembly so that, when the accumulator gear 406 is rotating in a positive or counter-clockwise direction, as viewed in Fig. 16, and an end of the tens-transfer cam member 408 engages the abutment formation 474 applying pressure in a downward direction to this abutment formation, the actuating dog will not rock relative to the associated latch lever 465 but, the latch lever 465 will be forced to swing away from the accumulator gear assembly releasing the abutment formation 466 on the lower end of the latch lever from the latching shoulder 461 on the associated pawl 450 to free the pawl 450 for rocking movement of this pawl and the associated bellcrank 440 about the shaft 438 in a direction to move the nose 453 against a tooth of an aligned accumulator gear and rotate the gear one unit space in the positive or counter-clockwise direction.

The spring-biased pivotal connection between the tens-transfer pawl 450 and the associated bellcrank 440 permits the bellcrank lever and the pawl carried thereby to be returned from a gear moving position to their home or full-cycle position, as illustrated in Fig. 16, without imparting any rotation in a reverse or negative direction to the associated accumulator gear and the spring-biased pivotal connection between the actuating dog 472. The associated latch lever 465 permits the end portions of the corresponding tens-transfer cam 408 to move past the abutment formation 474 of the actuating dog in a negative or clockwise direction without moving the associated latch lever 465 to release the corresponding tens-transfer pawl 450.

The nose 453 on each tens-transfer pawl 450 is off-set laterally to the left from the abutment formation 474 of the actuating dog 472 mounted on the latch lever 465 holding the particular pawl so that, when the latch lever is released from its associated pawl by engagement of the tens-transfer cam 408 on the accumulator gear in alignment with the latch lever 465, the detent 453 will engage a tooth of the accumulator gear of the next higher order, that is, the accumulator gear immediately to the left of the gear carrying the tens-transfer cam which released the latch so that the gear of the next higher order will be advanced one unit space in the positive or additive direction.

A tens-transfer pawl 485 is pivotally mounted on each of the negative bellcrank levers 444 and urged by a tension spring 486 connected between a hook formation on the pawl and a lug on the bellcrank lever to a rotational position in which the stop arm 487 on the pawl engages the stop stud 488 on the arm 446 of the lever 444. Each transfer pawl 485 carries a terminal nose formation 489 effective when the arm 444 is rocked by the spring 448 toward the corresponding accumulator gear 406 to move the accumulator gear engaged by the particular nose 489 one unit space in a negative or clockwise direction, as viewed in Fig. 16. Each transfer pawl 485 is also provided with a terminal shoulder 490 which engages a stop bar 491 extending transversely of the accumulator plate assembly in spaced and parallel relationship to the stop bar 455 to limit swinging movements of the pawl 485 under the influence of spring 448 to an extent such that the nose 489 will move the corresponding accumulator gear one unit space only. The assembly of each negative bellcrank 444 and corresponding transfer pawl 485 is identical with the corresponding positive assembly including a bellcrank lever 440 and pawl 450, and the spring-biased pivotal connection between the pawl 485 and the bellcrank 444 permits the pawl and bellcrank assembly to be returned to its home or full-cycle position after a gear rotating movement without imparting any rotational movement to the associated accumulator gear.

Negative latch levers 492 are pivotally mounted at their upper ends on the shaft 463 in side-by-side or ordinal relationship to each other and depend from the shaft 463 toward the corresponding transfer pawls 485. Each latch lever 492 carries on its lower end an abutment formation 493 which engages with the latching shoulder on the upper edge of the corresponding pawl 485 to releasably hold the pawl in its home, or full-cycle, position retracted from the corresponding accumulator gear. A tension spring 494 is connected between each latch lever 492 near the lower end of the lever and a tie rod 495 extending transversely of the accumulator plate assembly, resiliently urges the latch lever to swing about the shaft 463 to its pawl latching position. A nose formation 496 directed forwardly from the forward edge of the lever 492 medially of the length of the lever engages a stop bar 497 extending transversely of the accumulator plate assembly to stop the spring induced swinging movement of the latch lever 492 when the lever has been brought by the spring to its latching position.

A latch lever actuating pawl 498 is pivotally mounted on each latch lever 492 medially of the length of the latch lever by a pivotal mounting 499 and a tension spring 500 connected between one end of the dog 498 and the upper end portion of the lever 492 resiliently urges the dog to rotate relative to the associated lever 492 until the stop arm 501 on the dog is brought to bear against the outer side of the stop lug 502 extending laterally from the upper portion of the latch lever 492.

The dog 498 carries an abutment formation 503 disposed in the path of the end portions of the tens-transfer cam member 408 carried by the corresponding actuator gear 406 and the spring tension on the dog 498 is such that when the gear 406 is rotating in a positive or counter-clockwise direction, as viewed in Fig. 16, the ends of the tens-transfer cam will pass the abutment formation 503 and rock the dog relative to the associated latch lever 492 without moving the latch lever out of latching engagement with the corresponding pawl 485. However, when the accumulator gear is rotated in a negative, or clockwise direction, as viewed in Fig. 16, engagement of an end of the tens-transfer cam 408 with the corresponding abutment formation 503 will tend to move the actuating dog 498 relative to the latch lever 492 in a direction in which movement is precluded by the stop arm 501 and stud 502, thereby swinging the latch lever about the shaft 463 in a direction to release the associated transfer pawl 485 and free this pawl to impart a single step or unit space rotational movement to a corresponding accumulator gear. The terminal nose 489 of the negative gear moving assembly is laterally offset to the left from the position of its associated abutment formation 503, in the same manner as in the positive gear rotating assembly, so that, when the tens-transfer cam on one accumulator gear moves the aligned latching lever 492 to release the corresponding transfer pawl 485 and bellcrank lever 446, the nose 489 will engage and impart a one step or unit space rotational movement to the accumulator gear of the next higher order.

With the above-described arrangement the tens-transfer operation will be carried forward in either a positive or a negative direction, but in each case the tens-carry operation will be made from an accumulator gear passing to or through its "0" position to the accumulator gear of the next higher order immediately to the left of the gear passing to or through its "0" position.

The operation of the tens-transfer mechanism, as described above, is controlled by a bail, generally indicated at 505, the cross or intermediate portion 506 of which constitutes an actuating bail rod, or member, extending transversely of the accumulator plate assembly below the distal ends of the legs 441 and 445 of the bellcrank levers 440 and 444. The legs 507 and 508 of the bail 505 are pivotally mounted at the open end of the bail on a shaft 509 which is supported on the end plates 396 and 397 of the accumulator plate assembly parallel to and forwardly of the shaft 438. A bellcrank lever 510 (Fig. 23) is pivotally mounted at one end on the intermediate frame plate 187 of the machine by a pivotal mounting 511 disposed rearwardly of and below the cam shaft 135. One arm 512 of this bellcrank lever 510 extends forwardly from the pivotal connection 511 and is connected at its forward end to the adjacent end of the bail 506 by a link 513.

A second arm 514 of the bellcrank lever extends upwardly from the leg 512 near the free or distal end of the latter and terminates at a location above the tens-transfer actuating cam 173. A cam following roller 515 is carried on the upper end of the bellcrank arm 514 and rides on the peripheral edge of the cam 173 and a tension spring 516 connected to the leg 512 and depending therefrom is connected at its lower end to the machine frame and resiliently urges the bellcrank lever 510 downwardly and the cam following roller 515 into engagement with the edge of the cam 173.

The bail 505 has three operative positions including: (1) an intermediate position in which it is slightly below the distal end portions of the bellcrank lever arms 441 and 445 so that, when any one of the pawls 450 or 485 is unlatched, the corresponding spring 448 will swing such transfer pawl and its associated bellcrank lever about the supporting shaft 438 or 439 an angular extent such that the pawl cannot be relatched by the corresponding latch lever when the tens-transfer cam 408 moves past the abutment formation 474 or 403 which occasioned the unlatching of the pawl; (2) a top position in which it is raised sufficiently above its intermediate position to restore any pawl which has been unlatched; and (3) a home or full-cycle position in which it is disposed below its intermediate position a distance sufficient to permit the tens-transfer action to take place.

After being unlatched and moved to a position at which it cannot be relatched, the movement of the transfer pawl and its carrying bellcrank lever is arrested by the engagement of the distal end portion of the corresponding bellcrank lever arm 441 or 445 with the bail rod 506 with the latter in its intermediate position, so that the tens-carrying operation is delayed until after the entry has been made into the accumulator and the actuator sectors have returned to their home or full-cycle position.

The shape of the cam 173 and its rotational position on the cam shaft 135 is such that the bail rod 506 is held up in its intermediate position during the portion of the machine cycle in which the actuator sectors accomplish their downward and upward strokes and completely enter the selected value into the accumulator.

Immediately after the actuator sectors have returned to their full-cycle position the cam following roller 515 drops from the lobe portion into the recess 517 of the cam 173 moving the bail rod 506 downwardly away from the bellcrank lever arms 441 and 445 to its full-cycle position, thereby freeing those bell-cranks and transfer pawl assemblies which have been unlatched to simultaneously complete their tens-carrying operation under the power of the associated springs 448.

Cam following roller 515 does not ride out of the recess 517 of the cam 173 before the end of the operating cycle so that the bail rod 506 is left in its lowered or full-cycle position when the operating cycle terminates. At the beginning of the next operating cycle of the machine, the cam following roller 515 rides up on the lobe portion 295 of the cam 173 first raising the bail rod 506 to its top position somewhat above its intermediate position to restore all of the released bellcrank and transfer pawl assemblies to their latched condition and to then lower the bail slightly to its intermediate position, as described above.

I. *"Fugitive 1" addition and subtraction mechanism*

When an accumulated total is taken or read out from the accumulator, the accumulator gears are rotated by the downward stroke of the actuator sectors 188 in the direction opposite to that in which these gears were rotated to accumulate a positive or negative total. Thus, as viewed in Fig. 16, when a positive total is taken, the accumulator gears will be rotated in a clockwise direction until the end of the tens-transfer cams 408 approaching the positive latch lever actuating dog abutments 474, engage the undersides of these abutments. As the latch lever actuating dogs 472 are now locked against movement by means presently to be described, the rotational movement of the accumulator gears will be stopped when the end portions of the tens-transfer cams 408 engage the abutments 474 with all of the accumulator gears in "0" position with relation to the positions of the ends of the tens-transfer cams relative to the abutments 474. The accumulator is then in positive zero setting, but, since the opposite ends of the tens-transfer cams will still be above the corresponding abutment formations 503 on the negative side of the accumulator, the negative setting of the accumulator is a series of nines.

Assuming that the accumulator has thus been cleared by a positive total taking cycle, leaving the accumulator in a positive "0" and a negative "9" setting, and that a number, for example, a "1," is subtractively introduced into the accumulator, moving the lowest order accumulator gear through one unit space in a negative direction, if a total were now taken, an erroneous value of ".00T" would be printed. Likewise, if the accumulator were cleared to its negative zero setting by the printing of a negative total, leaving the ends of the tens-transfer cams against the undersides of the negative abutment formations 503, the positive setting would be a series of nines since the ends of the tens-transfer cams adjacent the positive abutment formations 474 are not disposed above these formations. The additive introduction of a number into the accumulator will now produce an erroneous total, the total printed, if the number added is "1" being ".00T" instead of ".01T" as it should be.

This error is not involved in the theoretical operating principles of the machine but is introduced by structural limitations, particularly the requirement that the end portions of the tens-transfer cams and the abutment formations 474 and 503 have definite thickness in planes perpendicular to the rotational axis of the accumulator gears.

This mechanical limitation of the accumulator can be corrected by adding a "1" in the lowest order of the accumulator, that is, by moving the lowest order accumulator gear one unit space in the proper direction when a value is subtractively introduced into the accumulator when the accumulator is in its positive zero setting or when a value is additively introduced into the accumulator when the latter is in its negative zero setting. This correction is referred to in the art as the addition of the "fugitive 1."

The mechanism for adding in the "fugitive 1" comprises the 11th or highest order of accumulator gears and mechanism for stepping the lowest order gear one unit space in the proper direction whenever the highest order gear passes its positive zero location in its positive rotational direction or its negative zero location in its negative rotational direction.

The mechanism referred to comprises positive and negative latch levers 465' and 492', Fig. 20, rockably suspended from the shafts 462 and 463, respectively, at diametrically opposite sides of and in alignment with the 11th order accumulator gear 406, and latch lever actuating dogs 472' and 498' pivotally mounted on the latch levers 465' and 492', respectively, and spring urged to predetermined positions relative to the corresponding latch levers in the manner described above.

A positive transfer bail 520 extends transversely of the accumulator above the forward portion of the accumulator plate assembly and is secured at its left-hand end to the upper end portion of the positive latch lever 465' of the highest order of the accumulator and at its right-hand end to the upper end portion of the positive latch lever of the lowest accumulator order. A corresponding negative transfer bail 521 extends transversely of the accumulator above the rearward portion of the accumulator plate assembly and is secured at its left-hand end to the upper end portion of the negative latch lever 492' of the highest or 11th order of the accumulator and at its right-hand end to the upper end portion of the corresponding negative latch lever of the lowest order of the accumulator.

When the 11th order accumulator gear passes through its positive "0" position with a positive rotational direction, the adjacent end of the corresponding tens-transfer cam 408 engages the abutment formation 474, Fig. 16, on the actuating dog of the positive latch lever 465' and rocks this latch lever. This rocking of the latch lever 465' rocks corresponding bail 520 and the bail, in turn, releases the positive latch lever 465 of the lowest order from its associated transfer pawl 450 so that the lowest order accumulator gear will be advanced one unit space near the end of the operating cycle when the bail rod 506 moves away from the bellcrank lever arms 441 and 445 in the manner described above.

Similarly, when the 11th order accumulator gear passes through its "0" position with a negative direction of rotation, its tens-transfer cam rocks the associated negative latch lever 492' which, through the negative transfer bail 521, rocks the negative latch lever of the first order accumulator gear, thereby conditioning the tens-transfer mechanism of the 1st order to add a negative "1" to the lowest order accumulator gear near the end of the operating cycle, as explained above.

J. *Algebraic sign sensing mechanism of the accumulator*

Figure 24:
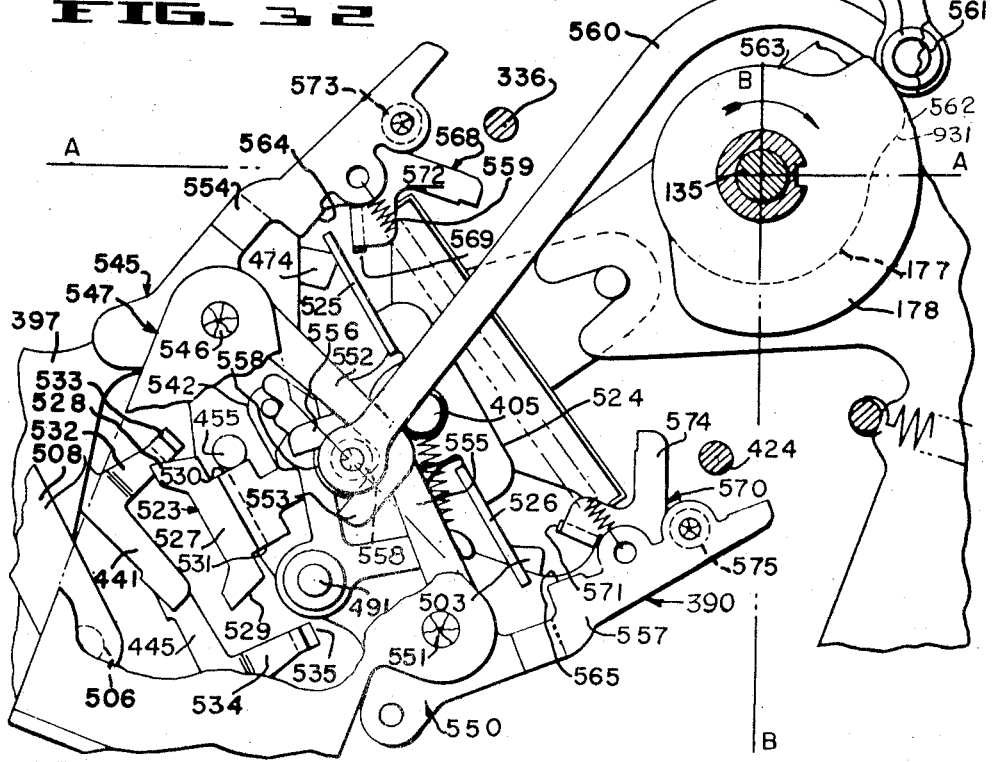
Fig. 24 is a side elevational view from the right-hand side of the machine showing the total and subtotal printing cams and the accumulator operated mechanism for sensing the algebraic sign of the total carried in the accumulator and placing the machine in condition to read out either a positive or a negative total or subtotal.

Referring particularly to Figs. 22 and 24, a T-shaped blocking member, generally indicated at 523, is pivotally mounted near one end and centrally of the width thereof on the right-hand end portion of the accumulator gear shaft 405 projecting outwardly of the right-hand end plate 397 of the accumulator plate assembly. This member 523 is provided on its pivoted end with a symmetrical crosshead 524, the opposite end portions of which are disposed perpendicular to the longitudinal center line of the member and extend substantially equal distances therefrom. The outer portions 525 and 526 of the crosshead are disposed perpendicular to the longitudinal center line of the center or intermediate portion thereof so that the outer portions have their greatest cross-sectional dimensions substantially in a plane including the axis of the accumulator gear shaft 405.

The blocking member, or gate, is provided at its free or distal end with a symmetrical formation 527 of a width greater than the width of the intermediate portion of the member and the formation 527 is provided at its outer end with oppositely disposed cam edges 528 and 529 spaced substantially equal distances from the longitudinal center line of the member 523 and symmetrically convergent toward the axis of the shaft 405. Inwardly of the cam edges 528 and 529 the formation 527 provides shoulders 530 and 531 which are substantially parallel to the longitudinal center line of the blocking gate and equally spaced from this center line.

The blocking member 523 has two operative positions in one of which the shoulder 530 at the forward side of the blocking member engages the stop bar 455 to positively position the blocking member in the corresponding operative position and in the alternative operating position the shoulder 531 positively engages the stop bar 491 to positively position the blocking member in this alternative operative position.

The arm 441 of the bellcrank lever 440 of the lowest order of the accumulator is provided intermediate its length with an upwardly and rearwardly projecting arm 532 and this arm is provided at its upper end with a laterally offset tongue formation 533 which is engageable with the adjacent cam edge 528 of the blocking member 523 to rock the blocking member about its pivotal mounting on the shaft 405 to its operative position in which the shoulder 531 engages the stop rod 491. An arm 534, similar to the arm 532, extends upwardly and rearwardly from the leg 445 of the bellcrank 444 of the lowest order of the accumulator. This arm 534 carries on its distal end a laterally extending tongue formation 535 which is engageable with the adjacent cam edge 529 of the blocking member 523 to rock the blocking member about the shaft 405 to the operative position of the blocking member in which the shoulder 530 thereof engages the stop bar 455, this position being illustrated in Figs. 22 and 24.

It will be recalled that when the 11th order accumulator gear passes through its "0" position in a positive direction, it rocks the positive latch lever 465 of the lowest order accumulator gear from the associated transfer pawl 450 thereby freeing the pawl 450 and the corresponding bellcrank lever 440 for rocking movement under the influence of the associated spring 448, Fig. 16, when the bail rod 506 is retracted from the legs 441 and 445 of the levers 440 and 444. This rocking movement of the bellcrank lever 440 about its pivotal mounting on the shaft 438 will swing the blocking member 523 to its alternate operative position, in which the shoulder 531 engages the stop bar 491, as described above. Similarly, when the highest order accumulator gear moves through its negative zero position in a negative rotational direction, it unlatches the bellcrank lever 444 of the lowest order of the accumulator and, when this bellcrank lever swings in its accumulator gear rotating movement, the tongue 535 on the distal end of the arm 534 engages the cam edge 529 of the blocking member 523 to move the blocking member to its operative position in which the shoulder 530 thereof engages the stop rod 455.

The position of the blocking member 523 in which the shoulder 531 engages the stop bar 491 will hereinafter be referred to as the negative blocking position of the blocking member and that position of the blocking member in which the shoulder 530 engages the stop bar 455 will be referred to as the positive blocking position of the blocking member.

Detent means are provided for releasably latching the blocking member 523 in its positive and negative blocking positions and this mechanism comprises a bellcrank lever 536 pivotally mounted at its knee on the stop bar 491 and having one arm 537 extending past the outer side of the blocking member 523 and a second arm 538 extending rearwardly from the stop bar 491. The arm 537 is provided near its distal end with spaced notches 540 and 541 and the intermediate portion of the blocking member 523 has a laterally directed extension 542 carrying a stud 543 which seats in the notch 541 when the blocking member is in its positive blocking position and in the notch 540 when the blocking member is in its negative blocking position. A tension spring 544 connected between the distal end of the bellcrank lever arm 538 and the adjacent end of the actuator gear shaft 405 resiliently urges the bellcrank arm 537 down against the stud 543 so that the blocking member 523 is releasably latched in its positive or its negative blocking position.

A bellcrank lever 545, Fig. 24, is pivotally mounted at its knee on a stud 546 carried at the upper forward corner of a lever arm supporting bracket 547 mounted on the machine base adjacent the right-hand end of the accumulator. A similar bellcrank lever 550 is mounted at its knee on a stud 551 carried at the upper rear corner of the bracket 547 and is functionally opposed to the lever 545.

The positive total sensing lever 545 has an arm 552 extending from the stud 546 toward the stud 51 and terminating medially of the distance between these studs in a hook formation 553 directed downwardly and forwardly away from the cam shaft 135. The lever 545 has a second arm 554 disposed substantially perpendicular to the arm 552 and extending upwardly and rearwardly to a location at which its distal end is disposed forwardly of and in alignment with the right-hand end of the positive transmission gear shaft 336 on which the transmission gears 340 are mounted.

The bellcrank lever 550 has one arm 555 extending from the stud 551 toward the stud 546 and terminating medially of the distance between the studs in a hook formation 556 directed away from the cam shaft 135 and spaced from the hook formation 552 in a direction such that the distal end portions of the arms 551 and 555 overlap between the studs 546 and 551. The lever 550 has a second arm 557 extending rearwardly and upwardly substantially perpendicular to the arm 555 with its distal end overlapping the rearward side of the gear shaft 424 of the negative gear transmission mechanism 420.

A roller 558 is disposed between the hook formations 553 and 556 at the sides of the bellcrank lever arms 552 and 555 remote from the cam shaft 135. The crosshead 524 of the blocking member 523 is disposed between the bellcrank lever arms 554 and 557 intermediate the length of these lever arms, the positive and negative transmission gear shafts 336 and 424 are disposed between the distal end portions of the bellcrank lever arms 554 and 557, and a tension spring 559, disposed between the blocking member crosshead 524 and the transmission gear shafts 336 and 424, is connected at one end to the bellcrank lever arm 554 and at its other end to the bellcrank lever arm 557 and resiliently pulls these lever arms one toward the other.

A link 560 is connected at one end to the roller 558 and carries at its other end a cam following roller 561 which is adapted to ride on the peripheral edge surface of the subtotal cycle cam 177.

When the cam follower 561 is free to follow the contour of the cam 177 and drops from the lobe 562 into the restricted portion 563 of the cam 177, the roller 558 will move in a direction away from the cam shaft 135 thereby freeing the bellcrank levers 545 and 550 to rock about their pivot studs 546 and 551 under the influence of spring 559 toward the corresponding transmission gear shafts 336 and 424. When the blocking member 523 is in its positive blocking position, as illustrated in Fig. 24, the end of the crosshead 524 of this member nearest the bellcrank lever arm 554 will engage an abutment formation 564 on the rearward or inner edge of this lever arm and stop the movement of the lever arm before it engages the positive gear transmission gear shaft 336. The end of the crosshead 524 nearest the lever arm 557 will, however, be spaced from the corresponding abutment formation 565 on the forward or inner edge of the bellcrank lever arm 557 so that this lever arm can move into engagement with the negative gear transmission gear shaft 424 and move the negative gear transmission to its operative position in which it provides a driving connection between the actuator gear sectors 188 and the accumulator drive gears 411, as described above.

When the blocking member 523 is in its negative blocking position, described above, it holds the bellcrank lever 557 against moving the negative gear transmission shaft 424 but frees the bellcrank lever arm 554 to engage the positive gear transmission shaft 336 and move the positive gear transmission mechanism to a position at which it provides a driving connection between the actuator gear sectors and the accumulator drive gears.

Thus, when the balance in the accumulator is positive in nature, the positive gear transmission mechanism 330 will be connected between the actuator sectors 188 and the accumulator drive gears 411 to read out the positive accumulator total and transmit this total to the printing mechanism; whereas, if the balance in the accumulator is negative, the negative gear transmission mechanism 420 will be activated to provide the driving connection between the actuator sectors 188 and the accumulator drive gears 411 to read out the negative total in the accumulator in the proper direction and transmit this total to the printing mechanism through the actuator sectors 188 and the set of gears 337 of the positive gear transmission mechanism 420, as described above.

K. *Accumulator conditioning mechanism for total and subtotal printing*

The accumulator gear blocking means operated by the total sign sensing mechanism, as described above, comprises a positive blocking bail, generally indicated at 568, Figs. 16, 22 and 24, the legs of which are pivotally mounted at their ends on the ends of the shaft 462. The cross or intermediate portion 569 of bail 568 extends across the length of the accumulator immediately above the abutment formations 474 of the latch lever actuating dogs 472. Similarly, a negative blocking bail, generally indicated at 570, the legs of which are pivotally mounted at their ends on the shaft 463 near the ends of this shaft. The intermediate portion 571 of bail 570 extends across the length of the accumulator mechanism immediately above the abutment formations 503 on the actuator dogs 498 for the negative latch levers 492.

The leg of the bail 568 at the right-hand end of the accumulator mechanism is provided with an upwardly and rearwardly extending cam arm 572. A cam actuating roller 573 is mounted on the leg 554, shown in Fig. 24, of the bellcrank lever 545 in position to engage the cam arm 572 when the lever arm 554 is swung rearwardly and downwardly to engage the adjacent end of the positive gear transmission gear shaft 336 to move the positive transmission gear mechanism into operative association with the accumulator drive gears, as described above. The right-hand leg of the bail 570 is provided with an upwardly and forwardly projecting cam arm 574. The arm 557 of the negative bellcrank lever 550 carries a cam following roller 575 which rides on the outer edge of the cam arm 574 and rocks the bail 570 downwardly when the bellcrank lever arm 557 is moved to engage the gear shaft 424 of the negative gear transmission mechanism and move the negative gear transmission mechanism into an operative connection with the accumulator drive gears.

When the blocking member 523 of the total sign sensing mechanism, described above, is in position to free the positive bellcrank lever 545 for rocking movement about the pivot stud 546 to move the positive gear transmission mechanism into operative connection with the accumulator drive gears and the bellcrank lever 545 is so rocked in response to a total printing cycle of the machine, the cam following roller 573 riding on the outer edge of the bail cam arm 572 rocks the bail 568 about its mounting on the shaft 462 to bring the edge of the bail cross member 569 remote from the pivotal mounting into engagement with the upper edges of the abutment formations 474 of the actuating dogs 472 of the positive latch levers 465 to hold the abutments 474 against rocking upwardly against the force of the corresponding springs 476 when the ends of the tens-transfer cams 408 are brought against the undersides of these abutments during a total or subtotal printing operation. The bail 570 is similarly rocked by the action of the cam following roller 575 carried by the arm 557 of the negative bellcrank lever 550 so that the edge of the cross member 571 of this bail engages the upper edges of the abutment formations 503 and holds these abutment formations against upward movement.

With the abutment formations 474 held against upward movement by the bail 568, when the accumulator gears are rotated upon the downward stroke of the actuator gear sectors through the positive gear transmission mechanism which is now in operative engagement with the accumulator drive gears, as soon as the accumulator gears have been returned to their positive zero positions, the ends of the corresponding tens-transfer cams 408 nearest the abutment formation 474 will be brought against the undersides of these blocked abutment formations and rotation of the accumulator gears will be positively terminated leaving the actuator sectors in angular position determined by the initial angular position of the several accumulator gears in accordance with the positive total carried in the accumulator and leaving the print wheels in angular position to accurately print the total so taken from the accumulator.

Similarly, when the blocking member 523 of the total sign sensing mechanism is in position to free the negative bellcrank 550 for rocking movement under the influence of the spring 559 to swing the negative gear transmission mechanism into operative engagement with the accumulator drive gears and the negative bellcrank is so swung or rocked in response to a total or subtotal taking cycle of the machine, the blocking bail 570 will be rocked by the cam follower 575 acting on the cam arm 574 to lock the negative abutment formations 503. The rotation of the accumulator gears in a negative direction by the downward movement of the actuator bail and actuator sectors will be terminated when the ends of the tens-transfer cams adjacent the abutment formations 503 come into engagement with the bottom surfaces of these abutment formations, leaving the actuator sectors in angular position corresponding to the rotational movements of the several accumulator gears from their total carrying position to their negative zero position at which they are stopped, and leaving the print wheels 230 in angular position to print the correct negative total carried by the accumulator.

Since the accumulator gears are rotated with equal facility in either the positive or negative direction and since the "fugitive 1" is added, when required, to both the positive and negative totals in the accumulator, the accumulator will always carry the true positive or negative total. This true total is accurately read out from the accumulator by the selector sectors through the intermediacy of the positive or negative gear transmission mechanism and transmitted to the print wheels for accurate printing of the true total carried by the accumulator.

At the end of a positive subtotal or total taking operation the bail 568 when released by the cam following roller 573 on the bell crank lever arm 554, is returned to its home or full-cycle position by a tension spring 579 connected between the right-hand bail leg near the distal end of this leg and a frame structure 576 of rectangular shape mounted on the accumulator plate assembly between the accumulator gear shaft 405 and the accumulator drive gear shaft 410 and extending longitudinally and transversely of the accumulator. This frame structure has an opening of rectangular shape therein through which the reduced width, upper end portions of the accumulator end and spacer plates extend to support the drive gear shaft 410 and the accumulator drive gears 411.

For convenience in manufacture, the frame structure 576 is placed loosely on shoulder formations of the accumulator plate assembly and is held in operative position by suitable springs, as indicated at 577, connected between the corners of the frame structure and the projecting ends of the tie rods 470 and 495.

The bail 570 is similarly urged to its retracted position by a tension spring 578 connected between the right-hand leg of the bail and the frame structure 576 and the retracting movements of the bails are terminated by engagement of the bail cross members 569 and 571 with the edges of openings in the accumulator end and spacer plates through which the cross members of the bail extend.

L. *Control key mechanism (control keys)—Figs. 2, 25, 26, 27, 28, and 31*

The control key mechanism includes seven manually operable keys, namely:

| | |
|---|---|
| Addition key | 580 |
| Subtraction key | 581 |
| Total key | 582 |
| Subtotal key | 583 |
| Repeat addition key | 584 |
| Print only key | 585 |
| Keyboard clear key | 586 |

The control keys 580, 581 and 585 at the right-hand side of the keyboard 10, Fig. 25, are mounted for vertical movement on the right-hand frame side plate 14 and the control keys 584 and 586, together with the zero key 18, Fig. 26, at the left-hand side of the keyboard, are mounted for vertical movement on the left-hand intermediate frame plate 13. The total and subtotal keys 582 and 583, disposed in front of the keyboard, are mounted on a shaft 589, Fig. 28, extending between the frame plates 13 and 14 near the forward ends of these plates.

The addition key 580 is positioned near the forward, right-hand corner of the keyboard and comprises an elongated flat stem 590 disposed against the inner side of the plate 14 and topped by a keytop 591. The stem 590 has a recess extending longitudinally thereof and receiving the shaft 589. A depending guide finger, not shown, on the lower end of this stem is slidably received in an aperture in a flat guide bar extending between the lower forward corners of the plates 13 and 14. A spring 592 connected between the lower portion of the key stem 590 and the upper portion of the key supporting structure resiliently urges the key 580 to its upper limiting position.

The subtraction key 581 is disposed immediately rearwardly of the addition key 580 and has an elongated, flat stem 593 disposed against the outer side of the plate 14 and topped by a keytop 594. The stem 593 is provided at locations spaced apart therealong with closed slots 595 and 596 and headed studs or screws 597 and 598 extend respectively through these slots and are secured to the plate 14 to support the key stem for vertical sliding movement.

A spring 599 connected between stud 702 on a forwardly directed projection 600 on the key stem 593 and the upper portion of the key supporting structure resiliently urges the subtraction key 581 to its upper limiting position.

The print only key 585 is disposed immediately rearwardly of the subtraction key 581 and this key also has a flat stem 601 disposed against the outer side of the plate 14 and topped by a keytop 602. The stem 601 is provided at locations spaced apart therealong with longitudinally extending slots 603 and 604 through which headed studs, as indicated at 612, corresponding to the studs 597 and 598, extend and are secured to the plate 14 to support the key 585 in upright position for vertical movement. A tension spring 605 connected at one end to a cam follower 606 mounted on a forward extension of the stem 601 intermediate the length of the stem, and connected at its other end to the upper portion of the key supporting structure resiliently urges the print only key 585 to its upper limiting position.

The keyboard clear key 586 is disposed at the left-hand side of the keyboard, immediately rearwardly of the zero key 18 and has a flat, elongated stem 607 disposed at the outer side of the plate extension 588 and provided at locations spaced apart therealong with longitudinally extending slots 608 and 609 through which headed studs or screws 610 and 611, respectively, extend and are secured to the plate 13 to support the key 586 in upright position for longitudinal sliding movement. The stem 607 is topped by a keytop 614 and a spring 615 connected between a stud 616 on the key stem adjacent the upper end of the lower slot 609 and the headed stud 610, resiliently urges the key 586 to its upper limiting position.

The repeat addition key 584 is disposed immediately rearwardly of the keyboard clear key 586 at the left-hand side of the keyboard and has a flat, elongated stem 618 disposed against the outer side of the plate 13 and provided intermediate its length with a downwardly extending, forwardly directed offset stem 619. This stem is provided with an upper slot 620 through which a headed stud 621 extends and is secured to the plate 13. The stem 618 is also provided in the forwardly offset lower portion 619 thereof with a lower slot 622 through which a headed screw or stud 623 extends and is secured to the plate 13, the studs 621 and 623 supporting the stem 618 in upright position for longitudinal movement. At its upper end the stem 618 is topped by a keytop 624 and a tension spring 625 connected between a stud 626 mounted on the stem 618 adjacent the forwardly directed offset in the stem and the fixed upper stud 621 resiliently urges the key 584 to its upper limiting position.

The total and subtotal keys 582 and 583, Fig. 27, are disposed adjacent the front end of the keyboard between the addition key 580 and the zero key 18 with the total key to the right and the subtotal key to the left. The total key 582 has an elongated, flat stem 628 provided near its upper end with a longitudinally extending slot 629 which receives the shaft 589 and this stem is topped by the total keytop 630. The stem 628 is guided at its lower end by a guide finger depending from the lower end of the stem and slidably received in an aperture in the transversely extending guide bar, not shown, as described above in connection with the addition key, and a tension spring 631 connected between a forward projection 632 near the lower end of the total key stem and the upper portion of the key supporting structure, resiliently urges the total key to its upper limiting position.

The subtotal key 583 has an elongated, flat stem 634 disposed substantially parallel to the total key stem 628 and also provided with a longitudinally extending notch receiving the shaft 589 and a guide finger at its bottom end slidably received in an aperture in the guide bar, not shown, to support this key stem in upright position for longitudinal movement. A spring corresponding to the total key spring 631 resiliently urges the subtotal key to its upper limiting position and the subtotal key stem 634 is topped by a keytop 635.

1. MECHANISM CONNECTING THE CONTROL KEYS TO THE POWER CYCLE CLUTCH AND MOTOR SWITCH

As shown in Figs. 25, 26, 27 and 28, a shaft 638 extends across the space between the front lower corners of the frame plates 13 and 14 and is journalled at its ends in these plates. An arm 639 is secured at one end to the right-hand end of the shaft 638 and extends upwardly from the shaft. A similar arm 640 is secured at one end to the left-hand end of the shaft 638 and also extends upwardly from the shaft, the arms 639 and 640 being supstantially parallel to each other and rockable together about the axis of the shaft 638.

The control link 168 is pivotally connected at its forward end to the upper end of the right-hand arm 639 and extends rearwardly of the machine to a pivotal connection at its rear end with the control pawl 155 for the clutch mechanism. The extension 169 of this link extends rearwardly of the machine from the pivotal connection with the control pawl 155 to the motor controlling switch 139, as described above in connection with Fig. 7. At the location of the subtraction key stem 593 the link 168 is provided with an upwardly directed extension 643 having on its rearward edge a downwardly and rearwardly directed cam surface engaged by a cam following roller 644 carried by the subtraction key stem 593 so that the link 168 will be shifted in a forward direction relative to the machine when the subtraction key 581 is depressed.

A second cam extension 645 is directed upwardly from the link 168 between the subtraction key stem 593 and the print only key stem 601 and this extension has on its rearward edge an upwardly and forwardly inclined cam surface engaged by a cam following roller 606 on the forward extension 646 of the print only key stem 601 so that the link 168 is moved forwardly when the print only key is manually depressed. Forwardly of its cam surface the extension 645 is provided with a shoulder 647 which moves under the cam follower 644 of the subtraction key and blocks depression of the subtraction key when the link 168 is moved forwardly by depression of any control key other than the subtraction key. A third extension 648 is directed upwardly from the link 168 alongside the print only key stem 601 and the flat upper end of this extension constitutes a shoulder 649 which moves under the print only key cam follower 606 and blocks the print only key against depression when the link 168 is moved forwardly by depression of a control key other than the print only control key 585.

A yoke 650 projects upwardly and forwardly from the shaft 638 at the inner side of the plate extension 587 and is bifurcated at its upper end to provide an elongated notch or slot 651 which slidably receives a stud 652 projecting laterally from the stem 590 of the addition key 580. The forward edge of the slot 651 is rearwardly and downwardly inclined so that depression of the addition key will rock the yoke 650 and turn the shaft 638 in a direction to move the link 168 forwardly to engage the clutch 150 and close the motor switch 139. The rearward furcation 653 is shorter than the forward furcation of the yoke and, when the link 168 is moved forwardly by depression of a control key other than the addition key 580, the distal end of the furcation 653 moves under the stud 652 on the addition key and blocks downward movement of the addition key.

A yoke 655, similar to the yoke 650, extends upwardly and forwardly from the shaft 638 alongside the stem 628 of the total key 582 and has a bifurcated upper end providing an elongated notch or slot 656 which slidably receives a cam following stud 657 mounted on and projecting laterally from the total key stem 628 so that the yoke 655 will be rocked to turn the shaft 638 and move the link 168 when the total key is manually depressed. The rearward furcation 658 of the yoke 655 is shorter than the forward furcation of the yoke and, when the yoke is rocked by depression of a control key other than the total key 580, the distal end of the yoke furcation 658 moves under the cam follower stud 657 and blocks depression of the total key.

A third yoke 660, similar to the yokes 650 and 655, extends upwardly and forwardly from the shaft 638 alongside the subtotal key stem 634 and has a bifurcated upper end providing an elongated notch receiving the yoke operating stud 661 projecting laterally from the subtotal key stem, this yoke also having a shortened tine at the rearward side of the notch therein to engage under the stud 661 and block the subtotal key against depression when the shaft 638 is rocked and the link 168 moved forwardly by depression of a control key other than the subtotal key.

A control link 663 disposed at the outer side of the plate 13 is pivotally connected at its forward end to the upper end of the arm 640 and is provided at its rearward end with a longitudinally extending slot 664 slidably receiving stud 665 which is secured to the side plate 13 at the rearward end of the control key assembly and is disposed in spaced and parallel relationship to the shaft 638.

The link 663 is provided with an upwardly directed extension 668 alongside the stem 607 of the keyboard clear key 586 and the rearward edge of this extension is upwardly and forwardly inclined to provide a cam surface engaged by a cam following stud 670 carried by and projecting laterally from the key stem 607 to move the link 663 forwardly when the keyboard clear key 586 is depressed. The link 663 is provided with a second upwardly directed extension 672, the rearward edge of which is upwardly and forwardly inclined to provide a cam surface engaged by a cam following stud 673 carried by and projecting laterally from the stem 618 of the repeat addition key 584 so that the link 663 will also be moved forwardly when the repeat addition key is depressed.

When the link 663 is moved forwardly, it rocks the lever arm 640, shaft 638 and lever arm 639, to move the link 168 forwardly and engage the power cycle clutch and close the motor switch in the manner described above.

The notches in the clutch control link or slide bar 168 receiving the stud 644 on the subtraction key stem 593 and the stud 606 on the print only key stem 601 and the notches in the yokes 650, 655 and 660, respectively, receiving the stud 652 on the addition key stem 590, the stud 657 on the total key stem 628 and the stud 661 on the subtotal key stem 634 are all upwardly and forwardly inclined so that when the slide 168 is moved forwardly by depression of the subtraction key or the print only key or when the yokes are rocked forwardly by depression of the addition key, the total key or the subtotal key, the key which was manually depressed will be held down by engagement of its clutch operating stud in the corresponding slide bar or yoke notch until the cam shaft 135 has completed a rotation and the slide bar is released by the registry of the dwell 158 in the clutch holding cam 157 with the cam following roller 159 on the clutch control pawl 155, as described above, the slide bar being moved and the yokes being rocked rearwardly to their home or full-cycle position by the spring 164 and releasing the depressed key at the end of the machine operating cycle.

While the left-hand slide bar 663 actuated by the repeat addition key 584 and the keyboard clear key 586, may be constructed in the same manner and may hold the associated keys depressed in the same way as the right-hand slide bar 168, in the arrangement shown in Figs. 26 and 28 and hereinabove described, the slide bar 663 is provided with the spaced-apart and upwardly directed cam extensions 668 and 672 with which the cam following studs 670 and 673, respectively, engage but does not have inclined notches for locking the associated keys down during an operating cycle initiated by depression of the repeat addition or the keyboard clear key.

The means provided for latching down the keys 584 and 586 comprise latching shoulders 675 and 676, respectively, offset forwardly from the forward edges of the key stems 618 and 607 near the upper ends of the key stems and having cam surfaces downwardly and rearwardly inclined from the outer ends of the shoulders to the forward edges of the corresponding key stems, and a latching bar 677 extending longitudinal of the machine at the outer sides of the key stems 618 and 607.

The latching bar 677 is provided with spaced-apart and longitudinal extending slots 678 and 679 which receive the key stem mounting studs 621 and 108 to support the bar 677 for a limited freedom of longitudinal movement. The bar is provided at spaced-apart locations along its lower edge with laterally offset latch ears 680 and 681 disposed against the forward edges of the key stems 618 and 607, respectively, below the latching shoulders 675 and 676. The bar 677 is resiliently urged in a rearward direction by a suitable spring, not illustrated, connected between the bar and an adjacent portion of the machine frame and, when the repeat addition key 584 is depressed, the cam surface below the latching shoulder 675 on the stem 618 of this key engages the adjacent side of the detent 680 on the latching bar 677 forcing the latching bar forwardly against the force of the latching bar spring and then freeing the latching bar to snap back into position with the latch ear 680 above the shoulder 675 to latch the key 584 in its depressed position. The latch ear 681 cooperates with the shoulder 676 on the key stem 607 to latch the key 586 in its depressed position in the same manner.

A bellcrank rocker 682 is pivotally mounted at its knee on pivot shaft 665 and has one arm 684 extending upwardly from the shaft 665 and provided with a tapered upper end portion disposed between a laterally projecting, spring hook ear 685 on the rearward end of the latching bar 677 and a cam following stud 686 mounted on and projecting laterally from the outer side of the latching bar at a location spaced from the spring hook ear 685 a distance slightly greater than the width of the upper end portion of the rocker arm 684.

As shown in Fig. 14, the other leg 687 of the rocker 682 extends rearwardly from the shaft 665 and has its rearward or distal end portion disposed adjacent the right-hand side of the positive and negative gear transmission latching cam 170. The cam 170 is provided with a laterally projecting stud 688 which engages under the distal end portion of the arm 687 to rock the cam following rocker 682 upwardly and forwardly when the stud passes under the rearward end portion of the arm 687. The stud 688 is so positioned angularly around the cam 170 that the rocker 682 will be rocked upwardly and forwardly substantially as the cam shaft 135 comes to rest at the end of the operating cycle and, when the rocker 682 is so rocked, the upper or distal end of the arm 684 engages the stud 686 and forces the latch bar 677 forwardly to release the latch ears 680 or 681 from the corresponding key stem shoulder 675 or 676 as may be engaged by a manual depression of the key 584 or 586.

2. BLOCKING INTERLOCK BETWEEN KEYBOARD VALUE KEYS AND CONTROL KEYS

For proper operation and mechanical protection of the machine it is necessary, not only that blocking means be provided to preclude the depression of more than one control key at a time, as described above, but also that a blocking interlock mechanism be provided between the control keys on the right-hand side and the control keys on the left-hand side of the keyboard and between the value keys of the keyboard, the zero key, and the several control keys, so that no control key can be depressed while the zero key or a value or selection key is depressed and, conversely, so that neither the zero key, any value key, or any other control key can be depressed while a selected control key is depressed.

Suitable interlocking blocking means for the above purpose is shown in Figs. 25, 26 and 27 and comprises a swinging blocking bar 690 extending longitudinally of the machine at the outer or right-hand sides of the key stems 590, 593 and 601 and supported at its ends by pivoted links 693 and 694 mounted on and depending from the right-hand plate 14 near the forward and rearward ends, respectively, of this plate. At its forward end the blocking bar 690 is provided with a vertically disposed crosshead 695 extending above and below the forward end of the bar 690. At its upper end the crosshead 695 is provided with a forwardly directed extension 696 of somewhat rectangular shape having a downwardly and forwardly inclined upper forward corner 697 and having a closed slot 698 extending longitudinally thereof. The bevel corner 697 of the extension 696 provides a cam surface and a cam following stud 699 mounted on and projecting laterally from the addition key stem 590 immediately above the forward end of the extension 696 cooperates with the cammed corner 697 to force the blocking bar 690 rearwardly when the addition key 580 is depressed.

Intermediate its length the bar 690 is provided with an upwardly directed extension 700 having a downwardly and rearwardly beveled upper rear corner providing a cam surface 701. The extension 700 is disposed forwardly of the stem 593 of the subtract key 581 and a cam following stud 702 mounted on and projecting laterally from the extension 600 of the stem 593 is engageable with the cam surface 701 to move the blocking bar 690 forwardly when the subtract key 581 is depressed.

An extension 704 is upwardly directed from the bar 690 near the rear end of the bar and this extension is also provided with a downwardly and rearwardly inclined rear upper corner providing a cam surface 705.

A stud 706 is mounted on and projecting laterally from the stem 601 of the print only key immediately above the extension 704 is engageable with the cam surface 705 to force the bar 690 forwardly when the print only key is manually depressed.

The crosshead 696 is provided rearwardly of the upper end of the cam surface 697 with a straight, horizontally disposed, upper edge and the extensions 700 and 704 are provided forwardly of the upper ends of the cam surfaces 701 and 705 thereof with straight, horizontally disposed edges so disposed that when bar 690 is moved rearwardly by depression of the addition key to 580 these horizontally disposed edges move under the studs 702 and 706, respectively, and block depression of the subtraction key 581 and print only key 585. When bar 690 is moved forwardly by depression of the subtraction key or the print only key, the horizontally disposed upper edge of the crosshead 696 is moved under the stud 699 and blocks depression of the addition key 580. Simultaneous depression of the subtraction and print only keys is blocked by a blocking gate 734, later described in detail.

Bar 690 is resiliently urged to its centered or home position, as illustrated in Fig. 25, by a resilient centering means of known construction, generally indicated at 708 and comprising a pair of opposed jaws 709 and 710 pivotally mounted at the upper end of the device on a stud 711 carried by the right-hand frame plate extension of the machine and bearing at their inner edges and adjacent their free, lower ends, against the opposite edges of a stop lug 712 projecting outwardly from a bracket 713 mounted on the right-hand frame side member extension and carrying spaced-apart guides, as indicated at 714, which slidably support the bar 690 against sideways movement. The lower ends of the jaws 709 and 710 are disposed at diametrically opposite sides of a pin 715 projecting from the bar 690. A tension spring 716 is connected between the jaws 709 and 710 intermediate the length of the jaws and resiliently urges the jaws against the adjacent side edges of the lug 712 to force the bar carried pin 715 to a predetermined position relative to the lug 712 which position corresponds to the centered or home position of the bar 690.

A lever 717 is mounted on the right-hand end of shaft 589 and extends substantially equal distances above and below this shaft. A stud 718 carried by the lever 717 near the upper end of the lever is received in the slot 698 in the crosshead extension 696 and a stud 719 carried by the lever 717 near the lower end of this lever is opposed to the forwardly directed lower end 720 of the crosshead 695.

With the above-described construction, the shaft 589 is given a partial rotation in a clockwise direction, as viewed in Fig. 25, whenever the latch bar 690 is moved forwardly or rearwardly. When the bar is moved rearwardly, the edge of the crosshead extension 696 at the forward end of the slot 698 in this extension engages the stud 718 and moves the upper end of the lever 717 rearwardly and, when the bar 690 is moved forwardly, the lower end 720 of the crosshead 695 engages the stud 719 on the lower end of the lever 717 and moves the lower end of the lever forwardly, the lever being moved in the same rotational direction for both directions of movement of the latch bar. When the lever 717 is in its normal or home position, as illustrated in Fig. 25, the stud 718 is spaced from the forward end of the slot 698 and the stud 719 is spaced from the lower end 720 of the crosshead 695 so that the shaft 589 has a limited freedom of rocking movement in a counter-clockwise direction, as viewed in Fig. 25, before being stopped by the abutments provided on the crosshead 695.

An upwardly directed arm 721, Fig. 26, is mounted at its lower end on the left-hand end of the shaft 589 and carries near its upper end a laterally extending stud or pin 722. An upstanding lever 723 is mounted at its lower end on a shaft 724 extending transversely of the machine near the lower forward portion of the keyboard and has its upper end 725 disposed rearwardly of and opposed to the stud 722. A stop stud 737 secured to and projecting outwardly from the side plate 13 is engageable by the rearward edge of the lever 723 to limit rearward movement of this lever to the position shown in Fig. 26, and a spring 738 connected between the lever 723 and the plate 13 resiliently urges the lever against the stud 737.

A latching slide bar 726 is disposed alongside the clutch actuating slide bar 663 at the left-hand side of the machine keyboard. This latching slide bar 726 is pivotally connected at its forward end to the lever 723 near the upper end of the lever by a pivotal connection 727. At its rearward end the bar 726 is provided with a longitudinal slot corresponding to the slot 664 in the bar 663 and slidably receiving the shaft 665 which supports the rearward end of the bar 726. In alignment with the upwardly directed cam extension 668 on the bar 663, the bar 625 is provided with an upwardly directed blocking extension 728 having an upwardly and forwardly inclined rear edge bearing against the stud 670 on the keyboard clear key stem 607 to block the keyboard clear key against depression when the bar 726 is held against forward movement and has at the location of the upwardly directed extension 672 on the bar 663 a blocking extension 729 having an upwardly and forwardly inclined rear edge bearing against the stud 673 on the repeat key stem 618 to block depression of the repeat addition key whenever the bar 726 is held against forward movement.

As explained above, the shaft 589 will be rocked in the same direction regardless of whether the latch bar 690 is moved forwardly or rearwardly. This rocking of the shaft 589 will engage the stud 722 on the upper end of the arm 721 with the upper end of the lever 723 and hold this lever against the stud 737 and the bar 726 against forward movement thereby blocking the keys 584 and 586 against depression whenever the bar 690 on the right-hand side of the machine is moved longitudinally.

The repeat addition key and the keyboard clear key on the left-hand side of the machine will thus be blocked against depression whenever any one of the keys on the right-hand side of the machine is manually depressed.

Since the downwardly and rearwardly inclined rearward edges of the extensions 668 and 672 of the clutch actuating bar 663 cooperate with the studs 670 and 673 to cam the bar 663 forwardly whenever the repeat addition key 584 or the keyboard clear key 586 is manually depressed. Since this forward movement of the bar 663 is transmitted through the arm 640 and the shaft 638 to the yokes 650, 655 and 660, Fig. 28, to rock these yokes forwardly, and through the shaft 638 and arm 639 to the slide bar 168 to move this bar forwardly, the keys at the front end of the keyboard and at the right side of the keyboard will be blocked whenever one of the control keys at the left-hand side of the keyboard is depressed. Simultaneous depression of the two control keys at the left-hand side of the keyboard is precluded by an upright, T-shaped blocking gate 730 pivotally mounted at its lower end on the stud 623 and having at its upper end a transversely extending crosshead carrying spaced-apart studs 731 and 732 engaging inclined cam surfaces in the forward edge of the repeat addition key stem 618 and in the rearward edge of the keyboard clear key 607, the gate 730 being swingable about its pivotal mounting on the stud 623 to permit either one of the key stems 618 or 607 to move downwardly but precluding downward movement of both key stems simultaneously since both of the key stem cams cannot pass the studs 731 and 732 at the same time.

An upright, T-shaped blocking gate 734 is pivotally mounted at its lower end at the right-hand side of the machine between the subtraction key stem 593 and print only key stem 601, and precludes simultaneous depression of the subtraction and print only keys in the same manner as described above for the blocking gate 730.

The interlock between the zero key 106 and the numeral keys 17 and the control keys is provided by the blocking lever 102 mounted on the escapement operating shaft 101 of the keyboard mechanism and a lever arm 735 mounted at one end on the shaft 589 and projecting rearwardly from this shaft, as shown in Figs. 27 and 29.

In addition to its arm 118 engaged by the arm 117 mounted on the zero key shaft 113, the blocking arm 102 has a downwardly directed arm 736, Fig. 27, longitudinally curved so that its lower end portion is directed toward the right-hand side of the machine. The lever 735 is disposed adjacent and slightly to the right of the lower end of the arm 736 and, when the zero key 106 is depressed or when any of the numeral keys are depressed to operate the escapement mechanism and rock the shaft 101, the lower end portion of the arm 736 of the blocking lever 102 is engaged in a notch 737 provided in the rearward end of the lever arm 735 to block rotational movement of the shaft 589. This blocks rocking movement of the lever 717 and thus limits forward movement of the latching bar 690 by engagement of the lower end 720 of the crosshead 695 with the stud 719 on the lower end of the lever arm 717. With the bar 690 blocked against forward movement, the keys 581 and 585 are stopped when the studs 702 and 706 come in contact with the cam edges of the bar extension 701 and 705 so that the subtraction and print only keys at the right-hand side of the keyboard are blocked whenever the zero key or a numeral key is depressed.

Locking of the shaft 589 also blocks rocking movement of the arm 721 on the left-hand end of this shaft and this limits forward movement of the left-hand latch bar 726, Fig. 26. As the upwardly directed extensions 728 and 729 on this latch bar have their rearward edges downwardly and rearwardly inclined, inability of the bar 726 to move forwardly will stop the downward movement of the studs 670 and 673 carried by the keyboard clear key stem 607 and the repeat addition key stem 618 so that the repeat addition key and the clear keyboard key at the left-hand side of the keyboard are also blocked when the zero key or a numeral key is depressed.

The blocking lever 102, Fig. 29, has an arm 740 extending to the right from the lever carrying shaft 101. This arm is provided intermediate its length with a nose 741 which moves upwardly, when the lever 102 is rocked as described above, against shoulders provided on the bottom edges of the links 691 and 692 which operatively connect the total and subtotal keys 582 and 583 to the total and subtotal cycle controlling mechanism of the machine, blocking longitudinal movement of these links and thereby precluding depression of the total and subtotal keys. At the same time, the right-hand or distal end portion 744 of the blocking lever arm 740 moves up under a rearward extension 745 of the upper end of the addition key stem 590 and blocks depression of the addition key.

An arm 738, Fig. 27, projects to the left from the upper portion of the addition key stem 590 across the upper edges of the total and subtotal cycle control links 691 and 692. These links are provided with notches, as indicated at 739, into which the blocking arm 738 descends when the addition key is depressed, to thereby block depression of the total and subtotal keys while the addition key is depressed.

Arms, as indicated at 747 in Fig. 27, are mounted on the shaft 589 and are upwardly directed one adjacent the total key stem 628 and one adjacent the subtotal key stem 634. Each of these arms has in its upper end a downwardly extending notch 748 and each key stem carries a square stud 749 which is receivable upon downward movement of the key stem in the notch 748 in the corresponding lever 747 when the levers are in the position which they occupy when no control key or keyboard key has been depressed. When the shaft 589 has been rocked by the depression of a control key other than the total or subtotal key, the notches in the levers 747 will be moved out of alignment with the corresponding square studs 749, and upon attempted downward movement of the total or subtotal key, the corresponding studs 749 will strike the upper end of the associated levers 747 and block depression of the keys. All of the control keys are thus blocked against depression whenever the zero key or a numeral key is depressed.

Conversely, whenever a control key other than the total or subtotal key is depressed, the shaft 589 is rocked by the forward movement of the right-hand blocking bar 690, or by forward movement of the left-end blocking bar 726. This rocking of the shaft 589 moves the outer end of the lever arm 735 downwardly so that the lower end portion of the depending arm 736 of the blocking lever 102 will strike against the adjacent side of the lever arm 735 whenever it is attempted to depress the zero key or a numeral key while a control key is depressed, thus blocking operation of the numeral keys and the zero key, during depression of a control key as shown in Figs. 5 and 29.

M. Addition cycle—Figs. 16, 17, 18 and 25

A bellcrank lever 750 of substantially right-angular shape is pivotally mounted at its knee on a stud 751 secured to the right-hand side plate 14. This lever has a leg 752 directed forwardly from the stud 751 and having its forward end portion underlying the stud 652 carried by the addition key stem 590 so that the lever 750 will be rocked in a counter-clockwise direction, as viewed in Fig. 25, upon depression of the addition key. The arm 753 of the lever 750 rises vertically from the stud 751 and is pivotally connected at its upper end to the forward end of the addition key link 742 which extends rearwardly from the upper end of the lever arm 753 past the upper end of the addition lever 353 mounted on the print drive gear shaft 218. The link carries at its rearward end the stud 354, the link and bellcrank being resiliently urged in a rearward direction by a spring 755, Fig. 25, connected between the lever arm 753 and a fixed stud 756. Intermediate its length, the link 742 is provided with a longitudinally extending slot 754 which slidably receives the stud 743 supporting the upper end of link 694 for guiding the link or bar 742 for longitudinal movement forwardly and rearwardly of the machine.

When the addition key 580 is depressed, it rocks the yoke 650 to move the clutch actuating and switch closing link 168 forwardly to engage the machine clutch and close the motor switch, as described above, moves the blocking bar 690 rearwardly to block the remaining control keys and the zero and numeral keys, as described above, and rocks the bellcrank lever 750 to move the link 357 forwardly. Engaging the clutch and closing the motor switch starts the cycle of the machine cam shaft 135 and forward movement of the link 742 swings the lever 353, counter-clockwise in Fig. 17, about its pivotal mounting on the shaft 218 to raise the link 346 and dispose the shifting element 333 of the positive gear transmission mechanism between the hook formation 347 and the shoulder 350 at the upper end of the link 346. Now, as the cam shaft 135 rotates, the cam 179 will rock the V-shaped cam following lever 342 to move the link 346 first downwardly and rearwardly to bring the lower set 340 of positive transmission gears into meshing engagement with the teeth of any selector sectors 33 that may have been stepped to the left of the position of the left-hand end of the shiftable selector mechanism when the latter is in its home or full-cycle position. As soon as the positive transmission gear mechanism has been moved into engagement with the selector sectors, the transmission latching cam 170, as shown in Fig. 14, will move the latch bar 362 to engage the tooth 365 in the notch 370 at the free end of the positive transmission gear cage to positively hold the positive transmission gears in mesh with the selector sectors 33 while the value which has been entered into the selector sectors is set into the actuator sectors 188.

Immediately after the positive gear transmission has been latched in mesh with the selector sectors 33, the actuator lead cam 175, Fig. 11, acts on the cam follower 206 of the yoke 195 to move the actuator sectors downwardly. Those actuator sectors to the left of the leftmost selector sector will be held against movement by reason of the engagement of the locking bar 385 extending to the left of the shiftable selector unit with the corresponding gears of the positive gear transmission while those actuator sectors in mesh with corresponding selector sectors will be moved downwardly until the selector sectors 33 are rotated back to their "0" positions at which time the corresponding actuator sectors will be stopped. The releasable connections between the actuator bail 192 and the actuator sectors 188 are released upon holding or stopping of the actuator sectors permitting the bail 192 to complete its downward movement. Then, at the end of the downward movement of the bail, the actuator sectors are first aligned in position by the aligning bail 320, Fig. 15, actuated by the cam 176, and are then locked in position by the locking pawls 300 actuated by the cam 178.

During the downward movement of the actuator sectors in mesh with corresponding selector sectors, these actuator sectors will have moved the corresponding print wheels through the gear trains, as illustrated in Fig. 16, and including the corresponding positive transmission gears 337, the print wheel drive gears 217, Fig. 9, and the print wheel idler gears 226, so that the print wheels will be set for printing the value which has been entered into the selection mechanism, as described above, the print wheels to the left of those which have been rotated to printing position by the corresponding selector sectors being held in nonprinting position by the zero foil mechanism previously described. Also, when the actuator bail reaches the end of its downward movement the differentially set selector sectors will have been returned to their "0" position and latched in this position by their zero latches.

After the print wheels have been brought to proper printing position and the actuator sectors locked in position to hold the print wheels against rotational movement, the printing bail 265 is dropped by action of the cam 172 on the cam following bellcrank lever 270, as shown in Fig. 14, thereby permitting the print wheels which have been unlatched by rotation of the associated print wheel drive gears 216 to strike the platen 242 and print the value on the paper tape, not shown, carried around the platen.

The actuator sectors are retained in their down position and locked against rotational movement until the print wheels have been returned to their engaged position in which idlers 226 mesh with gears 217, by rising of the print bail 265. Before the actuator sectors are released by their latches 320, the cam 170 unlatches the positive gear transmission mechanism and the cam 179 swings the positive gear transmission mechanism from its position meshing with the selector sectors to its position meshing with the accumulator drive gears 411. Thereupon cam 170, Fig. 14, again operates the latching link 362 to lock the positive gear train 330 in its adjusted position, this time tooth 365 engaging slot 368. The actuator sectors are now released by cam 178 operating latches 300 and the trail cam 174 acts on the cam follower 205 carried by the yoke 195 to return the actuator bail 192 to its uppermost position, the upward movement of this bail returning all of the actuator sectors upwardly to their home or full-cycle position, as previously described.

This upward movement of the actuator sectors turns the print wheels which have been moved away from their zero setting, back to their zero setting and also enters the entry value carried by the selector sectors and now determined by the positioning of the actuator sectors away from their home or full-cycle position into the accumulator. During the upward stroke of the actuator sectors the print wheels are restored to their "0" position, and the pin 138 on cam arm 137, Fig. 14, engages the hook 136 on the rear end of link 131 and returns the shiftable selector unit to its right-hand or home position, as described above. Immediately after the actuator bail 192 reaches the end of its upward movement and just before the end of the cycle, cam 179 and cam follower arm 342 together with the centralizing device 380, Fig. 19, swings the positive transmission gear mechanism back to its central or neutral position in which it is out of mesh with both the selector sectors and the accumulator drive gears.

The entry value has now been printed and entered into the accumulator and the machine has been returned to its normal or full-cycle position.

N. *Subtraction cycle—Fig. 25*

A bellcrank lever 757 of right angular shape is pivotally mounted at its knee on the stud 756 and has a forwardly directed arm 758 overlying the outer side of the subtraction key stem 593 and an upwardly directed arm 759 pivotally connected at its upper end by a pin-and-slot connection to an intermediate section of the subtraction link or slide 359. The slide 359 is provided with a slot corresponding to the slot 754 in the addition link 742 and receives the stud 743 to guide the front end of the subtraction link 359 for longitudinal movement. The subtraction key stem 590 carries a laterally projecting stud 760 immediately above the forward or distal end portion of the bellcrank lever arm 758, which stud engages the arm 758 and rocks the bellcrank lever 757 downwardly and forwardly imparting a forward movement to the link 359 when the subtraction key 581 is depressed.

The depression of the subtraction key also moves the cam following stud 644 along the rearward edge of the cam extension 643 of the link 168, moving this link forwardly to operatively engage the cam shaft clutch and close the motor switch and thereby initiate a single rotation operating cycle of the cam shaft.

When the subtraction slide or link 359 is moved forwardly, a stud projecting laterally from the reaward end of this link and corresponding to the stud 354, Fig. 17, carried by the addition link 742 engages the upper end of the subtraction lever 358 and rocks this lever about the shaft 218 on which the lever is mounted so that the lower end of the lever 358 is moved upwardly and rearwardly. The lever 358 is similar in shape to the addition lever 353 and has a bifurcated lower end provided with a slot receiving a stud 761 projecting laterally from the subtraction link 351 intermediate the length of this link. When the subtraction lever 358 is rocked in the manner indicated above, the hook formation 352 at the upper end of the link 351 is brought into engagement with the upper edge of the positive transmission shifting element 333 and the cam 179 then acting through the cam following rocker 342 pulls the link 351 downwardly, swinging the positive gear transmission mechanism to a position in which the lower set of gears 340 of this transmission are meshed with the teeth of the selector sectors which have been stepped to the left of the home position of the left-hand end of the shiftable selector unit 11 by the entry of a value into the selection mechanism in the manner previously described.

Immediately after the positive gear transmission has been brought into mesh with the selector sectors, this transmission is latched in transmitting position to read out the values on the selector sectors by entry of the tooth 365 into the notch 370, Fig. 14, in the free end of the positive transmission cage. Immediately after the positive transmission mechanism has been latched in meshing engagement with the selector sectors, the actuator lead cam 174, Fig. 11, on the cam shaft 135 engages the cam following roller 206 carried by the yoke 195 and swings the yoke to move the actuator bail 192 downwardly, returning the selector sectors to their "0" position and turning the print wheels to position to print whatever entry has been made in the selector sectors of the selection mechanism in the same manner as described above in connection with the addition cycle.

Before printing, the actuator sectors are aligned and locked in their downward position where they are maintained during the printing operation, by the mechanism described in connection with the "Addition Cycle," Fig. 15. Likewise, the further rotation of cam 179 causes the unlatching of the positive transmission mechanism and the movement of this positive transmission mechanism back to its neutral position, as outlined above.

Since the subtraction link 351 has only a hook formation 352 on its upper end and no shoulder formation corresponding to the shoulder formation 350 on the addition link 346, when the cam 179 moves to enable the spring 357 to move the link 342 forwardly, it will not move the positive transmission mechanism past the neutral or centered position to which this mechanism is urged by the transmission centering mechanism 380 shown in Fig. 19, and previously described. Since the link 351 has been raised by the subtraction lever 358, however, the nose 429 on the distal end of the downwardly projecting arm 428 of the subtraction link 351, is brought into engagement with the adjacent end of the negative gear transmission shaft 424 when the link 351 moves forwardly thereby shifting the negative transmission mechanism against the force of spring 419, into meshing engagement with the accumulator drive gears at the sides of the accumulator drive gears opposite the positive gear transmission mechanism as shown in Fig. 16. The negative transmission gears 425 are at all times in mesh with the actuator sectors 188, as shown in Fig. 16, and, when the negative transmission bail or cage 420 is swung against the force of spring 419, as described above, the negative transmission gears 426 are brought into mesh with the co-ordinal accumulator drive gears 411 to drive the accumulator in a negative or subtractive direction.

After the positive transmission gear mechanism has been returned to its neutral position and the negative transmission gear mechanism moved into meshing engagement with the accumulator drive gears, the aligner control cam 176, Fig. 15, releases the rib or bail 320 from the actuator sectors. Thereupon, the actuator trail cam 174, Fig. 11, acting on the yoke 195 through the cam following roller 205, returns the actuator bail 192 to its uppermost position thereby restoring any actuator sectors that have been moved away from their uppermost position during the downward movement of the bail to their upper, full-cycle position, the actuator sector teeth ratcheting past the detents 301, Fig. 15, during this upward movement of the actuator sectors.

As the actuator sectors are moved upwardly to their full-cycle position, the entry value which determined the lowermost position of the downwardly moved actuator sectors, is entered into the accumulator in a negative direction, In both the addition and subtraction cycles, the addition link 742 and the subtraction link 359 are returned to their home or full-cycle position moving the addition link 346 or the subtraction link 351 out of engagement with the positive transmission control element 333 and the negative transmission shaft 424 before the end of the cycle so that, in the case of an addition cycle, the positive gear transmission mechanism will be returned to its neutral position by the centralizing device 380, Fig. 19, and, in the case of a subtraction cycle, the negative gear transmission will be swung out of engagement with the accumulator drive gears at the end of the cycle by the spring 419 to a stop on the frame.

As the selector sectors were returned to and latched in their zero setting during the downward movement of the actuator sectors, the print wheels were returned to their "0" position during the upward movement of the actuator sectors and the gear transmissions were returned to their home or neutral positions before the end of the cycle, at the end of the subtraction cycle the machine will be left in a full-cycle condition ready for the entry of a subsequent value into the selection mechanism.

O. Ribbon mechanism

1. RIBBON SUPPORTING AND FEEDING MECHANISM—FIGS. 9, 13 AND 30

An inked ribbon, not shown, extends through the space between the printing wheels 230, Fig. 9, and the platen 242 and is disposed adjacent the platen. This ribbon is wound at its ends on spaced-apart ribbon spools, one of which is illustrated in Fig. 30 and indicated at 762, disposed at respectively opposite sides of the printing mechanism and supported on corresponding brackets, as indicated at 763, mounted on and projecting inwardly from the left-hand intermediate frame plates 134 and the right-hand frame plate 14, the spools being mounted for rotation about substantially vertical axes and the ribbon being securely attached at its ends to the corresponding spools.

A ratchet wheel 764 is disposed at the bottom of each ribbon spool concentric with the axis of spool rotation and drivingly connected to the corresponding spool. A rocking or oscillating plate 765 is disposed immediately below each ratchet wheel and pivotally mounted on the bracket carried pin 766 on which the corresponding spool and ratchet wheel are rotatably mounted. Each rocking plate 765 has a forwardly directed arm 767 and these arms are interconnected at their forward or distal ends by a cross link 768 so that both plates 765 oscillate about the corresponding pins 766 simultaneously and coextensively.

Each plate 765 also has a rearwardly directed arm 769 terminating in an upwardly directed tongue 770 disposed substantially tangential to and spaced from the tooth periphery of the associated ratchet wheel 764.

The left-hand plate 765 is also provided with an arm 771 of angular shape having an inner portion 772 directed outwardly to the right from the portion of the left-hand plate 765 through which the pin 766 extends and an outer portion 773 directed rearwardly from the outer end of the portion 772. A link 774 is pivotally connected at its forward end to the rearward end of the arm portion 773 and extends rearwardly from the arm 771, this link being provided at its rearward end with a formation 775 having a pair of elongated notches 776 and 777 extending divergently to the left from the right-hand edge of the formation 775 and having a common opening through the right-hand edge of the formation, and a tongue 778 extending to the left with its center line substantially perpendicular to the longitudinal center line of the link 774 and carrying near its distal or left-hand end an upwardly directed stud 779.

An upright lever 780, as shown in Fig. 11, is pivotally mounted at its lower end on a stud 781 carried by and projecting to the right from the left-hand frame plate 134 immediately below the actuator sector axle shaft 185. This lever carries on its upper end an upstanding pin 782 which extends through the notches 776 and 777 in the rear end portion of the link 774. An abutment formation 783 is mounted on the upper end of the lever 780 and bears against the underside of the link 774 to support the link, and an abutment washer 784 is mounted on the pin 782 above the link 774. A tension spring 785 is connected between the upper end portion of the pin 782 and the tongue carried stud 779 and resiliently maintains the pin in one or the other of the notches 776 or 777, as will later appear.

The link 202 pivotally connected at its forward end to the upper end of the arm 201 of the bellcrank lever 200 mounted on the shaft 196 and connected by the spacing pin 198 to the actuator bail operating yoke 195, as previously described, is pivotally connected at its rearward end to the lever 780 intermediate the length of this lever to impart a forward and rearward rocking movement to the lever 780 each time the cam shaft 135 rotates. This forward and rearward rocking movement of the lever 780, by reason of engagement of the lever carried pin 782 in one of the notches 776 or 777 in the rear end portion 775 of the link 774 imparts an oscillating movement to the rocker plates 765 each time the machine cam shaft rotates.

An actuating pawl 787 is pivotally mounted near one end on the plate 765 at the forward side of the ratchet wheel 764, as indicated at 788, and has at one end a nose 789 which engages with the teeth of the ratchet wheel to turn the ratchet wheel incident to the angular movement in one direction of the plate 765. A spring 790 connected between the distal end of a forwardly extending tail portion 791 of the pawl 787 and a stud 792 mounted on the plate arm 767 resiliently urges the pawl nose 789 into engagement with the ratchet teeth of the corresponding ratchet wheel.

It is understood that a similar actuating pawl is mounted on the right-hand oscillating plate and is engageable with the corresponding ratchet wheel, the pawls being so directed as to rotate their corresponding wheels in respectively opposite directions in order to wind the ribbon from either ribbon spool onto the alternative ribbon spool.

A tongue 794 is directed upwardly from the bracket 763 and tangential to the tooth periphery of the ratchet wheel 764. A holding pawl 795 is pivotally mounted at one end by a pin 796 on the bracket 763 and has intermediate its length a detent tooth 797 which engages with the teeth of the ratchet wheel 764 to hold the ratchet wheel against back rotation while the ratchet wheel is being rotated in a forward direction by the actuating pawl 787 upon oscillating movement of the plate 765. The holding pawl 795 has near its free end a cammed edge 798 opposed to the adjacent edge of the tongue 770 upstanding from the arm 769 of the plate 764 and a tension spring 799 is connected between the free end of the holding pawl 795 and a rearwardly projecting tongue 800 of the bracket 763 to resiliently urge the holding pawl in a direction to maintain its detent tooth 797 in engagement with the teeth of the ratchet wheel 764.

When the pin 782 on the upper end of lever 780 is in the notch 777 nearest the plate arm 771, as shown in Fig. 30, the tongue 770 is maintained out of engagement with the holding pawl 795 and the actuating pawl 787 is held out of engagement with the bracket tongue 794. Under these conditions, oscillation of the rocking plate 765 will turn the ratchet wheel 764 in a counterclockwise direction, as viewed in Fig. 30, to wind the ribbon onto the left-hand spool 762 and off of the right-hand spool.

When the ribbon has been fully wound onto the spool 762, the attachment of the right-hand spool to the corresponding end of the ribbon places a resistance to rotation of the spool 762 which causes the pin 782 to cam over the rounded extension 801 between the slots 776 and 777 and to become engaged in the slot 776, the spring 785 providing the necessary resiliently resisted movement of the pin 782 for this purpose. When the pin 782 is moved into the slot 776 remote from the plate arm 771, the rocking plate 765 is given a clockwise angular movement, as viewed in Fig. 30, which moves the plate carried tongue 770 against the free end of the holding pawl 795 and holds this pawl out of engagement with the teeth of the ratchet wheel 764 and simultaneously moves the actuating pawl 787 against the bracket carried tongues 794 to also hold the actuating pawl out of engagement with the ratchet wheel teeth. This frees the left-hand ratchet wheel 764 and the associated ribbon spool 762 for free rotation and, since the angular movement of the plate 765 is transmitted through the link 768 to the right-hand rocking plate, the holding pawl and actuating pawl of the right-hand mechanism will be moved into operative engagement with the right-hand ratchet wheel and rotation of the right-hand ratchet wheel and right-hand ribbon spool will be effected to wind the ribbon back from the left-hand to the right-hand spool.

When the ribbon has been wound back onto the right-hand spool, resistance to rotation of this spool by reason of the pull of the ribbon on the left-hand spool will force the pin 782 back into the notch 777 and effect the release of the right-hand spool and re-engagement of the left-hand actuating pawl and holding pawl with the left-hand ratchet wheel 764 to wind the ribbon back onto the left-hand spool.

The ribbon will thus be automatically wound back and forth between the left-hand and right-hand spools as it is fed longitudinally during the printing operations of the machine.

2. RIBBON SHIFTING MECHANISM

The ribbon is medially divided into longitudinal halves of different colors, the top half, for example, being black while the bottom half is red. The black upper half of the ribbon is used for printing values additively entered into the machine and positive totals and subtotals and print only figures, while the red bottom half of the ribbon is used for printing values subtractively entered into the machine and negative totals and subtotals. This requires that whenever a quantity is subtractively entered or a negative total or subtotal is taken, the ribbon be shifted upwardly to place its lower portion in printing position. Suitable ribbon shifting means are shown in Figs. 11 and 13 and comprise left and right-hand arms 805 and 806 mounted on a supporting shaft 807 extending transversely of the machine above and parallel to the actuator bail supporting shaft 185 and supported by the intermediate frame plates 186 and 187.

The arms 805 and 806 are forwardly directed from the shaft 807 and a left-hand arm 808 is pivotally connected at its lower end to the forward end of the arm 805 and extends upwardly from the arm 805 past the forward side of the ribbon while a similar arm 809 is pivotally connected at its lower end to the forward end of the right-hand arm 806 and extends upwardly from the arm 806 past the forward side of the ribbon. Near their upper ends, the arms 808 and 809 are provided with longitudinally extending slots 810 and 812, respectively, which slidably receive corresponding guide studs 813 and 814 which are fixed to the machine frame and guide the arms 808 and 809 in their vertical movements.

The arms 808 and 809 have straight longitudinal rearward edges at their upper ends and carry spring clips 817 and 818, respectively, which extend along these straight, rear edge portions and at the rearward side of the ribbon so that the ribbon is slidably held between the spring clips and the adjacent rearward edge portions of the ribbon shifting arms 808 and 809.

A cam 820, Fig. 13, is mounted on the actuator bail shaft 185 near the right-hand end of this shaft and has an upwardly extending lobe 821 and a rearwardly directed extension 822 carrying a laterally projecting pin 823 spaced from the shaft 185. A lever 825 is mounted on the shaft 807 at the inner or left-hand side of the arm 806 and has three angularly spaced-apart arms including a forwardly directed arm 826, a downwardly and rearwardly directed arm 827 and a downwardly and forwardly directed arm 828 carrying near its distal end a cam following roller 829 riding on the edge of the cam lobe 821.

Whenever the actuator bail 192 is moved downwardly, the cam 820 is rocked in a counterclockwise direction, as shown in Fig. 13, imparting a clockwise rotational movement to the lever 825. This clockwise movement of the lever 825 is resiliently resisted by a tension spring 830 connected between a stud near the distal end of the lever arm 827 and a tie rod 831 extending transversely of the machine above and rearwardly of the actuator bail shaft 185.

The right-hand arm 806 has a rearwardly and upwardly directed tail formation 832 carrying near its distal end a stud 833 connected by a tension spring 834 to a stud 835 carried by the lever arm 827 near the stud 836 to which the lower end of the spring 830 is connected.

With this arrangement, whenever the actuator bail is moved downwardly imparting a clockwise rotational movement to the lever 825, the spring 834 is stretched and resiliently urges the lever arms 805 and 806 to swing in a clockwise direction, as viewed in Fig. 13, and move the ribbon shifting arms 808 and 809 upwardly to bring the lower half of the ribbon to printing position.

An elongated lever 837 is pivotally mounted intermediate its length on the right-hand end portion of the mounting shaft 427 of the negative transmission gear mechanism 420 and is longitudinally bent so that its portion above the shaft 427 is substantially upwardly directed and its portion below the shaft 427 is downwardly and forwardly directed. At its upper end the lever 435 is disposed alongside the lever arm 806 and is provided at its upper end with a forwardly directed hook formation 838 which overlies a stud 839 mounted on and extending laterally from the lever arm 806 near the distal end of this lever arm. The hook 838 engages the stud 839 and holds the ribbon shifting mechanism against upward movement whenever a quantity is additively entered into the machine, whenever a positive total or subtotal is taken or whenever a repeat addition cycle, a print only cycle or a keyboard clearing cycle is performed by the machine.

A bellcrank lever 840 is pivotally mounted at its knee or angle on a shaft 841, Fig. 34, extending transversely of the machine near the rear end of the keyboard 10, and has a forwardly directed arm 840' provided at its forward end with an upwardly directed terminal portion 842 terminating immediately below a stud 843 projecting laterally from the subtraction key stem 593 near the lower end of this key stem so that the bellcrank lever will be rocked in a counterclockwise direction, as viewed in Fig. 27, whenever the subtraction key is manually depressed. The lever 840 also has a rearwardly directed arm 840" provided at its rearward end with a laterally directed bent ear formation 845 which underlies to the rearward edge of the lower end portion of the lever 837 so that, when the subtraction key is manually depressed, the lever 837 is rocked by the bellcrank lever 840 in a clockwise direction, as viewed in Fig. 13, to displace the hook formation 838 on the upper end of the lever 837 from the stud 839 and free the ribbon shifting mechanism for upward movement when the spring 834 is stretched by movement of the arm 827 incident to rotation of the cam 820 on the actuator bail shaft 185. Thus, a value subtractively entered into the machine will be printed a different color from a value additively entered.

The lever 837 is disposed forwardly of and extends past the right-hand end of the gear shaft 424 of the negative gear transmission mechanism 420. When the negative gear transmission mechanism is rocked into position for connecting the actuator sectors to the accumulator drive gears during a total or subtotal taking cycle wherein a negative balance has been sensed in the accumulator, as described above, the right-hand end portion of the shaft 424 engages the lower end of the lever 837 and rocks this lever in a clockwise direction, as viewed in Fig. 13, to remove the hook 838 from the stud 839 and free the ribbon shifting means for upward movement on the downward stroke of the accumulator bail, as described above, so that a negative total or subtotal will also be printed a different color from a positive total or subtotal.

The arm 826 of the lever 825 has on its distal end an ear 848 which overlies the forward portion of the upper edge of the lever arm 806 and engages this arm so that the spring 830, in resiliently rocking the lever 825 in a counterclockwise direction, as viewed in Fig. 13, also rocks the arms 805 and 806 in the same direction, urging the arms 808 and 809 downwardly to place the ribbon in position for printing positive values.

For a more detailed illustration and description of the ribbon feed and shift mechanism reference may be had to Patent No. 2,732,924, patented January 31, 1956, by Nathaniel F. Hawthorne for "Reversible Ribbon Feed Mechanism for Adding Machines."

P. Tape feed mechanism

A ratchet wheel 850, Fig. 13, is mounted on the platen shaft 851 at the right-hand end of the platen and drivingly connected to the platen and a link 853 is pivotally connected at its lower end to the pin 823 carried by the extension 822 of the ribbon feed cam 820. This link is upwardly and forwardly directed and provided at its upper end with a forwardly offset portion terminating in an ear 854 which is effective to engage the teeth of the ratchet 850 and rotate the ratchet wheel and platen 242 in a step-by-step manner as the cam 820 is oscillated incident to the downward and upward cyclic movements of the actuator bail 192. A lever 855 is pivotally mounted intermediate its length on a stud 856 mounted on the right-hand end plate 857 of the printing mechanism and disposed immediately below the stud 814 which guides the right-hand ribbon shift arm 809. At its rearward end the lever 855 is provided with an upwardly directed foot formation 858, the straight rearward edge of which is opposed to a stud 859 mounted on and projecting to the left from the link 853 near the upper end of this link. The lever 855 has two operative positions in one of which it holds an ear 854 away from the adjacent portion of the ratchet wheel a distance such that the pawl will step only a single ratchet tooth for each vertical movement of the link 853 and the platen will thus be rotated through an angular distance corresponding to one tooth of the ratchet 850 for each operating cycle of the machine, and in the other of which the ear 854 is positioned to engage alternate teeth of the ratchet wheel so that the platen will be rotated an angular distance corresponding to two adjacent teeth of the ratchet wheel for each vertical movement of the link 853.

As shown in Fig. 24, the lever 855 extends forwardly from the stud 856 and has at its forward end a laterally projecting stud 860 which rests on the upper edge of a total and subtotal cycle control hook, later to be described. This lever 855 is resiliently urged in a rotational direction to raise its rearward end and lower its forward end by a spring 861 connected between the upper end of an arm 862 which extends upwardly from the portion of the lever 855 mounted on the stud 856 and a portion of the machine frame disposed forwardly of the arm 861.

A guide link 863 for the link 853 is pivotally mounted at one end on a stud 864 projecting to the right from the right-hand intermediate frame plate 187 and has therein a longitudinaly extending slot 865 below the stud 864 receiving a stud 866 projecting laterally from the link 853. A tension spring 867, connected between the link 853 and the adjacent frame plate, resiliently rocks the link 853 in a direction to urge the ear 854 toward the ratchet wheel 850 and into engagement with the ratchet teeth.

A hand-operated spacing lever 868 is pivotally mounted intermediate its length on the stud 864 and has a forwardly directed arm 869 extending past the rearward portion of the lever 855 and provided at its forward end with a laterally offset tongue formation 870 which engages the upper edge of the lever 855 near the foot 858 on the rear end of this lever. The lever 868 has a rearwardly directed arm 871, the rearward end of which is provided with a formation of increased width in which spaced-apart notches 872 and 873 are provided and open to the rear end of the arm. The lever 868 is also provided with a third arm 874 upstanding from the portion of the lever mounted on the stud 864 and constituting a handle for rocking the lever 868 to manually control the single and double spacing operation of the tape feed.

A detent arm 875 is pivotally mounted at its lower end on a shaft 876 disposed above and rearwardly of, and substantially parallel to the actuator bail shaft 185. This detent arm 875 is upwardly directed from the shaft 876 and carries near its upper end a laterally projecting stud 878 which is selectively receivable in the notches 872 and 873 in the rearward end of the arm 871 of the lever 868. The detent arm 875 is resiliently urged in a forward direction by a spring 880 connected between the distal end of a rearwardly projecting extension 881 of the detent lever 875 and the tie rod 831 which is disposed forwardly of the lever 875 intermediate the length of this lever.

With the above-described arrangement, when the upper end of the handle 874 is manually moved forwardly, the forward end of the arm 869 is moved downwardly depressing the rearward end of the lever 855 and setting the foot 858 for double spacing of the platen feed, the lever 868 being releasably retained in this position by engagement of the latch stud 878 in the notch 873, and when the upper end of the handle 874 is manually moved rearwardly, the front end of the lever arm 869 is raised, thereby permitting the foot 858 on the rear end of the lever 855 to be raised by the spring 860 and thereby set the feed for single spacing operation, the detent stud 878 being at this time received in the notch 872 in the rear end of the arm 871, as is shown in Fig. 13. The projection 882 between the notches 872 and 873 has divergently inclined edges and a rounded outer end so that the pin 878 will cam from one of the notches 872 or 873 to the other against the force of latching spring 880.

During the keyboard clearing cycle of the machine the printing mechanism is restrained from printing and the tape feeding mechanism is restrained from feeding the paper tape on which the figures are printed by the print wheels. This restraint against printing and tape feeding is provided by blocking mechanism comprising a bellcrank lever 885, Fig. 14, rockably mounted at its angle on a fixed stud 886 at the left-hand side of the machine and having a forwardly directed arm 887, Fig. 26, terminating in a bifurcated distal end receiving a stud 888 carried on the keyboard clearing key stem 607 near the lower end of this stem, as seen in Fig. 26. The lever 885 also has a rearwardly extending arm 889, Fig. 14, provided at its rearward end with a transverse end edge or shoulder 890 which, when the keyboard clearing key 586 is depressed, is moved under the cam follower 273 on the rocker arm 270 so that this cam follower cannot drop into the low portion 274 of the printing cam 172 to lower the print control bail rod 265 for printing movement of the unlatched print wheel carriers 221. An extension 891 of the arm 889 extends rearwardly from the terminal shoulder 890 and carries at its rearward end a laterally projecting stud 892.

A shaft 894 is disposed transversely of the machine rearwardly of and above the shaft 807 and is journalled in the frame plates 186 and 187. An arm 895, secured at one end to the left-hand end of shaft 894 extends downwardly and forwardly from this shaft and has at its forward end a bifurcated formation providing a notch 896 receiving the stud 892 whereby the shaft 894 is rocked in a counter-clockwise direction, as viewed in Fig. 14, when the keyboard clearing key 586 is depressed.

A lever 897 (Fig. 13) is mounted intermediate its length on the right-hand end of shaft 894 and includes an upwardly and forwardly directed arm 898 having the upper portion of its rearward edge formed as a concave cam surface 899 disposed forwardly of and opposed to the stud 866. Since the counter-clockwise movement of shaft 894, as viewed in Fig. 14, becomes clockwise when viewed in Fig. 13, it is seen that depression of the keyboard clearing key will rock the shaft 894 in a direction to bring the cam surface 899 of lever 897 against stud 866 and hold the upper end of pawl link 853 away from ratchet wheel 850 thereby disabling the tape feeding mechanism.

The lever 897 also has a downwardly and rearwardly directed arm 900 and a stud 901 projecting laterally from this arm near the lower end thereof and providing a connection between the lever 897 and clear signal symbol printing mechanism later to be described.

As shown in Fig. 13, a guide roller 902 for the paper tape is disposed below the lower forward portion of the platen 242 and rotatably mounted at its end in bellcrank arms, as indicated at 903, pivotally mounted at their bends or angles on a shaft 904 extending transversely of the printing mechanism below the platen 242. The bellcrank levers have downwardly directed arms, as indicated at 905 and springs, as indicated at 906, connected between the lower ends of the arms 905 and the machine frame forwardly of these arms resiliently urge the guide roller 902 upwardly toward the lower portion of the platen surface.

Q. Subtotal printing cycle

When the subtotal key 583, Fig. 27, is manually depressed, it rocks the corresponding yoke 660, Fig. 28, forwardly thereby rocking the shaft 638 in a direction to move the link 168 forwardly and activate the cam shaft clutch and close the motor switch. This initiates an operative cycle of the machine wherein the cam shaft and the cams carried thereby will be rotated through one complete rotation.

A bail 910, Fig. 31, is rockably mounted on the shaft 113 and is supported at its right end by a three-armed lever having a forwardly projecting arm 909, Fig. 27, provided at its forward or distal end with a bail portion 910 which extends to the left perpendicularly to the arm 909 and underlies a forwardly directed shoulder formation 911 on the subtotal key stem 634. This bellcrank lever has a downwardly directed arm 912, the lower end portion of which is disposed rearwardly of the shaft 589. A spring 913 connected between the downwardly directed arm 912 and a portion of the control key mounting structure forwardly of this arm resiliently urges the bellcrank lever to its home position in which the lower end portion of the arm 912 bears against the shaft 589 to provide a stop for rotational movement of the bellcrank lever by the spring 913 in a clockwise direction, as viewed in Fig. 27.

Figure 32:
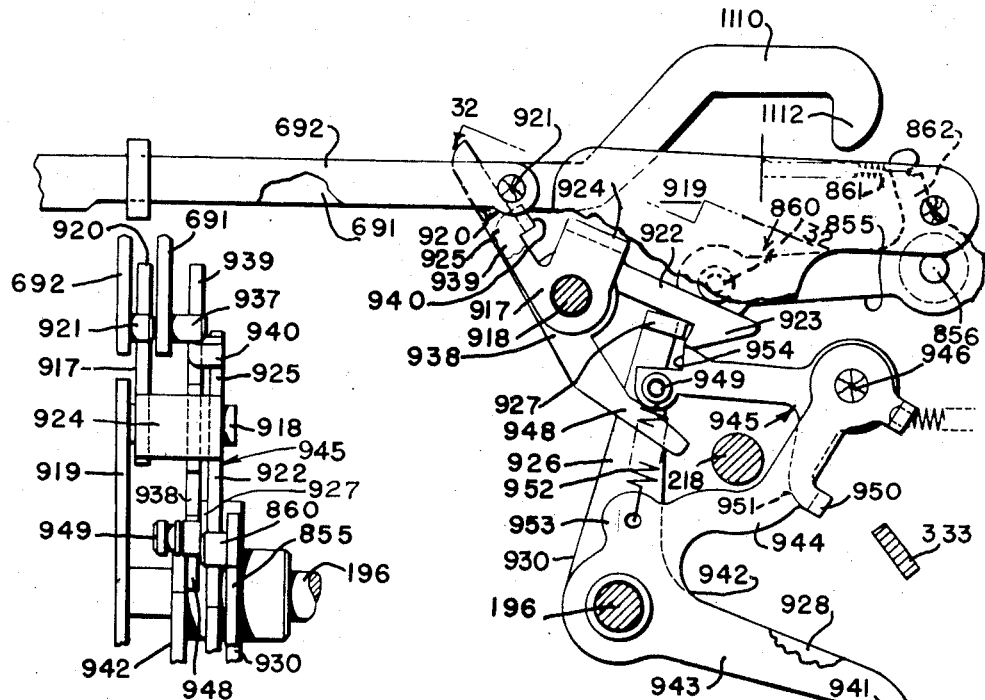
Fig. 32 is a fragmentary top plan view of the total and subtotal control mechanism illustrated in Fig. 24 taken from a plane indicated by the line 32—32 of Fig. 24.

The bellcrank lever has an upwardly directed arm 915 pivotally connected at its upper end to the forward end of the subtotal actuating link 692 and, when the subtotal key is depressed, the key stem shoulder formation 911 engages the bail formation 910 on the forwardly directed arm 909 of the bellcrank lever and rocks the bellcrank lever in a counterclockwise direction, as viewed in Fig. 27, against the force of spring 913 and thereby imparts a forward movement to the subtotal control link 692, Figs. 24 and 32.

An irregularly-shaped lever 917 is rockably mounted intermediate its length on a stud or pin 918 secured at one end to a bracket 919 carried by the print mechanism frame and spaced to the right from the right-hand side of this frame, the pin projecting to the left from the bracket 919, as shown in Fig. 24. The lever 917 has a forwardly and upwardly directed arm 920 extending past the rearward end of the link 692 and the link 692 carries at its rearward end a laterally projecting stud 921 which is opposed to the rearward edge of the arm 920 and is effective to impart to the lever 917 a counter-clockwise rocking movement, as viewed in Fig. 24.

The lever 917 also has a rearwardly directed arm 922 having at its rearward end a downwardly directed hook formation 923, the arm 922 being in a plane parallel to the plane of arm 920 and spaced to the left therefrom, the lever 917 including a cross bridge portion or bail 924 which extends perpendicularly between the arms 920 and 922 and joins these arms together. The arm 922 has a portion 925 extending upwardly and forwardly from the pin 918 and constituting a tail portion, the purpose of which will be described in connection with the total printing cycle of the machine.

A cam following, bellcrank lever 930 is rockably mounted on the cam follower supporting shaft 196 and has an upwardly directed arm 926 provided at its upper end with a laterally directed abutment 927 underlying the arm 922 of the lever 917 and engaged at its rearward edge by the hook 923 on the rearward end of the lever arm 922. The cam following lever 930 also has a rearwardly directed arm 928, the rearward end of which carries the cam following roller 561 which is connected to the upper end of link 560 and rides on the peripheral edge of the subtotal printing cam 177.

When the link 692 is moved forwardly by depression of the subtotal control key of the machine, the lever 917 is rocked in a counter-clockwise direction, as viewed in Fig. 24, on the stud 918, raising the rearwardly directed lever arm 922, which lever arm applies an upward force to the stud 860 and raises the forward end of the tape feed spacing lever 855 thereby moving the foot 858, Fig. 13, downwardly and causing the tape feed to double space after the subtotal value has been printed and during the latter portion of the incident operating cycle. Raising of the lever arm 922 also releases the abutment 927 on the upper end of the arm 926 of the cam following bellcrank 930, so that this bellcrank can rock to permit the cam follower 561 to follow the contour of the subtotal printing cam 177 under the urgency of spring 559.

As neither the addition entry link 742 nor the subtraction entry link 359, shown in Fig. 25, has been raised, the gear transmission mechanisms will not be affected by rotation of the transmission shifting cam 179.

At the beginning of the subtotal printing cycle the cam follower 561 rides off of the lobe portion 931 of the subtotal printing cam 177, freeing the link 560 for longitudinal movement in a direction to release the bellcranks 545 and 550 for movement by the spring 559. The positive bellcrank 545 or the negative bellcrank 550 will then be moved by the spring 559, depending upon the total sign sensing position of the blocking member 523, and, if the total be positive, the positive bellcrank 545 will move to shift the positive transmission gear mechanism into mesh with the accumulator drive gears and swing the positive gear blocking bail 568 into engagement with the positive tens-carry latch abutments 474, whereas, if the total sign be negative, the negative bellcrank 550 will move to shift the negative gear transmission mechanism into mesh with the selector sectors and the accumulator drive gears and simultaneously swing the negative gear blocking bail 570 into engagement with the negative tens-transfer latch abutments 503.

The actuator bail will now be moved downwardly and those actuator sectors drivingly connected to the accumulator gears which have been moved away from their "0" position will be moved downwardly until the corresponding accumulator gears are stopped by engagement of their tens-transfer cams 408, Fig. 16, with the corresponding tens-transfer latch abutments 474 or 503 which are now locked by the locking bails 568 and 570, as described above. Those actuator sectors drivingly connected to accumulator gears which were already in their "0" position will be held against downward movement by inability of the corresponding accumulator gears to turn.

During the downward movement of the actuator sectors, the total value is read out from the accumulator gears and the corresponding print wheels are turned to printing position corresponding to the positions of the accumulator gears in the corresponding orders. At the end of the downward movement of the actuator sectors, the printing operation will occur, as described above, and the total will be printed on the tape.

The accumulator gears have now been reset to their positive or negative zero position, as the case may be, and in order that this operation should be a subtotal operation rather than a total operation, it is necessary to restore the accumulator gears to their original total indicating position during the upward stroke of the actuator sectors. This is accomplished by maintaining the positive or negative gear transmission mechanism, as the case may be, latched in mesh with the accumulator drive gears until near the end of the operating cycle where the actuator sectors are returned upwardly to their home or full-cycle position.

The lobe portion 931, Fig. 24, of the subtotal printing cam 177 is of restricted angular extent, the major portion of the circumference of this cam being of such limited radial extent as to release the link 560 and free the bellcrank levers 545 and 550, except at the start and termination of the cycle, for the lobe 931 does not re-engage the cam follower 561 to pull the link 560 and move the bellcrank levers 545 and 550 to their inoperative position until the actuator sectors have been returned to their home position. The positive or negative gear transmission is thus left in mesh with the accumulator drive gears during the upward stroke of the actuator sectors and the upward movement of the actuator sectors thus returns the print wheels to their "0" position and places the total read out of the accumulator during the downward stroke of the actuator sectors back in the accumulator during the upward stroke of the actuator sectors.

When the positive or negative gear transmission mechanism is released by the corresponding bellcrank lever 545 or 550 upon re-engagement of the cam lobe 931 with the cam follower 561, the transmission mechanism is resiliently moved out of engagement with the accumulator drive gears and the operating cycle terminates with the print wheels cleared or in their "0" position and with the accumulated total still in the accumulator.

R. *Total printing cycle*

A bail 935, Figs. 27 and 31, formed on the forwardly extending arm of bellcrank lever 934, similar to the bail 910 of bellcrank 909, is rockably mounted on the shaft 113 immediately to the left of bellcrank 909. The bail 935 on the bellcrank lever 934 underlies a forwardly extending shoulder formation 936 on the total key stem 628. The bellcrank lever 934 also has an upwardly directed arm pivotally connected at its upper end to the forward end of the total operating link 691 and has a downwardly directed arm, the lower end of which is disposed at the rearward side of the shaft 589 and urged into engagement with the shaft by a spring similar to the spring 913.

Upon depression of the total key 582, the shoulder 936 on the total key stem 628 engages the bail 935 of the bellcrank lever 934 and rocks this lever in a counter-clockwise direction, as viewed in Fig. 27, imparting forward movement to the link 691. At its rearward end link 691, Fig. 24, is provided with a laterally extending stud 937, Fig. 32, which is disposed rearwardly of the upper end portion of a lever 938 rockably mounted on the stud 918 between the arms 920 and 922 of the lever 917.

The lever 938 will be rocked in a counter-clockwise direction, as viewed in Fig. 24, upon forward movement of the link 691. This lever has on its upwardly directed arm 939 a laterally extending ear 940 which overlies the upper edge of the arm 922 of the lever 917 so that the lever 917 will also be rocked in a counter-clockwise direction to release the hook 923 from the abutment 927 on the upper end of the arm 926 of the bellcrank lever 930 when the total actuating link 691 is moved forwardly by depression of the total control key.

A cam following bellcrank lever 942 is rockably mounted at its knee or angle on the cam follower support shaft 196 and has a rearwardly directed arm 943 carrying at its rear end a cam following roller 941 which rides on the peripheral edge of the total printing cam 178. This lever 942 also has an upwardly and rearwardly directed arm 944 and a live point lever 945 is pivotally mounted at one end on the upper end of the lever arm 944 by a stud 946 and extends forwardly from this stud. The forward end of the lever 945 overlies the right-hand side of the lever arm 926 and the total key actuated lever 938 has a downwardly and rearwardly extending arm 948, the lower end portion of which underlies a stud 949 carried by the lever 945 at the forward end thereof. Rotation of the lever 945 in a clockwise direction, as viewed in Fig. 24, relative to the lever arm 944 is limited by engagement of the end of a downwardly directed arm 951 of the lever 945 with an ear 950 which projects laterally from the rearward edge of the lever arm 944 below the stud 946. Angular movement of the lever 945 in a counter-clockwise direction, as viewed in Fig. 24, is resiliently urged by a spring 952 connected between the stud 949 and an eye formation 953 on the portion of the lever 942 adjacent on the shaft 196.

A forwardly facing shoulder 954 is provided on the upper edge of the lever 945 near the forward end of this lever and the lever 945 has sufficient freedom of rotational movement in a clockwise direction relative to the lever arm 944 that, when counterclockwise rotational movement is imparted to the lever 938 by forward movement of the link 691, the forward end of the lever 945 will be raised until the shoulder 954 engages the rearward edge of the abutment 927 on the upper end of the lever arm 926.

Rocking of lever 917 in a counterclockwise direction, as viewed in Fig. 24, by the ear 940 on the lever arm 939 raises the arm 922 of lever 917 disengaging the hook formation 923 from the abutment 927 on the upper end of lever arm 926 and also raises the forward end of the lever 855 setting the tape feed mechanism of the machine for double spacing, as described above.

Since depression of the total key 582 acts through the yoke 655, the shaft 638 and the link 168 to cause a cyclic rotation of the machine cam shaft 135 and the cam 178 carried on the cam shaft 135, and since the total key is latched down during the corresponding cycle of the machine, the cycle will take place with the bellcrank cam following lever 942 latched to the bellcrank cam following lever 930 by the latch or live point lever 945 and with the hook 923 disengaged from the terminal abutment 927 of the lever arm 926.

At the beginning of the rotation of the cam shaft, the cam follower 941 rides off of the lobe portion 562 of the cam 178 and drops into the restricted portion 563 of this cam thereby releasing the link 560 and the positive and negative bellcrank levers 545 and 550 so that one of these bellcrank levers, depending upon the position of the total sign sensing blocking member 523 will be moved to swing the corresponding positive or negative gear transmission mechanism into meshing engagement with the accumulator drive gears, simultaneously moving the blocking bail 568 or 570 into blocking engagement with the associated tens-transfer latch abutments 474 or 503, as described above.

Immediately after the selected gear transmission mechanism is moved into meshing engagement with the accumulator drive gears, the actuator bail will accomplish its downward stroke, moving those actuator sectors in the orders corresponding to the orders of the accumulator gears which have been moved away from their "0" position, downwardly until the corresponding accumulator gears are stopped by engagement of their tens-transfer cams with the locked transfer latch abutments 474 or 503, as described above.

The lobe portion 562 of the cam 178 extends through approximately 180 degrees of angular extent so that, when the actuator bail has completed its downward movement, the print wheels have been set and the printing operation has taken place. Just before the actuator bail starts its upward movement, the cam follower 941 rides up on the cam lobe 562 thereby moving the link 560 and the bellcrank levers 545 and 550 to release the transmission gear mechanisms. As the transmission latching means are also released at this time, the transmission mechanism which has been moved into engagement with the accumulator drive gears will be moved out of engagement with these drive gears before the actuator bail starts its upward movement and the consequent upward movement of the actuator sectors will not re-enter into the accumulator the total which was read out of the accumulator on the downward stroke of the actuator bail and sectors.

The total printing cycle will thus leave both the print wheels and the accumulator gears in their zero setting and will completely clear the machine. It may be noted at this time that during the total printing cycle the clear signal printing mechanism, later to be described, is activated to print a clear signal on the tape to indicate that the accumulator has been cleared of all accumulated values.

S. *Repeated addition cycle*

There are many occasions when it is desired to add the same value a number of times in succession without having to re-enter the value into the selection mechanism each time it is printed and added into the accumulator of the machine. This is accomplished in the present machine by maintaining the repeat addition key depressed for the desired number of machine cycles or, if desired, by depressing the repeat addition key the desired number of times after the value has been set up in the selector mechanism.

As shown in Fig. 26, a lever arm 960 is secured at its forward end to the shaft 724 near the left-hand end of this shaft. The rearward end of the arm 960 is bifurcated, as indicated at 961, providing a longitudinally extending notch receiving a stud 962 mounted on and projecting laterally from the lower end portion of the repeat addition key stem 618 so that the arm 960 will rock the shaft 724 in a counter-clockwise direction, as viewed in Fig. 26, when the repeat addition key is depressed. An arm 963, shorter than the arm 960 (Fig. 25) is secured at its forward end to the shaft 724 near the right-hand end of this shaft and this lever is provided at its rearward end with a perpendicularly offset extension 964 which extends to the left from the lever arm 963. A link 965 is secured at one end to the arm 752 of the addition key operated bellcrank 750 by a pivot pin 966 located intermediate the length of the arm 752, and the link 965 depends from the pin 966 and has at its lower end a longitudinally extending slot 967 which receives the perpendicularly offset extension or hook 964 on the rearward end of the lever 963.

With this arrangement, when the repeat addition key is depressed, the bellcrank lever 750, Fig. 17, will be rocked to shift the addition link 742 forwardly and connect the link 346 to the shifting bail 333 of the positive gear transmission mechanism, as described above in connection with the addition cycle of the machine. At the same time, the stud 673, Fig. 26, on the repeat addition key stem 618 moves the link 663 forwardly which link acting through the arms 640 and 639 and the shaft 638, moves the link 168 forwardly, to close the motor switch and condition the cam shaft clutch for a cyclic rotation of the cam shaft. This will initiate an addition cycle of the machine and the cycle would terminate with the selector sectors returned to their "0" position and the shiftable selector unit returned to its limiting right-hand home or full-cycle position if no blocking means were provided to circumvent this operation.

As shown in Fig. 33, a zero latch blocking bail, generally indicated at 970, extends transversely across the space between the frame plates 13 and 14 and has spaced-apart and parallel legs 971 and 973 pivotally mounted at their upper ends on a shaft 972 which extends transversely of the space between the plates 13 and 14 and is mounted at its ends in these plates. The left-hand bail leg 973 has at its bottom end a downwardly and forwardly directed extension 974 provided with a downwardly and forwardly directed slot 975. A stud 976 on the lever 960, near the rearward end of this lever, is slidably received in the slot 975 and imparts a rearward rocking movement to the lower portion of the bail 970 when the repeat addition key 584 is depressed.

The bail 970 has a cross member 977 having along the left-hand half of its lower edge a rearwardly directed flange 978 shorter than the bail cross member 977 and which is moved, when the bail is rocked rearwardly by depression of the repeat addition key 584, to a position in which the flange 978 overlies the forward end portions of the zero latch levers 50 of the shiftable selector unit 33 of the selection mechanism which have been stepped to the left of the home position of the left-hand end of the shiftable selector unit 33 and into positions of alignment with corresponding actuator sectors.

With the forward ends of the zero latch levers 50 of the activated selector sectors 35 thus latched down by the cross member flange 978, when these selector sectors 35 are returned to their "0" position at the end of the upward stroke of the associated actuator sectors in which position the abutments 57 on the sector spoke structures 36 engage the stop bar 27, as previously explained, the fixed zero latches 50 fail to yield when engaged by the corresponding selector sector carried pawls 45 and the pawls are swung away from the adjacent ends of the corresponding sector rim extensions 46 against the force of their retracting springs 56. This keeps the nose formations 53 of the pawls 45 above the rear ends of the corresponding zero latches 50 and precludes latching of the corresponding sectors 35 in "0" position when the sectors 35 are returned to "0" position at the end of the upward stroke of the corresponding actuator sectors. The activated selector sectors are thus maintained free to turn back to the selection positions for which they have been set during the upward stroke of the corresponding actuator sectors when the transmission gears are out of mesh with the selector sectors.

In order to repeat the addition cycle, it is also necessary to have the shiftable selector unit at the end of each addition cycle in the position to which it has been stepped by the escapement mechanism during the entry of the value therein and this requires that the shiftable unit return mechanism including the bellcrank lever 124, Figs. 2, 6 and 14, and hook link 131 be disabled.

A guide shaft 980, Fig. 2, extends across the space between the left-hand frame plate 13 and the left-hand frame plate 134 near the forward end of the keyboard 10 and is slidably mounted at its ends in the plates 13 and 134 for longitudinal movement. A pair of guide disks 981 and 982 are mounted on the shaft 980 adjacent and to the left of the right-hand frame plate 13. The hook link 131 extends past the shaft 980 and is disposed above the shaft and between the guide disks 981 and 982. The link 131 rides on a sleeve 983, Fig. 26, which surrounds the shaft 980 between the disks 981 and 982 and is provided immediately rearwardly of the sleeve 983 with a downwardly projecting cam formation 984 which raises the hook end of this link when the link is moved forwardly incident to shifting of the shiftable selector unit to the left so that the pin 138 will engage the hook 136 near the top position of the pin as it is revolved about the cam shaft 135.

A bell crank lever 985 is pivotally mounted for rocking movement about an axis extending longitudinally of the machine at its knee on the outer end of a bracket 986 extending to the left from the plate 13, and has a right-hand directed arm 987, Fig. 6, provided on its distal end with an abutment formation 988 underlying the shoulder 989 projecting rearwardly from the repeat addition key stem 618. The lever 985 also has a downwardly directed arm 990, the lower end portion of which bears against the right-hand end of stop collar 991 fixed on the shaft 980.

When the repeat addition key 584 is depressed, lever 985 is rocked in a direction to move the shaft 980 and guide disks 981 and 982 to the left and this moves the hook end of the link 131 to the left and out of the path of the pin 138 so that this pin will not engage the hook 136 to return the shiftable selector unit to its home position during the last half of the operating cycle.

With the activated selector sectors maintained free of their zero latches and the shiftable selector unit retained in the position to which it has been set by the entry of a value into the selection mechanism, this same value can be printed and added into the accumulator as long as the repeat addition key is maintained depressed or as often as it is successively depressed.

The zero latches 50 are released from the blocking bail 970 and the hook 136 on the rearward end of the link 131 returned to the path of the pin 138 when the repeat addition key is released at the end of any repeat addition cycle.

T. *Print only cycle*

At times it is desirable to print a number, such as a code or identifying number, without having such number entered into the accumulator. For this purpose the machine is provided with a print only cycle controlled by a print only control key 585, Fig. 25, as previously described.

The print only control key 585 is mounted at the right-hand side of the keyboard, and, when depressed, the stud 606 carried on the print only key stem 601 acts against the rearward edge of the upward extension 645 of the link 168 and directly moves the link 168 forwardly to set the cam shaft clutch and close the motor switch for a cyclic rotation of the cam shaft 135.

A bellcrank lever 994, Fig. 34, is pivotally mounted at its knee or angle on a stud 995 which is mounted on and extends to the right from a bracket 919, Fig. 17, mounted on the printing mechanism and spaced from the right-hand end of this mechanism. The bellcrank lever 994 has a forwardly directed arm 997, the distal, forward end of which is disposed alongside the upper portion of the print only key stem 601, as shown in Fig. 34, which key stem 601 carries a stud 998 which bears on the upper edge of the forward end portion of the lever arm 997 and imparts a rocking movement in a counterclockwise direction to the bellcrank lever 994, as viewed in Fig. 34, when the print only key is depressed.

The bellcrank lever 994 also has a rearwardly directed arm 999 materially shorter than the arm 997. A spring 1000 connected at one end to the distal end of the arm 999 extends downwardly from this arm and is connected at its lower end to the machine frame to resiliently urge the lever 994 in a clockwise rotational direction, as viewed in Figs. 17 and 34, to maintain the distal end portion of the arm 997 against the stud 998. The bellcrank lever 994 also has a downwardly and rearwardly directed arm 1001, the lower end portion of which underlies the subtraction control link 351. The link 351 is provided on its lower edge and intermediate the length thereof with a downwardly and forwardly extending lock ear 1002. The bellcrank arm 1001 is provided near its lower end with a downwardly and rearwardly facing shoulder formation 1003.

When the print only key is depressed, and rocks the bellcrank lever 994 in a counter-clockwise direction, as viewed in Fig. 17, the lower end portion of the bellcrank lever arm 1001 is raised into engagement with the lower or forward edge of the subtract cycle link 351 and raises the upper end of this link until the hook formation 352 on the upper end of the link 351 is brought into position to engage the actuating cross member 333 of the positive transmission gear mechanism. Thereafter the cam following rocker 342 is moved to move the link 351 downwardly and swing the lower gears 340 of the positive gear transmission mechanism into mesh with the activated selector sectors. The positive transmission gear mechanism will be latched in this position in the manner described above and upon downward movement of the actuator bail 192, the activated selector sectors are returned to their "0" position and the corresponding print wheels are turned to the proper position to print the entry value during the dwell of the actuator sectors at the bottom of ther downward stroke, as indicated above. Immediately after the printing operation has been accomplished, the cam 179 reaches an angular position at which it permits the rocker 342 to rock in a counter-clockwise direction, as viewed in Fig. 17, to move the subtraction cycle link 351 upwardly. In the regular subtraction cycle, the spring 357 would move this link upwardly and the nose 429 of the link arm 428 would engage the negative transmission gear shaft 424 and shift the negative transmission mechanism into engagement with the accumulator drive gears to enter the value into the accumulator on the upward stroke of the actuator sectors. In the print only cycle, however, the ear 1002 on the subtraction cycle link 351 engages the shoulder 1003 on the lever arm 1001 upon upward movement of the link 351 and link 351 is stopped before the negative transmission gear mechanism can be shifted to mesh with the accumulator drive gears and transfer the digitation value acquired by the actuator sectors on their downward stroke to the accumulator during the upward stroke of the actuator sectors which takes place immediately after the upward movement of the link 351, as described above.

During the second half of the cycle wherein the entry value is normally transferred to the accumulator, the engagement of shoulder 1003 with ear 1002 holds the link 351 against upward movement, the rocker arm 342 being held against the force of the spring that urges the cam follower 345 against the edge of cam 179. This disables the link 351 to move above its full-cycle position and thereby disables the link 351 and link arm 428 to shift the negative gear transmission into mesh with the accumulator drive gears. At the end of the cycle the cam 179 will have been turned to a position at which its edge again engages the cam follower 345 separating the ear 1002 and the shoulder 1003. The print only key is released freeing the spring 1000 to swing the bellcrank lever arm 1001 away from the subtraction link 351 so that this link moves away from the positive transmission shifting element 333 and to its full-cycle position.

Since the positive gear transmission was moved out of engagement with the selector sectors at mid-cycle, leaving the selector sectors in "0" position and since the actuator sectors are restored to their full-cycle position and the print wheels returned to their "0" position during the second half of the cycle, the end of the print only cycle leaves the machine in condition to receive a new entry value or to print a total or subtotal value.

U. *Keyboard clearing cycle*

When the machine operator notes that an erroneous entry has been made into the digitation mechanism of the machine, the operator will wish to clear this erroneous entry from the machine before it is printed or entered into the accumulator. In order to accomplish this the operator depresses the keyboard clearing control key thereby establishing a machine operating cycle which returns the selector sectors to their "0" position and the shiftable selector unit to its home position without printing the entry made in the selector sectors or adding this entry into the accumulator. The keyboard clearing mechanism utilizes a portion of the mechanism used in the print only cycle, described immediately above, and particularly the bellcrank lever 994 of the print only cycle.

Referring to Figs. 25 and 26, a bail, generally indicated at 1005, having a left-hand leg 1006 extending along the left-hand side of the control key supporting mechanism, a right-hand leg 1007 extending along the right-hand side of the control key supporting structure, and an intermediate or cross portion 1008 extending across the front end of the keyboard and control key supporting structure and connecting the forward end of the leg 1006 to the forward end of the arm 1007, has its right-hand and left-hand legs pivotally mounted near the cross member 1008 on the corresponding ends of the shaft 724. At its rearward end, the bail leg 1006 is provided with a bifurcated formation 1010 providing a notch 1011 receiving the stud 888 projecting laterally from the lower end of the keyboard clearing key stem 607 so that the rearward ends of the bail arms 1006 and 1007 are rocked downwardly when the keyboard clearing key 586 is depressed.

A link 1014 is pivotally connected at its upper end to the arm 997 of the bellcrank lever 994 by a pivot pin 1016 and depends from the arm 997 rearwardly of the print only key stem 601, as shown in Figs. 25 and 34, and this link 1014 is provided at its lower end with a longitudinally extending slot 1015. The bail arm 1007 has at its rearward end a perpendicularly offset tongue 1018 which extends to the left from the bail arm and is received in the slot 1015 so that the bellcrank arm 997 will be pulled downwardly by the link 1014 when the keyboard clear key 586 is depressed in the same manner that this arm 997 is forced downwardly by depression of the print only key 585.

Rocking of the bellcrank lever 994 by the link 1014 raises the arm 1001 which, in turn, raises the subtraction link 351 and conditions the machine for the first part of a subtraction cycle during which the values are cleared out of the shiftable selector unit. This unit is returned to its home position, the adding of the entry into the accumulator during the last half of the cycle being prevented by engagement of the ear 1002 with the shoulder 1003 on the lever arm 1001, as described above in the description of the print only cycle.

For the keyboard clearing operation it is necessary not only that the entry value be not entered into the accumulator but also that it not be printed by the printing mechanism. The printing operation is blocked by the bellcrank lever 885, Fig. 14, pivotally mounted on the shaft 886 carried at the upper end of a bracket not shown, mounted on the machine base 392 and extending upwardly therefrom and located below and forwardly of the cam shaft 135. The forwardly extending arm 887, Fig. 26, of lever 885 is bifurcated to receive the stud 888 on the lower end of the keyboard clearing key stem 607. The rearwardly and upwardly directed arm 889 extends past the left-hand side of the print cam 172 and has at its rear end the square shoulder 890, as previously described, which, when the bell crank lever 885 is rocked in a clockwise direction, as described above, is disposed in the path of the cam following roller 273 on the lower end of the arm 272 of the printing control bellcrank 270 so that, when the low portion 274 in the printing cam comes into registry with the cam following roller 273 to permit movement of the bellcrank lever 270 to lower the print control bail 265. This movement of the bellcrank lever 270 is blocked by the terminal shoulder 890 of the bellcrank lever arm 889 and printing cannot occur. The keyboard is thus cleared without printing and without adding the entry either additively or subtractively into the accumulator.

It will be noted, as described above, that the stud 670 on the keyboard clearing key stem 607, Fig. 26, acts on the extension 668 of the left-hand link 663 to move this link and the right-hand link 168 forwardly to actuate the main clutch and close the motor switch and thus establish the keyboard clearing cycle of the machine. Rocking of the lever arm 895, Fig. 14, by the arm 891 also rocks the lever 897 and disables the tape feed mechanism, previously mentioned.

V. *Symbol printing mechanism—Figs. 9 and 19*

As explained above, the machine is equipped to print symbols at locations spaced from the right-hand ends of the rows of figures printed on the printing tape to indicate the nature of the value, such as a negative or subtractive entry, a positive or negative subtotal, a positive or negative total, or a code or identifying a number which has not been added into the accumulator. The mechanism for this purpose includes a symbol printing wheel constituting the right-hand wheel of the group of printing wheels 230 and actuator sector 1028 disposed at the right-hand end of the group of actuator sectors 186 and an additional transmission gear at the right-hand end of the upper set of gears 337 of the positive transmission gear mechanism. As there is no intermediate gear 338 or bottom gear 340 in this right-hand order meshing with the extreme right-hand upper transmission gear 337, the symbol printing actuator sector 1028 cannot at any time be drivingly connected to a selector sector 33, other means being provided for stopping the actuator sector 1028 at the proper positions to print the indicated symbols.

Three forwardly directed stop arms 1030, 1031 and 1032, Fig. 19, are rockably mounted at their rearward ends on the shaft 214 and are disposed in side-by-side relationship to each other. The arm 1030 is provided on its forward end with abutment surfaces 1033 and 1034 spaced-apart longitudinally of the arm. The arm 1031 is provided on its forward end with transversely extending abutment surfaces 1035 and 1036 spaced-apart longitudinally of the arm. The arm 1032 is likewise provided on its forward end with transversely extending abutment surfaces 1037 and 1038 spaced-apart longitudinally of the arm. It will be noted that both of the abutment surfaces 1037 and 1038 on the forward end of the arm 1032 are spaced to the rear of both abutment surfaces 1035 and 1036 on the forward end of arm 1031 and that abutment surfaces 1035 and 1036 on the forward end of arm 1031 are spaced rearwardly of the abutment surfaces 1033 and 1034 on the forward end of the arm 1030, the respective abutments being spaced incrementally, one from another, behind abutment 1033.

An abutment bracket or ear 1039 is mounted on and projects inwardly from the rim of the actuator sector 1028 near the lower end of this rim and the stops or abutment surfaces on the arms 1030, 1031 and 1032 are selectively engageable with the bracket or ear 1039 to stop the actuator sector 1028 at predetermined locations in its downward stroke to rotate the symbol printing wheel to position to print the indicated symbol. It will be noted that the actuator sector 1028 is latched in position for printing by a latching dog 1040 of bellcrank shape mounted at its knee on the shaft 299 which carries the latching dogs 300, and has its arms received and guided in corresponding notches in the legs of the angularly-shaped comb structure 304.

Three bails 1044, 1045 and 1046, Fig. 35, are mounted near their open ends on the right-hand end portion of the shaft 511 by passing the shaft through mutually aligned apertures in the spaced-apart, and substantially parallel bail legs. These bails have their left-hand legs rearwardly directed beyond the shaft 511 and pivotally connected at their rearward ends to links 1047, 1048 and 1049, respectively. These links are upwardly directed from the corresponding bail legs and are pivotally connected at their upper ends to the stop levers 1030, 1031 and 1032, respectively, intermediate the length of these levers so that rocking movements of the bails on the shaft 511 will raise and lower the forward ends of the stop levers.

The right-hand leg of the bail 1044 is provided with an upwardly directed extension 1050. A link 1051, extending longitudinally of the machine, is pivotally connected at its rear end to the extension 1050 above the shaft 511 and extends forwardly from the bail leg extension. This link terminates forwardly below the shaft 841, Fig. 34, and has near its forward end a longitudinally extending slot 1052 receiving a stud 1053 projecting laterally from the left-hand intermediate frame plate of the machine to guide the forward end of the link 1051 for longitudinal movement of the link. A lever 1054 is pivotally mounted at one end on the shaft 841 and extends downwardly and forwardly from the shaft 841 having at its forward end an upwardly directed end portion 1055 terminating against a stud 1056 projecting laterally from the print only key stem 601 near the lower end of this key stem. Intermediate its length the lever 1054 has a rearwardly directed abutment formation 1057 which bears against a stud 1058 projecting laterally from the link 1051 near the forward end of this link, the arrangement being such that when the print only key 585 is manually depressed, the lever 1054 is rocked about its pivotal mounting on the shaft 841 in a direction to impart rearward movement to the link 1051. When the link 1051 is moved rearwardly, it rocks the bail 1044 in a clockwise direction, as viewed in Fig. 19, causing the bail leg connected to the link 1047 to pull downwardly on this link and swing the stop lever 1030 to a position at which the stop formation 1033 at the forward end of this lever is disposed opposite the ear 1039 on the symbol printing actuator sector 1028.

With the stop 1033 positioned in opposition to the ear 1039 on the actuator sector 1028, this sector will be stopped in its downward movement at a position at which it has rotated the associated symbol printing print wheel to a printing position to print the symbol corresponding to a print only operation of the machine.

The bellcrank lever 840, by means shown in Fig. 34, which is rocked when the subtraction key 581 is depressed to release the ribbon shift blocking lever 837, is provided intermediate its length with a rearwardly directed abutment formation 1060 which also engages the stud 1058 carried by the link 1051 near the forward end of this link and imparts a rearward movement to the link against the force of the tension spring 1061 connected between the fixed stud 1053 and the link 1051 at a location along the link spaced rearwardly from the stud 1053 to resiliently urge the link in a forward direction to a position at which the stud 1053 abuts the rear end of the slot 1052. As the proportion of the distance from the forward end 842 of the lever 840 to the abutment 1060 of this lever over the distance from the abutment 1060 to the shaft 841 is twice the proportion of the distance from the forward end of the lever 1054 to the abutment 1057 of this lever over the distance from the abutment formation 1057 to the shaft 841. The depression of the subtraction key will move the link 1051 rearwardly only one-half the distance that this link is moved rearwardly by depression of the print only key 580. Thus, when the subtraction key is depressed, rocking the bail 1044, the bail 1044 will move the lever 1030 through the link 1047 a distance such that the lower abutment surface 1034 of this lever is positioned in opposition to the ear or abutment formation 1039 on the actuator sector 1028 and the actuator sector will thus move a different distance from its movement in response to depression of the print only key and will rotate the symbol print wheel to a position to print the symbol indicating a subtractive entry of a value into the machine.

The pawl 1040 locking the print wheel driving actuator sector 1028 in its home or full-cycle position is not operated by the comb structure 304 which controls the remaining actuator sector locking pawls, but is guided only by this comb structure and is controlled by a link 1064, the upper end of which is pivotally connected to the locking pawl or dog 1040 near the ear 1065 on the end of this pawl. The link extends vertically from the pawl 1040 to a point below the rearwardly projecting leg portions of the symbol printing control bails 1044, 1045 and 1046. At its lower end the link 1064 carries a stud 1066 which projects laterally to the right from the lower end of the link and underlies the left-hand bail legs. The stud 1066 is pivoted at one end in a guide link 1067 which is also pivoted on the stud 511 to guide the stud 1066 and the lower end of the link 1064. A spring 1068 is connected between the lower end of the depending arm 1069 of the pawl 1040 and the link 1064 intermediate the length of this link.

With this arrangement, when any one of the bails, 1044, 1045, or 1046 is rocked in a clockwise direction, as viewed in Fig. 19, to selectively position the corresponding stop lever 1030, 1031 or 1032, the link 1064 is moved downwardly thereby releasing locking pawl detent 1065 from the gear teeth of the print wheel actuator sector 1028, this sector being locked in its upper or full-cycle position when the operation carried out by the machine does not require the printing of a symbol.

A slide bar 1070 is pivotally connected at its rearward end to the distal end of a depending arm 1071 of the bail 1046. This link extends forwardly to a position somewhat forwardly of the pivotal mounting of the negative balance sensing bellcrank lever 550, Fig. 34, being guided for longitudinal movement by a stud 1072 extending from the machine frame at a location spaced forwardly from the rear end of the bar 1070 and through a slot extending longitudinally of the bar.

A slide bar 1073 extends longitudinally of the machine and overlaps at its rearward end, the forward end of the bar 1070, and carries near its rearward end a laterally projecting stud 1074 slidably received in a slot 1075 extending longitudinally of the bar 1070 near the forward end of this bar. A tension spring 1076 connected between the stud 1074 and the bar 1070 at a location rearwardly of the stud 1074 tends to maintain the stud against the rearward end of the slot 1075. At its forward end the bar 1073 is pivotally connected to the lower end of a lever 1077, Fig. 27, which is pivotally mounted intermediate its length on the shaft 638 and extends downwardly and upwardly from this shaft. At its upper end the lever 1077 is provided with a forwardly directed abutment formation 1078 which bears against a stud 1079 projecting laterally from the downwardly directed arm 912 of the right-hand leg of the bail 909 which is rocked by the subtotal key stem 634 upon depression of the subtotal key.

A spring 1080 connected between the front end portion of the bar 1073 and a spring anchoring pin 1081 projecting upwardly from the machine base 392 resiliently urges the interconnected bars 1073 and 1070 in a rearward direction.

When the subtotal key is depressed, the lever 1077 is rocked in a clockwise direction, as viewed in Fig. 27, imparting a forward movement to the interconnected bars 1073 and 1070 which, in turn, imparts a clockwise rotational movement to the bail 1046, causing this bail to pull downwardly on the link 1049 and shift the stop lever 1032 downwardly thereby positioning the upper stop surface 1037 of the lever 1032 in opposition to the ear 1039 on the actuator gear sector 1028. Under these conditions the symbol printing print wheel will be rotated to print the symbol indicating a positive subtotal.

An abutment formation 1082 projects upwardly from the bar 1070 at a location adjacent and the rear of the knee or angle portion of the total sign sensing bellcrank lever 550. This sensing lever carries below its pivotal mounting on the shaft 557, Fig. 34, a laterally projecting pin or stud 1083 which, when the bellcrank lever 550 is moved to place the negative gear transmission mechanism in mesh with the accumulator drive gears, as previously described, is disposed in the path of the abutment formation 1082 and limits the forward movement of the bar 1070 to approximately one-half the movement which is obtained when the bar 1070 is not blocked by engagement of the abutment formation 1082 with the stud 1083. Under these conditions the spring 1076 stretches to compensate for the difference in longitudinal movement of the bars 1073 and 1070. The bail 1046 is moved through an angular distance such that the stop lever 1032 is swung downwardly to position the lower stop surface 1038 opposite the stop ear 1039 on the actuator sector 1028. Under these conditions, the actuator sector will rotate the symbol printing print wheel to a position to print a negative subtotal symbol.

A lever 1085, Fig. 31, similar to the lever 1077, is mounted on the shaft 638 alongside the lever 1076 and the upper end of the lever 1085 is engaged by a stud 1086 projecting laterally from the lower end portion of the downwardly directed arm of the total operated bail 935. A bar 1087 is pivotally connected at its forward end to the lower end of the lever 1085 and extends rearwardly from the bottom end of the lever 1085 alongside the bar 1073. At its rearward end the bar 1087 is connected by a resiliently resisted, longitudinally slidable connection, similar to the connection between the bars 1070 and 1073, to the front end of a slide bar 1088, the rearward end of which is connected to a depending arm of the bail 1045. The rearwardly directed left-hand leg of the bail 1045 is connected by the link 1048 to the stop lever 1031. Full movement of the bars 1087 and 1088 rearwardly swings the lever 1031 downwardly to bring the stop edge 1035 in opposition to the stop ear 1039 thereby limiting downward movement of the actuator sector 1028 to a position at which the symbol printing print wheel has been turned to print a positive total symbol.

When a negative total is read out from the accumulator, an abutment formation 1090 on the bar 1088 encounters the stud 1083 carried by the bellcrank lever 550. Forward movement of the bar 1088 is limited to an extent such that the lower stop surface 1036 of the stop bar 1031 is brought into opposition to the actuator sector carried abutment or ear 1039 and the sector 1028 will then be stopped in its downward movement at a position at which the symbol printing print wheel has been turned to print a negative total symbol.

No symbol is provided for the addition key as it is assumed that the absence of a symbol will indicate that the value is positively added into the accumulator. This is also true for the repeat addition key. Also no symbol is provided for the keyboard clearing key as no printing takes place in this operation. The printing actuator sector 1028 is held in its uppermost or full-cycle position by the locking pawl 1040 whenever the addition key, the repeat addition key or the keyboard clearing key is depressed.

W. Clear signal printing mechanism

After the machine has been cleared by taking either a positive or a negative total, as described above, it is desirable that a symbol be printed on the tape to indicate to the operator that all previous totals or balances have been cleared from the machine and that the machine is now in condition to start the accumulation of a new total. This mechanism is somewhat diagrammatically illustrated in Fig. 36 and comprises a clear signal printing bail, generally indicated at 1095, rockably mounted on the printing control bail pivot shaft 222, a clear signal printing bail latch, generally indicated at 1096 pivotally mounted on the print wheel drive gear shaft 218 and a clear signal print bail controlling slide, generally indicated at 1097, slidably supported at its rear end on the machine frame and disposed adjacent the left-hand leg of the bail 1095.

The clear signal print bail 1095 has a bail leg 1098 pivotally mounted at its lower end on the shaft 222 and extending upwardly and forwardly from this shaft so that its upper end is disposed in striking position relative to the forward surface of the platen 242. The upper end portion of the left leg 1098 is rearwardly directed and terminally shaped to provide a clear signal formation 1099, such as a "C", and disposed in striking position relative to the platen. A bar 1100 of the bail 1095 extends to the right from the leg 1098 adjacent and substantially parallel to the shaft 222. This bar is provided on its right-hand end with a perpendicularly offset and rearwardly directed cam formation 1101, the purpose of which will presently appear.

The latch 1096 is pivotally mounted medially of its length and adjacent its forward edge on the shaft 218 and is provided rearwardly of this shaft with an opening 1104 of substantially rectangular shape through which the bar or perpendicular extension 1100 of the bail leg 1098 extends. The opening 1104 is extended to the rear edge of the latch 1096 and the rear edge portion of the latch at the top of the opening 1104 is formed to provide an upper latching tooth 1105 which is engageable with the rearward edge of the bar 1100 when the latch 1096 and the bail 1098 are in the relative positions shown in Fig. 36 and the rear edge portion of the latch at the lower side of the opening 1104 is formed to provide a stop ear 1106 spaced rearwardly from the upper latch tooth 1105.

The latch member 1096 extends upwardly and downwardly from the shaft 218 and has a forwardly directed bottom end portion terminated in a perpendicularly offset abutment 1108 extending to the left from the remainder of the latch member. At its upper end the bail latch member 1096 is provided with a perpendicularly offset tongue 1109 extending to the right from the remainder of the latch. The total controlling link or slide bar 691 is provided with a rearward extension 1110 terminating in a downwardly directed hook 1112 which engages the rear edge of the tongue 1109. A tension spring 1113 is connected between the bail latch 1096 above the shaft 218 and the machine frame rearwardly of the latch and resiliently urges the latch to rotate in a clockwise direction, as viewed in Fig. 36, or in a direction such that the tongue 1109 on its upper end is moved rearwardly, this rearward movement of the tongue being normally precluded by the engagement of the tongue with the hook formation 1112 on the rear end of the total controlling link 691.

The front end of the slide bar 1097 is pivotally connected to the upper end of an extension 1114 directed upwardly from the right-hand leg 1115 of the zero foil releasing bail 250 of the printing mechanism, as shown in Fig. 12, and is provided at its rear end with a longitudinally extending notch 1116 which receives a stud, not shown, projecting outwardly from the adjacent frame plate of the machine to guide the slide 1097 in movements forwardly and rearwardly of the machine when the bail 250 is rocked, as described above. The slide has a downwardly and rearwardly directed arm 1118 terminating at its rearward end in a perpendicularly offset abutment formation 1119 directed to the left and having its major dimension disposed substantially vertically. A stud 1120 carried by and projecting laterally from the left-hand leg of the printing bail 1098 engages the abutment 1119 on the slide 1097 to restrain the printing bail against printing except when the abutment 1119 is removed from the path of the stud 1120, as will be subsequently described.

A spring 1122 connected between a rearwardly directed extension 1123 of the bail leg 1098 and the machine frame at a location below the shaft 222 resiliently urges the printing bail to clockwise rotation, as viewed in Fig. 36, and furnishes the power for the printing stroke of the upper end formation 1099 of the bail leg 1098.

In addition to the printing block provided by the latch tooth 1105 and ear 1106 and the abutment formation 1119 on the slide 1097, an additional printing block is provided and includes an upwardly and forwardly directed extension 1124 from the forward end of the right-hand printing control bail leg 267 mounted on the shaft 222 and an abutment formation 1125 extending perpendicular to the left from the upper hand of the extension 1124 and engageable with the rearward extremity of the cam formation 1101 to releasably hold the bail leg 1098 away from the platen 242. A bellcrank lever 1126 is pivotally mounted at its knee on a stud 1127 mounted on the adjacent frame plate of the machine and has a forwardly directed arm 1128 terminating at its forward end in a perpendicularly offset abutment formation 1129 which engages the forward surface of the abutment formation 1108 on the bottom end of the latch 1096 to releasably hold the latch against relatching the bar 1100 of the printing bail if the keyboard clearing key is depressed immediately after a total taking cycle, as will be later explained.

In the operation of the clear signal printing mechanism, when the total key is depressed and the total cycle controlling link or slide bar 691 moves forwardly, as previously described, the hook formation 1112 on the rear end of the slide bar or link 691, by its engagement with the tongue 1109, rocks the latch member 1196 in a counter-clockwise direction, as viewed in Fig. 36, thereby raising the latch tooth 1105 away from the bar 1100 of the bail 1095 and freeing the bail from this latch tooth. The abovedescribed rocking of the latch member, however, raises the latch ear 1106 so that, after being released by the latch tooth 1105 the bar 1100 is engaged by the rearwardly spaced ear 1106 and held from printing. However, as the latch tooth 1105 is now disposed above the bar 1100, the cross member cannot be again relatched by the latch tooth 1105 until the printing bail has been rocked in a counter-clockwise direction to a predetermined limit, as will be later explained.

1. OPERATION OF THE CLEAR SIGNAL SYMBOL PRINTING MECHANISM

When the total key 582, Fig. 27, is depressed, it imparts a forward movement to the link or slide bar 691 which releases the cam followers 561 and 941 and the link 560, Fig. 24, as described above, and this forward movement of the link 691 causes the hook 1112 on the rear end of the slide bar extension 1110 to engage the laterally directed tongue formation 1109 on the upper end of latch member 1096 and impart a rocking movement of limited extent to the latch member in a counter-clockwise direction or in a direction moving the upper end of the latch member forwardly, as viewed in Fig. 36. This rocking movement of the latch member moves the latch tooth 1105 out of blocking engagement with the bar 1100 of the clear signal symbol printing bail 1095 and simultaneously disposes the ear 1106 in the path of the bar 1100 at a location spaced rearwardly from the latch tooth 1105.

During the first portion of the total taking cycle while the actuator sectors are moving downwardly, the cam follower 257, Fig. 12, on the cam following lever 255 rides on the lobe 1107 of the zero foil control cam 171 holding the zero foil latch detents 248, Fig. 9, out of the notches 220 in the hubs of the corresponding print wheel drive gears 217 to render these drive gears and the associated print wheels freely rotatable during the downward stroke of the actuator sectors, as shown in Fig. 12. During this portion of the cycle, the slide 1097, Fig. 36, is held in a forward position by the zero foil control bail arm 1115 with the slide abutment formation 1119 disposed rearwardly of the stud 1120 on the leg 1098 of the clear signal symbol printing bail 1095. The tongue 1125 on the print bail arm 1124 engages the rearward extremity of the cam formation 1101 and holds the bail 1095 in position such that its bar 1100 is disposed forwardly of the lower latch ear 1106 and under and out of latching relationship to the upper latch tooth 1105. As the cycle approaches its medial period during which the actuator sectors are temporarily retained at the bottom of their downward stroke, as described above, the cam follower 257 rides off of the lobe and into the low portion of the zero foil control cam 171 and the spring 269 now rocks the zero foil latch bail 250 upwardly and rearwardly to free the zero foil latches 240 to sense the rotational position of the corresponding print wheel drive gears 217 and latch down the printing units to the left of those units which have been affected by the entry of the value to be printed. This rearward rocking movement of the zero foil control bail 250 moves the slide 1097 rearwardly with a consequent rearward movement of the slide abutment 1119 away from the stud 1120 a distance sufficient to free the bail 1095 for printing the clear signal symbol if the bail were otherwise free to do so.

When the slide abutment 1119 is moved rearwardly, the spring 1122 rocks the clear signal printing bail 1095 rearwardly until the rearward extremity of the rearwardly directed cam formation 1101 on the right-hand end of the bar 1100 of the clear signal printing bail comes into engagement with the laterally off-set tongue 1125 on the extension 1124 of the right-hand leg 267 of the print control bail thus temporarily blocking further rocking movement of the bail 1095 in a rearward direction by the spring 1122.

Immediately after the zero foil latches have been released by the riding of the cam follower 257 off of the lobe of the cam 171, as described above, the print control bail 250 is rocked to provide the printing operation by movement of the cam following roller 273, Fig. 14, on rocker 272 into the restricted portion 274 of the print control cam 172, as described above, under the printing operation. This rocking of the print controlling bail 250 moves the tongue 1125 on the print controlling arm 267 out of the path of the cam formation 1101, thereby freeing the clear signal printing bail 1095 for rearward rocking movement by the spring 1122. Since the latch lever 1096 is maintained in its forwardly tilted position while the total key is held down, this rearward movement of the bail 1095 is, however, arrested by engagement of the bar 1100 with the lower latch ear 1106 before printing of the clear signal symbol can occur.

When the print controlling bail 250 is restored to its full-cycle position by movement of the cam following roller 273 out of the restricted portion of print control cam 172, the tongue 1125 on the right-hand print controlling bail arm 267 re-engages the cam formation 1101 of the bar 1100 and rocks the clear signal printing bail a slight distance forwardly against the force of spring 1122. The cam following roller 257 on the cam following lever 255 then rides up on the lobe of the zero foil control cam 171 rocking the zero foil controlling bail 250 forwardly and imparting a forward movement to the slide 1097 thereby moving the slide abutment formation 1119 forwardly into engagement with the stud 1120 on the clear signal print bail 1095. The lobe of cam 171 has a high portion 1107 where the roller 257 rides out of the low portion and back onto the lobe of this cam. This high portion of the cam lobe rocks the clear signal print bail 1095 forwardly an additional amount so that the rear edge of the bar 1100 is temporarily moved forwardly of the upper latch tooth 1105. However, as the latch member 1096 is still held in its rocked position by the depressed total key, the latch tooth 1105 cannot latch the bar 1100 and, when the high point on the cam 171 passes the cam following roller 257, the bar 1100 is returned rearwardly to a position at which it cannot be latched by the latch tooth 1105 when the total key is restored to its home position at the end of the cycle.

Printing of the clear signal symbol is thus blocked during the total taking cycle and reserved for the subsequent operating cycle of the machine but the clear signal symbol printing bail 250 is left in released or cocked condition for printing during the next cycle.

When the machine is put through an operating cycle other than a keyboard clearing cycle or another total printing cycle following a machine clearing, total taking cycle, as the medial portion of such subsequent cycle is approached, the cam following roller 257 rides off of the lobe of the zero foil control cam 171 and the zero foil control bail 250 is rocked rearwardly by the spring 260 moving the slide 1097 rearwardly and the slide abutment formation 1119 rearwardly out of the way of the stud 1120. The cam formation 1101 on the right-hand end of the bail bar 1100 now bears at its rearward extremity against the tongue 1125 and, when the print control bail is rocked downwardly by the movement of the cam follower roller 273 into the restricted portion 274 of the print control cam 172, the tongue 1125 is moved out of way of cam formation 1101 and, since the lower latch ear 1106 is now positioned out of the path of the bar 1100 by the restoration of the total key to its home position, the spring 1122 rocks the bail 1095 rearwardly a sufficient amount to cause the formation 1099 on the upper end of the bail leg 1098 to stroke the platen 242 and print the clear signal symbol.

After the printing operation, when the cam follower 273 rides out of the restricted portion 274 in the print control cam 172, the print control bail rod 265 is rocked upwardly engaging the tongue 1125 with the cam formation 1101 and rocking the bail 1095 forwardly to a limited extent. As the cam follower 257 subsequently rides up on the high portion of the lobe of the zero foil control cam 171 the slide 1097 is moved forwardly bringing the abutment formation 1119 into engagement with the stud 1120 and rocking the bail 1095 forwardly until the rear edge of the bar 1100 latches under the upper latch tooth 1105, the latch member being now conditioned for latching the bail 1095 in restored position by the previous restoration of the total key. As the cam follower 257 rides off of the high portion of the cam 171, the abutment formation 1119 moves rearwardly away from the stud 1120 but the bail 1095 is latched in restored and inoperative position by the latch tooth 1105 until the latch member is again rocked by the initiation of a total printing cycle.

If the total key is again depressed after a total printing cycle, the bail 1095 will be blocked from printing by the raised latch ear 1106 in the manner described above and will print on the next operating cycle other than a total printing or keyboard clearing cycle.

Since the printing mechanism is held out of operation during a keyboard clearing cycle, it is desirable that the clear signal symbol printing mechanism be blocked from printing during such a nonprinting cycle but be retained in cocked condition for printing during the next printing cycle.

The mechanism for restraining the clear signal printing mechanism against printing and against being relatched in home position during a keyboard clearing cycle following a total printing cycle comprises the print blocking means described above in connection with the keyboard clearing cycle and including the print blocking lever 885 and the means blocking the clear signal bail during such a keyboard clearing cycle includes a link 1130 pivotally connected at one end to the lower end of the downwardly directed arm 1131 of the bellcrank lever 1126 and pivotally connected at its other end by the stud 901 to the lower end of the portion of the tape feed blocking lever 897 extending downwardly and rearwardly from the shaft 894 on which the blocking lever is mounted.

When the keyboard clearing key 586 is depressed, it rocks the shafts 886 and the blocking lever 885 to move the upper end of the blocking lever upwardly to engage the cam follower 273 and prevent printing, as previously described. This maintains the tongue 1125 on the print bail arm 267 in the path of the cam formation 1101 on the clear signal print bail leg 1098 and blocks printing of the clear signal symbol when printing is otherwise blocked.

Rocking of lever 885 rocks shaft 894 which rocks the tape feed blocking lever 897 and moves the lower end of this blocking lever and the link 1130 forwardly, rocking the bellcrank lever 1126 to raise the abutment formation 1129 on this lever in front of the abutment formation 1108 on the lower end of the latch member 1096 to cam the latch member to a position at which the latch tooth 1105 cannot relatch the bar 1100. This will prevent the upper latch tooth 1105 from latching the bar 1100 when the bail leg 1098 is moved to its latching position by the high point 1107 on the cam 171, thus leaving the clear signal printing mechanism in condition to print the clear signal symbol during the next printing cycle following the keyboard clearing cycle.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In a calculating machine having a ten-key keyboard, a selector mechanism operated by said keyboard and including ordinally arranged selector members differentially settable order by order to a selected entry value, a cyclically operative power operated means including a unidirectionally rotatable main shaft, a printing mechanism, an accumulator, an actuator mechanism driven by said power operated means and including ordinally arranged actuator elements, a positive transmission mechanism permanently connected between said actuator mechanism and said printing mechanism and engageable with said selector mechanism and said accumulator, a negative transmission mechanism engageable with said actuator mechanism and said accumulator, an addition control key effective to establish an operative cycle of said power operated mechanism, means driven by said power operated mechanism and conditioned by said addition control key to move said positive transmission mechanism into engagement with said selector mechanism during the first portion of the operating cycle established by said addition control key to zeroize said selector mechanism and differentially set said actuator mechanism, and into engagement with said accumulator during the last portion of the same operating cycle to transfer the value from said differentially set actuator mechanism to said accumulator, a subtraction control key connected to said power operated means and effective when operated to establish an operating cycle of said power operated means, and means driven by said power operated means and conditioned by operation of said subtraction control key to move said positive transmission into engagement with said selector mechanism during the first portion of the operating cycle established by said subtraction control key to zeroize said selector mechanism and differentially set said actuator mechanism and to move said positive transmission mechanism to a neutral position and move said negative transmission mechanism into engagement with said accumulator during the latter portion of the same operating cycle to subtractively transfer the value from said differentially set actuator mechanism to said accumulator.

2. In a calculating machine having a ten-key keyboard, a selector mechanism operated by said keyboard and including ordinally arranged selector members differentially settable order by order to a selected entry value, a cyclically operative power operated means including a unidirectionally rotatable main shaft, a printing mechanism, an accumulator, an actuator mechanism driven by said main shaft and including ordinally arranged actuator elements, a positive transmission mechanism permanently connected between said actuator mechanism and said printing mechanism and alternatively engageable with said selector mechanism or said accumulator, a negative transmission mechanism engageable with said actuator mechanism and said accumulator, an addition control key effective to establish an operative cycle of said main shaft, means driven by said main shaft and conditioned by said addition control key to move said positive transmission mechanism into engagement with said selector mechanism during the first portion of the operating cycle established by said addition controy key to zeroize said selector members and differentially set said actuator elements, and into engagement with said accumulator during the last portion of the same operating cycle to enter the value from said actuator elements into said accumulator as said actuator elements are restored, a subtraction control key connected to said power operated means and effective when operated to establish an operating cycle of said main shaft, means driven by said main shaft and conditioned by operation of said subtraction control key to move said positive transmission mechanism into engagement with said selector mechanism during the first portion of the operating cycle established by said subtraction control key to zeroize said selector members and differentially set said actuator elements and to move said positive transmission mechanism to a neutral position and move said negative transmission mechanism into position to connect said actuator mechanism with said accumulator during the latter portion of the same operating cycle to enter the value from said actuator elements into said accumulator as said actuator elements are restored, a clearing control key effective when operated to establish an operating cycle of said main shaft, means driven by said main shaft and conditioned by said clearing control key when the latter is operated before operation of any other control key to restore said selector mechanism to its zero setting and full-cycle position, and blocking means conditioned by operation of said clearing control key to block operation of said printing mechanism and restrain said transmission mechanisms against movement into engagement with said accumulator during the operating cycle established by operation of said clearing control key.

3. In a calculating machine, a ten-key keyboard, selection mechanism including ordinally arranged selection elements differentially settable by said keyboard, printing mechanism spaced from said selection mechanism, accumulator mechanism spaced from said selection mechanism and said printing mechanism, a single actuator, power means drivingly connected to said actuator to impart separate cycles of operation thereto, transmission mechanism drivenly connected to said actuator and having a first position in which it is clear of said selection mechanism and said accumulator, a second position in which it interconnects said selection mechanism, said printing mechanism and said actuator, and a third position in which it interconnects said printing mechanism, said accumulator mechanism and said actuator, power actuated means effective to move said transmission mechanism from one position to another, and manually operated control means effective to establish an operating cycle of said actuator and control said power actuated means to place said transmission mechanism in said second position during an early portion of the coincident operating cycle to return said selection elements to "0" condition and enter the value from said selection mechanism into said printing mechanism and said actuator, and to place said transmission mechanism in said third position during a later portion of the same operating cycle to enter said value into said accumulator mechanism as said actuator returns to full-cycle condition.

4. In a calculating machine having a ten-key keyboard, a selector mechanism having ordinally arranged selector members angularly movable about a fixed axis and differentially settable to selected values by said keyboard, a printing mechanism including ordinally arranged printing members angularly movable about axes parallel to the axis of said selection members and a platen rotatable about a fixed axis parallel to said selection member axis, an accumulator having ordinally arranged accumulator gears angularly movable about a fixed axis parallel to said selection member axis, an actuator including actuator sectors angularly movable about a fixed axis parallel to said selector member axis, power means drivingly connectable to said actuator to impart separate operating cycles thereto, and transmission mechanism including ordinally arranged gears angularly movable about a fixed axis and ordinally connected to said actuator sectors and said printing members and ordinally arranged gears angularly movable about an axis arcuately shiftable about the axis of the first-mentioned transmission gears to engage the second-mentioned transmission gears either with said selector members or said accumulator gears or to place them out of engagement with both the selector members and the accumulator gears, power operated means effective to shift the axis of said second-mentioned transmission gears, and manually operated control means effective to establish operating cycles of said actuator and control the operation of said power operated means.

5. In a calculating machine having differentially positionable selection racks and means for positioning said racks, the combination comprising: rockable actuator plates, an oscillatable operator for rocking said plates, a severable connection between said operator and each of said plates, accumulator gears, a gear train and means for positioning said train to engage said actuators with said selection racks, then rocking said operator in one direction to zeroize said selection racks and differentially set said actuator plates, then positioning said train to disengage said actuators from said selection racks and engage said actuators with said accumulator gears, and finally rocking said operator in the opposite direction to restore said actuator plates to their original position and enter the value therein into said accumulator.

6. In a listing adding machine including selection mechanism, printing mechanism, accumulator mechanism, actuator mechanism drivingly connected with said printing mechanism and alternatively connectable with said selection mechanism and said accumulator mechanism to transfer values from said selection mechanism to said printing mechanism and said accumulator mechanism and from said accumulator mechanism to said printing mechanism, and power means effective to cycle said actuator mechanism from its original position to a differentially set position and back to its original position during each machine operating cycle, control means effective to selectively establish different machine operating cycles and including a manually depressible addition key effective upon depression thereof to establish a machine operating cycle of said power means, a cam driven by said power means, and mechanism conditioned by depression of said addition key and actuated by said cam to connect said actuator mechanism to said selection mechanism during the first portion of the coincident machine operating cycle to zeroize said selection mechanism and differently set said actuator mechanism and enter a value from said selection mechanism into said printing mechanism, and to connect said actuator mechanism to said accumulator mechanism during the latter portion of said coincident machine operating cycle to enter the same value from the differentially set actuator mechanism into said accumulator mechanism as said actuator mechanism is returned to its original position.

7. In a listing adding machine including selection mechanism, printing mechanism, accumulator mechanism, actuator mechanism drivingly connected with said printing mechanism and additively connectable with said selection mechanism and said accumulator mechanism, and subtractively connectable with said accumulator mechanism, and power means effective to cycle said actuator mechanism from its original position to a differentially set position and back to its original position during each machine operating cycle, control means effective to selectively establish different machine operating cycles and including a manually depressible subtraction key, a cam driven by said power means, and mechanism conditioned by depression of said subtraction key and actuated by said cam to additively connect said actuator mechanism to said selection mechanism during the first portion of the coincident operating cycle to zeroize said selection mechanism and differentially set said actuator mechanism and enter a value from said selection mechanism, into said printing mechanism and to subtractively connect said actuator mechanism to said accumulator mechanism during the latter portion of said coincident operating cycle to subtractively enter the same value from said differently set actuated mechanism into said accumulator mechanism as said actuator mechanism is returned to its original position.

8. In a calculating machine including selection mechanism, printing mechanism, accumulator mechanism, actuator mechanism conditioned by said selection mechanism and additively or subtractively connectable with said accumulator mechanism, power means effective to cycle said actuator mechanism from its original position to a differentially set position and back to its original position during each machine operating cycle, and means driving said printing mechanism from said actuator mechanism, control means including independently and selectively operable addition and subtraction keys, a cam driven by said power means, mechanism conditioned by depression of said addition key and actuated by said cam to first connect said actuator mechanism to said selection mechanism to zeroize said selection mechanism and differentially set said actuator mechanism and to then connect said actuator mechanism additively to said accumulator mechanism to enter the value from said actuator mechanism into said accumulator mechanism while said actuator mechanism is returned to its original position, and mechanism conditioned by depression of said subtraction key and actuated by said cam to first connect said actuator to said selection mechanism to zeroize said selection mechanism and differently set said actuator mechanism and then connect said actuator mechanism subtractively to said accumulator mechanism to subtractively enter the value from said actuator mechanism into said accumulator mechanism while said actuator mechanism is returned to its original position.

9. In a calculating machine including selection mechanism, printing mechanism, accumulator mechanism, and actuator mechanism, gear means continuously connecting said actuator mechanism to said printing mechanism, and power means effective to cycle said actuator mechanism from its original position to a differentially set position and back to its original position during each machine operating cycle, control means effective to selectively establish different machine operating cycles including independently operable addition and subtraction keys, transmission means driven by said actuator mechanism and effective to first connect said actuator mechanism to said selection mechanism to zeroize the latter and to then connect said actuator mechanism either additively or subtractively with said accumulator mechanism, mechanism conditioned by depression of said addition key and actuated by said power means to condition said transmission means to enter a value additively from said actuator mechanism into said accumulator mechanism, and mechanism conditioned by depression of said subtraction key and actuated by said power means to condition said transmission means to enter a value subtractively from said actuator mechanism into said accumulator mechanism.

References Cited in the file of this patent

UNITED STATES PATENTS

| | | |
|---|---|---|
| 1,253,310 | Von Reppert | Jan. 15, 1918 |
| 1,901,152 | Dunker | Mar. 14, 1933 |
| 2,052,905 | Sturm | Sept. 1, 1936 |
| 2,203,336 | Landsiedel | June 4, 1940 |
| 2,247,938 | Bower | July 1, 1941 |
| 2,281,851 | Mehan | May 5, 1942 |
| 2,303,692 | Hellgren | Dec. 1, 1942 |
| 2,352,006 | Pott | June 20, 1944 |
| 2,371,752 | Friden | Mar. 20, 1945 |
| 2,459,441 | Lippert | Jan. 18, 1949 |
| 2,590,345 | Reppert | Mar. 25, 1952 |
| 2,665,844 | Westinger et al. | Jan. 12, 1954 |
| 2,681,767 | Hopkins et al. | June 22, 1954 |

UNITED STATES PATENT OFFICE
CERTIFICATE OF CORRECTION

Patent No. 2,832,530         Harold J. Chall         April 29, 1958

It is hereby certified that error appears in the printed specification of the above numbered patent requiring correction and that the said Letters Patent should read as corrected below.

Column 11, line 10, for "selction" read -- selection --; column 20, line 9, after the word and comma "effective," insert -- when --; column 25, line 43, for "edgs" read -- edges --; column 27, line 54, for "upon" read -- up on --; column 30, line 61, strike out "after"; column 31, line 28, for "form" read -- from --; column 34, line 23, for "detent" read -- nose --; column 37, line 20, for "not" read -- now --; column 38, line 3, after "rocks" insert -- the --; column 39, line 58, for "51" read -- 551 --; column 45, line 57, after "receiving" insert -- a --; column 53, line 46, for "reaward" read -- rearward --; column 54, line 61, after "direction" strike out the comma and insert instead a period; column 58, line 47, after "underlies" strike out "to"; column 59, line 60, for "longitudinaly" read -- longitudinally --; column 64, line 26, strike out "on"; column 65, line 12, for "ths" read -- this --; column 68, line 18, for "ther" read -- their --; column 69, line 53, after "bracket" insert a comma; column 72, line 73, after "and" insert -- to --; column 78, line 58, after "mission" insert -- mechanism --; column 79, line 12, for "controy" read -- control --; column 81, line 12, after "mechanism" strike out comma; line 13, after "mechanism" insert a comma.

Signed and sealed this 16th day of September 1958.

(SEAL)
Attest:
KARL H. AXLINE
Attesting Officer

ROBERT C. WATSON
Commissioner of Patents